(12) United States Patent
Ross et al.

(10) Patent No.: US 9,151,279 B2
(45) Date of Patent: Oct. 6, 2015

(54) OCEAN THERMAL ENERGY CONVERSION POWER PLANT COLD WATER PIPE CONNECTION

(75) Inventors: Jonathan M. Ross, Arnold, MD (US); Daniel L. Wilkins, Saint Leonard, MD (US); Manish Gupta, Laurel, MD (US); Greg M. Morrow, Morgantown, PA (US); Laurence Jay Shapiro, Fair Lawn, NJ (US); Barry R. Cole, Mineral, VA (US); Andrew Rekret, Toronto (CA)

(73) Assignee: The Abell Foundation, Inc., Baltimore, MD (US)

( * ) Notice: Subject to any disclaimer, the term of this patent is extended or adjusted under 35 U.S.C. 154(b) by 0 days.

(21) Appl. No.: 13/209,893

(22) Filed: Aug. 15, 2011

(65) Prior Publication Data

US 2013/0042613 A1 Feb. 21, 2013

(51) Int. Cl.
| | | |
|---|---|---|
| F03G 7/04 | (2006.01) | |
| F03G 7/06 | (2006.01) | |
| E21B 33/06 | (2006.01) | |
| B63B 35/44 | (2006.01) | |
| F03G 7/05 | (2006.01) | |

(52) U.S. Cl.
CPC . F03G 7/05 (2013.01); *Y02E 10/34* (2013.01); *Y10T 29/49826* (2015.01)

(58) Field of Classification Search
CPC ...... F03G 7/05; Y02E 10/34; Y10T 29/49826
USPC .................. 60/641.7; 166/85.4; 114/263, 265; 405/224.2
See application file for complete search history.

(56) References Cited

U.S. PATENT DOCUMENTS

| | | | |
|---|---|---|---|
| 2,038,172 | A | 4/1936 | Haley |
| 2,263,182 | A | 11/1941 | MacPherson |
| 2,648,217 | A | 8/1953 | Gladville |
| 2,827,774 | A | 3/1958 | Dunkelman |
| 2,900,175 | A | 8/1959 | McGuffey |
| 3,095,014 | A | 6/1963 | Dosker |
| 3,246,689 | A | 4/1966 | Remde et al. |
| 3,312,056 | A | 4/1967 | Lagelbauer |
| 3,368,614 | A | 2/1968 | Anderson |

(Continued)

FOREIGN PATENT DOCUMENTS

| | | |
|---|---|---|
| CN | 201301785 | 9/2009 |
| EP | 0908382 | 4/1999 |

(Continued)

OTHER PUBLICATIONS

Kang, Tack Jung, "International Search Report", International Application No. PCT/US2011/044015, mailed on Mar. 22, 2012 (3 pages).

(Continued)

*Primary Examiner* — Phutthiwat Wongwian
*Assistant Examiner* — Deming Wan
(74) *Attorney, Agent, or Firm* — Fish & Richardson P.C.

(57) ABSTRACT

An offshore structure for use with an OTEC system includes a submerged spar having a lower portion having a cold water intake. The cold water intake includes a domed terminus in fluid communication with a cold water pipe. A dry machinery space adjacent the cold water intake includes one or more cold water supply pumps and one or more cold water pipe lifting and retention winches having a lifting cable connected to the cold water pipe.

19 Claims, 30 Drawing Sheets

(56) References Cited

U.S. PATENT DOCUMENTS

| | | | |
|---|---|---|---|
| 3,502,141 A | 3/1970 | Allen | |
| 3,524,476 A * | 8/1970 | Thomas | 138/103 |
| 3,538,955 A | 11/1970 | Anderson | |
| 3,558,439 A | 1/1971 | Anderson | |
| 3,599,589 A | 8/1971 | Busey | |
| 3,795,103 A | 3/1974 | Anderson | |
| 3,805,515 A | 4/1974 | Zener | |
| 3,837,308 A * | 9/1974 | Harvey et al. | 114/264 |
| 4,002,200 A | 1/1977 | Raskin | |
| 4,006,619 A | 2/1977 | Anderson | |
| 4,014,279 A * | 3/1977 | Pearson | 114/382 |
| 4,030,301 A | 6/1977 | Anderson | |
| 4,036,286 A * | 7/1977 | Anderson et al. | 165/45 |
| 4,048,943 A * | 9/1977 | Gerwick, Jr. | 114/256 |
| 4,055,145 A | 10/1977 | Mager et al. | |
| 4,087,975 A | 5/1978 | Owens | |
| 4,089,324 A | 5/1978 | Tjaden | |
| 4,131,159 A | 12/1978 | Long | |
| 4,139,054 A | 2/1979 | Anderson | |
| 4,179,781 A | 12/1979 | Long | |
| 4,201,263 A | 5/1980 | Anderson | |
| 4,209,061 A | 6/1980 | Schwemin | |
| 4,209,991 A | 7/1980 | Anderson | |
| 4,210,819 A | 7/1980 | Wittig et al. | |
| 4,210,820 A * | 7/1980 | Wittig | 290/52 |
| 4,229,868 A | 10/1980 | Kretzinger | |
| 4,231,312 A * | 11/1980 | Person | 114/264 |
| 4,231,420 A | 11/1980 | Anderson | |
| 4,234,269 A | 11/1980 | Person et al. | |
| 4,254,626 A | 3/1981 | Anderson | |
| 4,265,301 A | 5/1981 | Anderson | |
| 4,282,834 A | 8/1981 | Anderson | |
| 4,290,631 A | 9/1981 | Anderson | |
| 4,301,375 A | 11/1981 | Anderson | |
| 4,350,014 A * | 9/1982 | Sanchez et al. | 60/641.7 |
| 4,358,225 A | 11/1982 | van der Pot et al. | |
| 4,363,570 A | 12/1982 | van der Pot | |
| 4,417,446 A | 11/1983 | Nakamoto et al. | |
| 4,497,342 A * | 2/1985 | Wenzel et al. | 137/565.17 |
| 4,578,953 A | 4/1986 | Krieger et al. | |
| 4,603,553 A * | 8/1986 | Ridgway | 60/641.7 |
| 4,749,032 A | 6/1988 | Rosman et al. | |
| 4,753,554 A | 6/1988 | Jeter | |
| 4,823,867 A | 4/1989 | Pollard et al. | |
| 4,871,017 A | 10/1989 | Cesaroni | |
| 5,057,217 A * | 10/1991 | Lutz et al. | 210/346 |
| 5,076,354 A | 12/1991 | Nishishita | |
| 5,101,890 A | 4/1992 | Aoki et al. | |
| 5,123,772 A | 6/1992 | Anderson | |
| 5,441,489 A * | 8/1995 | Utsumi et al. | 604/525 |
| 5,555,838 A | 9/1996 | Bergman | |
| 5,582,691 A | 12/1996 | Flynn et al. | |
| 5,769,155 A | 6/1998 | Ohadi et al. | |
| 5,983,624 A | 11/1999 | Anderson | |
| 6,167,693 B1 | 1/2001 | Anderson | |
| 6,293,734 B1 | 9/2001 | Thomas et al. | |
| 6,301,872 B1 | 10/2001 | Anderson | |
| 6,347,912 B1 | 2/2002 | Thomas | |
| 6,406,223 B1 | 6/2002 | Thomas | |
| 6,451,204 B1 | 9/2002 | Anderson | |
| 6,472,614 B1 | 10/2002 | Dupont et al. | |
| 6,481,197 B2 | 11/2002 | Anderson | |
| 6,553,752 B2 | 4/2003 | Anderson | |
| 6,634,853 B1 | 10/2003 | Anderson | |
| 6,663,343 B1 | 12/2003 | Anderson | |
| 6,718,901 B1 | 4/2004 | Abbott et al. | |
| 6,843,278 B2 | 1/2005 | Espinasse | |
| 6,848,863 B2 | 2/2005 | Karayaka et al. | |
| 7,197,999 B2 | 4/2007 | Murray | |
| 7,243,716 B2 | 7/2007 | Denniel et al. | |
| 7,328,578 B1 | 2/2008 | Saucedo | |
| 7,431,623 B1 | 10/2008 | Saucedo et al. | |
| 7,472,742 B2 | 1/2009 | Kumar et al. | |
| 7,600,569 B2 | 10/2009 | Routeau et al. | |
| 7,735,321 B2 | 6/2010 | Howard | |
| 7,882,703 B2 | 2/2011 | Pellen | |
| 7,900,452 B2 | 3/2011 | Howard et al. | |
| 8,025,834 B2 | 9/2011 | Miller et al. | |
| 8,043,027 B2 | 10/2011 | Duroch et al. | |
| 8,070,388 B2 | 12/2011 | Thomas | |
| 8,070,389 B2 | 12/2011 | Ayers et al. | |
| 8,083,902 B2 | 12/2011 | Al-Garni et al. | |
| 8,096,589 B2 | 1/2012 | De Aquino et al. | |
| 8,100,150 B2 | 1/2012 | Jung et al. | |
| 8,117,843 B2 | 2/2012 | Howard et al. | |
| 8,123,226 B2 | 2/2012 | Bell et al. | |
| 8,146,362 B2 | 4/2012 | Howard et al. | |
| 8,152,949 B2 | 4/2012 | Bailey et al. | |
| 8,172,481 B2 | 5/2012 | Luppi | |
| 8,182,176 B2 | 5/2012 | Bailey et al. | |
| 8,250,847 B2 | 8/2012 | Rapp et al. | |
| 8,256,469 B2 | 9/2012 | Felix-Henry | |
| 8,282,315 B2 | 10/2012 | Espinasse et al. | |
| 8,286,516 B2 | 10/2012 | Routeau et al. | |
| 8,353,162 B2 | 1/2013 | Nagurny | |
| 8,424,307 B2 | 4/2013 | Hsu et al. | |
| 8,444,182 B2 | 5/2013 | Kuo et al. | |
| 8,484,972 B2 | 7/2013 | Lau | |
| 8,540,012 B2 | 9/2013 | Nagurny et al. | |
| 8,561,406 B2 | 10/2013 | Kalina | |
| 8,567,194 B2 | 10/2013 | Bailey et al. | |
| 8,572,967 B1 | 11/2013 | Cowden et al. | |
| 8,578,714 B2 | 11/2013 | Nagurny et al. | |
| 8,584,462 B2 | 11/2013 | Kalina | |
| 2002/0168232 A1 | 11/2002 | Xu et al. | |
| 2003/0172758 A1 | 9/2003 | Anderson | |
| 2003/0221603 A1 | 12/2003 | Horton | |
| 2005/0155749 A1 | 7/2005 | Memory et al. | |
| 2008/0025799 A1 * | 1/2008 | Kawasaki | 405/198 |
| 2008/0295517 A1 | 12/2008 | Howard et al. | |
| 2009/0013690 A1 | 1/2009 | Marshall | |
| 2009/0077969 A1 | 3/2009 | Prueitt | |
| 2009/0158987 A1 * | 6/2009 | Ramachandran et al. | 114/264 |
| 2009/0178722 A1 | 7/2009 | Howard | |
| 2009/0217664 A1 | 9/2009 | Rapp et al. | |
| 2009/0294110 A1 | 12/2009 | Foust | |
| 2009/0301088 A1 | 12/2009 | Kuo et al. | |
| 2009/0308582 A1 | 12/2009 | Nagurny et al. | |
| 2010/0139272 A1 | 6/2010 | Howard et al. | |
| 2010/0180924 A1 | 7/2010 | Bailey et al. | |
| 2010/0275597 A1 | 11/2010 | Kuo | |
| 2011/0079375 A1 | 4/2011 | Nagurny et al. | |
| 2011/0120636 A1 | 5/2011 | Bailey et al. | |
| 2011/0127022 A1 | 6/2011 | Eller et al. | |
| 2011/0173978 A1 | 7/2011 | Rekret et al. | |
| 2011/0173979 A1 | 7/2011 | Krull et al. | |
| 2011/0272864 A1 | 11/2011 | Miller et al. | |
| 2011/0293379 A1 | 12/2011 | Halkyard et al. | |
| 2012/0011849 A1 | 1/2012 | Cole et al. | |
| 2012/0043755 A1 | 2/2012 | Van Ryzin et al. | |
| 2012/0073291 A1 | 3/2012 | Shapiro et al. | |
| 2012/0080164 A1 | 4/2012 | Nagurny et al. | |
| 2012/0080175 A1 | 4/2012 | Levings et al. | |
| 2012/0125561 A1 | 5/2012 | Levings et al. | |
| 2012/0167813 A1 | 7/2012 | Lambrakos et al. | |
| 2012/0183356 A1 | 7/2012 | Risi et al. | |
| 2012/0186781 A1 | 7/2012 | Dreyer et al. | |
| 2012/0195690 A1 | 8/2012 | Luo et al. | |
| 2012/0199335 A1 | 8/2012 | Maurer | |
| 2012/0201611 A1 | 8/2012 | Flores, Sr. et al. | |
| 2012/0207600 A1 | 8/2012 | Harris et al. | |
| 2012/0216737 A1 | 8/2012 | Luo et al. | |
| 2012/0234597 A1 | 9/2012 | Madden | |
| 2012/0241040 A1 | 9/2012 | Fogg | |
| 2012/0257931 A1 | 10/2012 | Tkaczyk et al. | |
| 2013/0037601 A1 | 2/2013 | Eller et al. | |
| 2013/0153171 A1 | 6/2013 | Nagurny et al. | |
| 2013/0160446 A1 | 6/2013 | Paya Diaz | |
| 2014/0014199 A1 | 1/2014 | Edwards | |
| 2014/0059825 A1 | 3/2014 | Riggs | |

(56) References Cited

U.S. PATENT DOCUMENTS

2014/0096519 A1    4/2014    Hermant et al.
2014/0096520 A1    4/2014    Paya Diaz

FOREIGN PATENT DOCUMENTS

| | | |
|---|---|---|
| EP | 1 788 335 | 5/2007 |
| JP | 55-001479 | 1/1980 |
| JP | 55-32896 | 3/1980 |
| JP | 57-157004 | 9/1982 |
| JP | 61-149507 | 7/1986 |
| JP | 02-271080 | 11/1990 |
| JP | 05-288481 | 11/1993 |
| JP | 05-340342 | 12/1993 |
| WO | WO 90/01659 | 2/1990 |
| WO | WO 96/07028 | 3/1996 |
| WO | WO 2007/064572 | 6/2007 |
| WO | WO 2011/035943 | 3/2011 |
| WO | WO 2011/091295 | 7/2011 |

OTHER PUBLICATIONS

Kang, Tack Jung, "Written Opinion of the International Searching Authority", International Application No. PCT/US2011/044015, mailed on Mar. 22, 2012 (4 pages).
Lindner, Nora, Notification Concerning Transmittal of International Preliminary Report on Patentability (Chapter I of the Patent Cooperation Treaty), International Application No. PCT/US2011/044015, mailed on Jan. 24, 2013 (6 pages).
Sun, Kim, "International Search Report", International Application No. PCT/US2012/050954, mailed on Feb. 15, 2013 (3 pages).
Sun, Kim, "Written Opinion of the International Searching Authority", International Application No. PCT/US2012/050954, mailed on Feb. 15, 2013 (5 pages).
Sun, Kim, "International Search Report", International Application No. PCT/US2012/050933, mailed on Feb. 15, 2013 (3 pages).
Sun, Kim, "Written Opinion of the International Searching Authority", International Application No. PCT/US2012/050933, mailed on Feb. 15, 2013 (5 pages).
Han, Joong Sub, "International Search Report", International Application No. PCT/US2012/050941, mailed on Feb. 27, 2013 (3 pages).
Han, Joong Sub, "Written Opinion of the International Searching Authority", International Application No. PCT/US2012/050941, mailed on Feb. 27, 2013 (5 pages).
Avery, William H. et al., "Renewable Energy From the Ocean—A Guide to OTEC", *The John's Hopkins University—Applied Physics Laboratory Series in Science and Engineering* (1994).
USPTO Office Action; Mar. 29, 2013; U.S. Appl. No. 12/691,663; 12 pp.
USPTO Office Action; Apr. 5, 2013; U.S. Appl. No. 12/691,655; 13 pp.
USPTO Office Action; Jul. 1, 2013; U.S. Appl. No. 13/209,865; 36 pp.
USPTO Office Action; Apr. 26, 2013; U.S. Appl. No. 13/183,047; 22 pp.
USPTO Office Action; Feb. 8, 2013; U.S. Appl. No. 13/011,619; 33 pp.
English translation; JP 61-149507; Jul. 1986; 12 pp.
Dounis, Laert, "USPTO Office Action", U.S. Appl. No. 13/209,865, mailed on Apr. 2, 2014 (37 pages).
Han, Joong Sub, "International Search Report", International Application No. PCT/US2013/065098, mailed on Jan. 21, 2014 (3 pages).
Han, Joong Sub, "Written Opinion of the International Searching Authority", International Application No. PCT/US2013/065098, mailed on Jan. 21, 2014 (6 pages).
Harris, Wesley G., "USPTO Final Office Action", U.S. Appl. No. 13/183,047, mailed Dec. 19, 2013 (10 pages).
Lindner, Nora, "Notification Concerning Transmittal of International Preliminary Report on Patentability (Chapter I of the Patent Cooperation Treaty)", International Application No. PCT/US2011/022115, mailed Jul. 24, 2012 (7 pages).
Mian, Shafiq A., "USPTO Final Office Action", U.S. Appl. No. 13/011,619, mailed Oct. 25, 2013 (16 pages).
Nakamura, Yukari, "International Preliminary Report on Patentability (Chapter I of the Patent Cooperation Treaty)", International Application No. PCT/US2012/050954, issued on Feb. 18, 2014, (7 pages).
Nguyen, Hoang M., "USPTO Final Office Action", U.S. Appl. No. 12/691,655, mailed Mar. 31, 2014 (13 pages).
Nguyen, Hoang M., "USPTO Office Action", U.S. Appl. No. 12/691,655, mailed Sep. 16, 2013 (10 pages).
Nickitas-Etienee, Athina, "International Preliminary Report on Patentability (Chapter I of the Patent Cooperation Treaty)", International Application No. PCT/US2012/050941, issued on Feb. 18, 2014 (7 pages).
Leo, Leonard R., "USPTO Non-Final Office Action", U.S. Appl. No. 13/209,944, mailed Jun. 18, 2014 (14 pages).
Nguyen, Hoang M., "USPTO Office Action", U.S. Appl. No. 12/691,663, mailed Feb. 25, 2014 (7 pages).
Mian, Shafiq A. "USPTO Non-Final Office Action", U.S. Appl. No. 13/011,619, mailed Jun. 6, 2014 (17 pages).
USPTO Final Office Action; Feb. 20, 2015; U.S. Appl. No. 13/209,944; 14 pp.
Japan Patent Office, Notice of Reasons for Rejection issued in JP 2012-550166 on Dec. 9, 2014 (8 pages).
Japan Patent Office, Notice of Reasons for Rejection in JP Appl. No. 2013-519829 on Mar. 31, 2015, 12 pages.
State Intellectual Property Office of the People's Republic of China, The First Office Action issued in CN 2011800152121 on Sep. 23, 2014 (5 pages).
State Intellectual Property Office of the People's Republic of China, The Second Office Action issued in CN 201180015212.1 on Mar. 18, 2015, 7 pages.
Supplementary European Search Report for EP Appl. No. 12823372.3 issued on Feb. 27, 2015, 5 pages.

\* cited by examiner

OCEAN THERMAL ENERGY CONVERSION POWER PLANT COLD WATER PIPE CONNECTION

TECHNICAL FIELD

This invention relates to ocean thermal energy conversion power plants and more specifically to floating, minimum heave platform, multi-stage heat engine, ocean thermal energy conversion power plants.

BACKGROUND

Energy consumption and demand throughout the world has grown at an exponential rate. This demand is expected to continue to rise, particularly in developing countries in Asia and Latin America. At the same time, traditional sources of energy, namely fossil fuels, are being depleted at an accelerating rate and the cost of exploiting fossil fuels continues to rise. Environmental and regulatory concerns are exacerbating that problem.

Solar-related renewable energy is one alternative energy source that may provide a portion of the solution to the growing demand for energy. Solar-related renewable energy is appealing because, unlike fossil fuels, uranium, or even thermal "green" energy, there are few or no climatic risks associated with its use. In addition, solar related energy is free and vastly abundant.

Ocean Thermal Energy Conversion ("OTEC") is a manner of producing renewable energy using solar energy stored as heat in the oceans' tropical regions. Tropical oceans and seas around the world offer a unique renewable energy resource. In many tropical areas (between approximately 20° north and 20° south latitude) the temperature of the surface sea water remains nearly constant. To depths of approximately 100 ft the average surface temperature of the sea water varies seasonally between 75° and 85° F. or more. In the same regions, deep ocean water (between 2500 ft and 4200 ft or more) remains a fairly constant 40° F. Thus, the tropical ocean structure offers a large warm water reservoir at the surface and a large cold water reservoir at depth, with a temperature difference between the warm and cold reservoirs of between 35° to 45° F. This temperature difference remains fairly constant throughout the day and night, with small seasonal changes.

The OTEC process uses the temperature difference between surface and deep sea tropical waters to drive a heat engine to produce electrical energy. OTEC power generation was identified in the late 1970's as a possible renewable energy source having a low to zero carbon footprint for the energy produced. An OTEC power plant, however, has a low thermodynamic efficiency compared to more traditional, high pressure, high temperature power generation plants. For example, using the average ocean surface temperatures between 80° and 85° F. and a constant deep water temperature of 40° F., the maximum ideal Carnot efficiency of an OTEC power plant will be 7.5 to 8%. In practical operation, the gross power efficiency of an OTEC power system has been estimated to be about half the Carnot limit, or approximately 3.5 to 4.0%. Additionally, analysis performed by leading investigators in the 1970's and 1980's, and documented in "Renewable Energy from the Ocean, a Guide to OTEC" William Avery and Chih Wu, Oxford University Press, 1994 (incorporated herein by reference), indicates that between one quarter to one half (or more) of the gross electrical power generated by an OTEC plant operating with a ΔT of 40° F. would be required to run the water and working fluid pumps and to supply power to other auxiliary needs of the plant. On this basis, the low overall net efficiency of an OTEC power plant converting the thermal energy stored in the ocean surface waters to net electric energy has not been a commercially viable energy production option.

An additional factor resulting in further reductions in overall thermodynamic efficiency is the loss associated with providing necessary controls on the turbine for precise frequency regulation. This introduces pressure losses in the turbine cycle that limit the work that can be extracted from the warm sea water.

This low OTEC net efficiency compared with efficiencies typical of heat engines that operate at high temperatures and pressures has led to the widely held assumption by energy planners that OTEC power is too costly to compete with more traditional methods of power production.

Indeed, the parasitic electrical power requirements are particularly important in an OTEC power plant because of the relatively small temperature difference between the hot and cold water. To achieve maximum heat transfer between the warm sea water and the working fluid, and between the cold sea water and the working fluid large heat exchange surface areas are required, along with high fluid velocities. Increasing any one of these factors can significantly increases the parasitic load on the OTEC plant, thereby decreasing net efficiency. An efficient heat transfer system that maximizes the energy transfer in the limited temperature differential between the sea water and the working fluid would increase the commercial viability of an OTEC power plant.

In addition to the relatively low efficiencies with seemingly inherent large parasitic loads, the operating environment of OTEC plants presents design and operating challenges that also decrease the commercial viability of such operations. As previously mentioned, the warm water needed for the OTEC heat engine is found at the surface of the ocean, to a depth of 100 ft or less. The constant source of cold water for cooling the OTEC engine is found at a depth of between 2700 ft and 4200 ft or more. Such depths are not typically found in close proximity to population centers or even land masses. An offshore power plant is required.

Whether the plant is floating or fixed to an underwater feature, a long cold water intake pipe of 2000 ft or longer is required. Moreover, because of the large volume of water required in commercially viable OTEC operations, the cold water intake pipe requires a large diameter (typically between 6 and 35 feet or more). Suspending a large diameter pipe from an offshore structure presents stability, connection and construction challenges which have previously driven OTEC costs beyond commercial viability.

Additionally, a pipe having significant length to diameter ratio that is suspended in a dynamic ocean environment can be subjected to temperature differences and varying ocean currents along the length of the pipe. Stresses from bending and vortex shedding along the pipe also present challenges. And surface influences such as wave action present further challenges with the connection between the pipe and floating platform. A cold water pipe intake system having desirable performance, connection, and construction consideration would increase the commercial viability of an OTEC power plant.

Environmental concerns associated with an OTEC plant have also been an impediment to OTEC operations. Traditional OTEC systems draw in large volumes of nutrient rich cold water from the ocean depths and discharge this water at or near the surface. Such discharge can effect, in a positive or adverse manner, the ocean environment near the OTEC plant, impacting fish stocks and reef systems that may be down current from the OTEC discharge.

SUMMARY

In some aspects, power generation plant uses ocean thermal energy conversion processes as a power source.

Further aspects relate to an offshore OTEC power plant having improved overall efficiencies with reduced parasitic loads, greater stability, lower construction and operating costs, and improved environmental footprint. Other aspects include large volume water conduits that are integral with the floating structure. Modularity and compartmentation of the multi-stage OTEC heat engine reduces construction and maintenance costs, limits off-grid operation and improves operating performance. Still further aspects provide for a floating platform having structurally integrated heat exchange compartments and provides for low movement of the platform due to wave action. The integrated floating platform may also provide for efficient flow of the warm water or cool water through the multi-stage heat exchanger, increasing efficiency and reducing the parasitic power demand. Associated system can promote an environmentally neutral thermal footprint by discharging warm and cold water at appropriate depth/temperature ranges. Energy extracted in the form of electricity reduces the bulk temperature to the ocean.

Further aspects relate to a floating, low heave OTEC power plant having an high efficiency, multi-stage heat exchange system, wherein the warm and cold water supply conduits and heat exchanger cabinets are structurally integrated into the floating platform or structure of the power plant.

In one aspect, an offshore structure for use with an OTEC system includes: a submerged spar having a lower portion comprising; a cold water intake comprising a domed terminus in fluid communication with a cold water pipe; a dry machinery space comprising one or more cold water supply pumps and one or more cold water pipe lifting and retention winches having lifting cable connected to the cold water pipe. Embodiments can include one or more of the following features.

In some embodiments, the cold water intake has a deck area of at least 10 percent the total deck area of the machinery space.

In some embodiments, the cold water intake occupies the central space of the dry machinery space.

In some embodiments, the cold water supply pumps are in fluid communication with the cold water intake and in fluid communication with a cold water distribution plenum that supplies cold water to one or more OTEC condensers.

In some embodiments, the lifting cable penetrates the hull though a dedicated hawse pipe.

In some embodiments, the offshore structure also includes a lifting lug housing located beneath the cold water intake and wherein the lifting cable is connected to a lifting lug on the top portion of the cold water pipe, the lifting lug adapted to engage and seal within the lifting lug housing. In some cases, the lifting lug housing further comprises a watertight top face seal and one or more watertight circumferential seals.

In some embodiments, the offshore structure also includes a ball lock system comprising: two or more lock compartments arranged below the cold water intake and adapted to allow the top portion of the cold water pipe to sit between the two or more lock compartments; an actuation motor and piston, the piston passing through a watertight seal; and a ball lock at the inward end of the piston. In some cases, the ball lock is adapted to engage with a mating surface on the cold water pipe upon activation of the piston. In some cases, the ball lock is reversibly engageable with the mating surface of the cold water pipe. In some cases, the two or more ball locks engage with a mating surface on the cold water pipe and prevent vertical or lateral movement of the cold water pipe in relation to the offshore structure.

In some aspects, methods of connecting a cold water pipe to an offshore OTEC structure include: passing one or more lifting cables from a dry machinery space through the lower submerged portion of an offshore structure via a dedicated through hull hasse pipe; connecting the one or more lifting cables to one or more lifting lugs on the top portion of a cold water pipe; and retracting the lifting cables so that the cold water pipe enters a cold water pipe receiving bay of the offshore structure and the one or more lifting lugs seat within one or more lifting lug housings to provide a watertight seal about the through hull from which the one or more lifting cables passed. The methods can also include drying the interior of the hawse pipe to prevent corrosion of the lifting cable after the lifting cable has retracted and the lifting lugs are seated in the lifting lug housings. The methods can also include extending one or more ball locks from the offshore structure to engage a mating surface on the cold water pipe and preventing vertical or horizontal movement of the cold water pipe in relation to the offshore structure.

In some aspects, a cold water pipe includes: a top portion configured to attach to the lower portion of an offshore structure, the top portion of the cold water pipe comprising: a circumferential structure embedded within the cold water pipe material; one or more lifting lugs anchored to the embedded circumferential structure; and two or more ball lock contact secured to the embedded structure for engagement with a ball lock system located in the lower portion of the offshore structure. Embodiments can include one or more of the following features.

In some embodiments, the embedded structure comprises steel.

In some embodiments, the embedded structure is a plurality of steel plates embedded about the top portion of the cold water pipe.

In some embodiments, the cold water pipe also includes a lower portion having a staved construction. In some cases, the upper portion of the cold water pipe comprises the same material as the staved lower portion of the cold water pipe. In some cases, the lifting lugs of the cold water pipes are connected to lifting cables leading to lifting winches in a dry machinery space in the lower portion of the offshore structure.

Still further aspects of the disclosure relate to a cold water pipe for use with an offshore OTEC facility, the cold water pipe being an offset staved, continuous pipe.

An aspect relates to a pipe that comprises an elongate tubular structure having an outer surface, a top end and a bottom end. The tubular structure comprises a plurality of first and second staved segments, each stave segment has a top portion and a bottom portion, wherein the top portion of the second stave segment is offset from the top portion of the first staved segment.

A further aspect relates to a pipe comprising a ribbon or a strake at least partially wound around the pipe on the outside surface of the tubular structure. The ribbon or strake can be circumferentially wound around the outer surface of the top portion of the pipe, the middle portion of the pipe, or the lower portion of the pipe. The ribbon or strake can be circumferentially wound around the entire length of the pipe. The ribbon or strake can be attached so as to lay substantially flat against the outer surface of the pipe. The ribbon or strake can be attached so as to protrude outwardly from the outer surface of the pipe. The ribbon or strake can be made of the same or different material as the pipe. The ribbon or strake can be adhesively bonded to the outer surface of the pipe, mechanically bounded to the outer surface of the pipe, or use a combination of mechanical and adhesive bonds to attach to the outer surface of the pipe.

Further aspects of the disclosure relate to an offset staved pipe wherein each stave segment further comprises a tongue on a first side and a groove on a second side for mating engagement with an adjacent stave segment. The offset stave pipe can include a positive locking system to mechanical couple a first side of one stave to the second side of a second stave. Stave can be joined vertically from the top portion of one stave to the bottom portion of an adjacent stave using biscuit joinery. In an alternative embodiment, the top portion of a stave and the bottom portion of a stave can each include a joining void, such that when the top portion of a first stave is joined with the bottom portion of a second stave, the joining voids align. A flexible resin can be injected into the aligned joining voids. The flexible resin can be used to fill gaps in any joined surfaces. In aspects of the disclosure the flexible resin is a methacrylate adhesive.

Individual staves of the current disclosure can be of any length. In aspects each stave segment is between 20 feet and 90 feet measured from the bottom portion to the top portion of the stave. Stave segments can be sized to be shipped by standard inter-modal container. Individual stave segments can be between 10 inches and 80 inches wide. Each stave segment can be between 1 inch and 24 inches thick.

In aspects of the disclosure stave segments can be pultruded, extruded, or molded. Stave segments can comprise polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyester, fiber reinforced polyester, vinyl ester, reinforced vinyl ester, concrete, ceramic, or a composite of one or more thereof.

In further aspects of the disclosure, a stave segment can comprise at least one internal void. The at least one void can be filled with water, polycarbonate foam, or syntactic foam.

In aspects of the disclosure, the pipe is a cold water intake pipe for an OTEC power plant.

A still further aspect of the disclosure relates to an offshore power generation structure comprising a submerged portion, the submerged portion further comprises: a heat exchange portion; a power generation portion; and a cold water pipe comprising a plurality of offset first and second stave segments.

Yet another aspect of the disclosure relates to a method of forming a cold water pipe for use in an OTEC power plant, the method comprises: forming a plurality of first and second stave segments joining alternating first and second stave segments such that the second stave segments are offset from the first stave segments to form a continuous elongate tube.

A further aspect of the disclosure relates to a submerged vertical pipe connection comprising: a floating structure having a vertical pipe receiving bay, wherein the receiving bay has a first diameter; a vertical pipe for insertion into the pipe receiving bay, the vertical pipe having a second diameter smaller than the first diameter of the pipe receiving bay; a partially spherical or arcuate bearing surface; and one or more movable detents, pinions or lugs operable with the bearing surface, wherein the detents define a diameter that is different than the first or second diameter when in contact with the bearing surface.

An additional aspect of the disclosure relates to a method of connecting a submerged vertical pipe to a floating platform comprising: providing a floating structure having a vertical pipe receiving bay, wherein the pipe receiving bay has a first diameter; providing a vertical pipe having a top end portion that has a second diameter that is less than the first diameter; inserting the top end portion of the vertical pipe into the receiving bay; providing a bearing surface for supporting the vertical pipe; extending one or more detents such that the one or more detents have a diameter that is different from the first or second diameters; contacting the one or more detents with the bearing surface to suspend the vertical pipe from the floating structure.

In aspects of the disclosure the one or more detents can be integral to the vertical pipe. The one or more detents can be integral to the receiving bay. The one or more detents comprise a first retracted position that defines a diameter less than the first diameter. The one or more detents comprise an extended position that defines a diameter greater than the first diameter. A bearing surface is integral to the pipe receiving bay and operable with the one or more detents. The bearing surface can comprise a spherical bearing surface. The one or more detents further comprise a mating surface configured to contact the bearing surface. The one or more detents further comprise a mating surface configured to contact the spherical bearing surface. The spherical bearing surface and the mating surface facilitate relative motion between the vertical pipe and the floating structure.

In still further aspects the one or more detents comprise a first retracted position that defines a diameter greater than the second diameter. The one or more detents comprise an extended position that defines a diameter less than the second diameter. A bearing surface is integral to the vertical pipe and operable with the one or more detents.

Aspects can include a drive for extending or retracting the detents, the drive being a hydraulically controlled drive, a pneumatically controlled drive; a mechanically controlled drive, an electrically controlled drive, or an electro-mechanically controlled drive.

Further aspects can include a pipe receiving bay including a first angled pipe mating surface; and a vertical pipe comprising a second angled pipe mating surface, wherein the first and second angled pipe mating surfaces are configured to cooperatively guide the vertical pipe during insertion of the vertical pipe into the pipe receiving bay.

In still further aspects, a static interface between the cold water pipe and the lower portion of the spar is provided comprising a receiving bay having a tapered lower surface and a contact pad for sealable engagement with a tapered collar surface of a cold water pipe lifting collar.

In an exemplary method of connecting a cold water pipe to a lower portion of a spar, the method provides the steps comprising: connecting lifting and retention cables to an upper portion of a cold water pipe, wherein the cold water pipe upper portion comprises a lifting collar having a tapered connecting surface, drawing the cold water pipe into a spar receiving bay using the lifting and retention cables, wherein the receiving bay comprises a tapered surface for receiving the cold water pipe upper portion and a contact pad; causing the tapered connecting surface of cold water pipe to make a sealable contact with the contact pad of the receiving bay, and mechanically fixing the lifting cables to maintain the sealable contact between the connecting surface and the contact pad.

In yet a further aspect, a cold water pipe is provided for static connection to the lower portion of a spar, wherein the cold water pipe comprises a first longitudinal portion and a second longitudinal portion; the first longitudinal portion being connected to the lower portion of the spar and the second longitudinal portion being more flexible than the first longitudinal portion. In some aspect a third longitudinal portion can be included in the cold water pipe that is less flexible than the second longitudinal portion. The third longitudinal portion can be more flexible then the first longitudinal portion. The third longitudinal portion can comprise 50% or more of the length of the cold water pipe. The first longitudinal portion can comprise 10% or less of the length of the cold water pipe. The second longitudinal portion can comprise between 1% and 30% of the length of the cold water pipe. The second longitudinal portion can allow for deflection of the third longitudinal portion of the cold water pipe of between 0.5 degrees and 30 degrees.

Further aspects of the disclosure relate to a floating, minimal heave OTEC power plant having an optimized multi-stage heat exchange system, wherein the warm and cold water supply conduits and heat exchanger cabinets are structurally integrated into the floating platform or structure of the power plant.

Still further aspects include a floating ocean thermal energy conversion power plant. A minimal heave structure, such as a spar, or modified semi-submersible offshore structure may comprise a first deck portion having structurally integral warm sea water passages, multi-stage heat exchange surfaces, and working fluid passages, wherein the first deck portion provides for the evaporation of the working fluid. A second deck portion is also provided having structurally integral cold sea water passages, multi-stage heat exchange surfaces, and working fluid passages, wherein the second deck portion provides a condensing system for condensing the working fluid from a vapor to a liquid. The first and second deck working fluid passages are in communication with a third deck portion comprising one or more vapor turbine driven electric generators for power generation.

In one aspect, an offshore power generation structure is provided comprising a submerged portion. The submerged portion further comprises a first deck portion comprising an integral multi-stage evaporator system, a second deck portion comprising an integral multi-stage condensing system; a third deck portion housing power generation and transformation equipment; a cold water pipe and a cold water pipe connection.

In a further aspect, the first deck portion further comprises a first stage warm water structural passage forming a high volume warm water conduit. The first deck portion also comprises a first stage working fluid passage arranged in cooperation with the first stage warm water structural passage to warm a working fluid to a vapor. The first deck portion also comprises a first stage warm water discharge directly coupled to a second stage warm water structural passage. The second stage warm water structural passage forms a high volume warm water conduit and comprises a second stage warm water intake coupled to the first stage warm water discharge. The arrangement of the first stage warm water discharge to the second stage warm water intake provides minimal pressure loss in the warm water flow between the first and second stage. The first deck portion also comprises a second stage working fluid passage arranged in cooperation with the second stage warm water structural passage to warm the working fluid to a vapor. The first deck portion also comprises a second stage warm water discharge.

In a further aspect, the submerged portion further comprises a second deck portion comprising a first stage cold water structural passage forming a high volume cold water conduit. The first stage cold water passage further comprises a first stage cold water intake. The second deck portion also comprises a first stage working fluid passage in communication with the first stage working fluid passage of the first deck portion. The first stage working fluid passage of the second deck portion in cooperation with the first stage cold water structural passage cools the working fluid to a liquid. The second deck portion also comprises a first stage cold water discharge directly coupled to a second stage cold water structural passage forming a high volume cold water conduit. The second stage cold water structural passage comprises a second stage cold water intake. The first stage cold water discharge and the second stage cold water intake are arranged to provide minimal pressure loss in the cold water flow from the first stage cold water discharge to the second stage cold water intake. The second deck portion also comprises a second stage working fluid passage in communication with the second stage working fluid passage of the first deck portion. The second stage working fluid passage in cooperation with the second stage cold water structural passage cool the working fluid within the second stage working fluid passage to a liquid. The second deck portion also comprises a second stage cold water discharge.

In a further aspect, the third deck portion may comprise a first and second vapor turbine, wherein the first stage working fluid passage of the first deck portion is in communication with the first turbine and the second stage working fluid passage of the first deck portion is in communication with the second turbine. The first and second turbine can be coupled to one or more electric generators.

In still further aspects, an offshore power generation structure is provided comprising a submerged portion, the submerged portion further comprises a four stage evaporator portion, a four stage condenser portion, a four stage power generation portion, a cold water pipe connection, and a cold water pipe.

In one aspect the four stage evaporator portion comprises a warm water conduit including, a first stage heat exchange surface, a second stage heat exchange surface, a third stage heat exchange surface, and fourth stage heat exchange surface. The warm water conduit comprises a vertical structural member of the submerged portion. The first, second, third and fourth heat exchange surfaces are in cooperation with first, second, third and fourth stage portions of a working fluid conduit, wherein a working fluid flowing through the working fluid conduit is heated to a vapor at each of the first, second, third, and fourth stage portions.

In one aspect the four stage condenser portion comprises a cold water conduit including, a first stage heat exchange surface, a second stage heat exchange surface, a third stage heat exchange surface, and fourth stage heat exchange surface. The cold water conduit comprises a vertical structural member of the submerged portion. The first, second, third and fourth heat exchange surfaces are in cooperation with first, second, third and fourth stage portions of a working fluid conduit, wherein a working fluid flowing through the working fluid conduit is heated to a vapor at each of the first, second, third, and fourth stage portions, with lower a lower $\Delta T$ at each successive stage.

In yet another aspect, first, second, third and fourth stage working fluid conduits of the evaporator portion are in communication with a first, second, third and fourth vapor turbine, wherein the evaporator portion first stage working fluid conduit is in communication with a first vapor turbine and exhausts to the fourth stage working fluid conduit of the condenser portion.

In yet another aspect, first, second, third and fourth stage working fluid conduits of the evaporator portion are in communication with a first, second, third and fourth vapor turbine, wherein the evaporator portion second stage working fluid conduit is in communication with a second vapor turbine and exhausts to the third stage working fluid conduit of the condenser portion.

In yet another aspect, first, second, third and fourth stage working fluid conduits of the evaporator portion are in communication with a first, second, third and fourth vapor turbine, wherein the evaporator portion third stage working fluid conduit is in communication with a third vapor turbine and exhausts to the second stage working fluid conduit of the condenser portion.

In yet another aspect, first, second, third and fourth stage working fluid conduits of the evaporator portion are in communication with a first, second, third and fourth vapor turbine, wherein the evaporator portion fourth stage working fluid conduit is in communication with a fourth vapor turbine and exhausts to the first stage working fluid conduit of the condenser portion.

In still a further aspect, a first electrical generator is driven by the first turbine, the fourth turbine, or a combination of the first and fourth turbine.

In still a further aspect, a second electrical generator is driven by the second turbine, the third turbine, or a combination of both the second and third turbine.

Additional aspects of the disclosure can incorporate one or more of the following features: the first and fourth turbines or the second and third turbines produce between 9 MW and 60 MW of electrical power; the first and second turbines produce approximately 55 MW of electrical power; the first and second turbines form one of a plurality of turbine-generator sets in an Ocean Thermal Energy Conversion power plant; the first stage warm water intake is free of interference from the second stage cold water discharge; the first stage cold water intake is free of interference from the second stage warm water discharge; the working fluid within the first or second stage working fluid passages comprises a commercial refrigerant. The working fluid comprises ammonia, propylene, butane, R-134, or R-22; the working fluid in the first and second stage working fluid passages increases in temperature between 12° F. and 24° F.; a first working fluid flows through the first stage working fluid passage and a second working fluid flows through the second stage working fluid passage, wherein the second working fluid enters the second vapor turbine at a lower temperature than the first working fluid enters the first vapor turbine; the working fluid in the first and second stage working fluid passages decreases in temperature between 12° F. and 24° F.; a first working fluid flows through the first stage working fluid passage and a second working fluid flows through the second stage working fluid passage, wherein the second working fluid enters the second deck portion at a lower temperature than the first working fluid enters the second deck portion.

Further aspects of the disclosure can also incorporate one or more of the following features: the warm water flowing within the first or second stage warm water structural passage comprises, warm sea water, geo-thermally heated water, solar heated reservoir water; heated industrial cooling water, or a combination thereof; the warm water flows between 500,000 and 6,000,000 gpm; the warm water flows at 5,440,000 gpm; the warm water flows between 300,000,000 lb/hr and 1,000,000,000 lb/hr; the warm water flows at 2,720,000 lb/hr; the cold water flowing within the first or second stage cold water structural passage comprises cold sea water, cold fresh water, cold subterranean water or a combination thereof; the cold water flows between 250,000 and 3,000,000 gpm; the cold water flows at 3,420,000 gpm; the cold water flows between 125,000,000 lb/hr and 1,750,000,000 lb/hr; the cold water flows at 1,710,000 lb/hr.

Aspects of the disclosure can also incorporate one or more of the following features: the offshore structure is a minimal heave structure; the offshore structure is a floating spar structure; the offshore structure is a semi-submersible structure.

A still further aspect of the disclosure can include a high-volume, low-velocity heat exchange system for use in an ocean thermal energy conversion power plant, comprising: a first stage cabinet that further comprises a first water flow passage for heat exchange with a working fluid; and a first working fluid passage; and a second stage cabinet coupled to the first stage cabinet, that further comprises a second water flow passage for heat exchange with a working fluid and coupled to the first water flow passage in a manner to minimize pressure drop of water flowing from the first water flow passage to the second water flow passage; and a second working fluid passage. The first and second stage cabinets comprise structural members of the power plant.

In one aspect, water flows from the first stage cabinet to the second stage cabinet and the second stage cabinet is beneath the first stage cabinet evaporator. In another aspect, water flows from the first stage cabinet to the second stage cabinet and the second stage cabinet is above the first stage cabinet in the condensers and below the first stage cabinet in the evaporators.

Aspects of the disclosure may have one or more of the following advantages: a continuous offset staved cold water pipe is lighter than segmented pipe construction; a continuous offset staved cold water pipe has less frictional losses than a segmented pipe; individual staves can be sized to for easy transportation to the OTEC plant operational site; staves can be constructed to desired buoyancy characteristics; OTEC power production requires little to no fuel costs for energy production; the low pressures and low temperatures involved in the OTEC heat engine reduce component costs and require ordinary materials compared to the high-cost, exotic materials used in high pressure, high temperature power generation plants; plant reliability is comparable to commercial refrigeration systems, operating continuously for several years without significant maintenance; reduced construction times compared to high pressure, high temperature plants; and safe, environmentally benign operation and power production. Additional advantages may include, increased net efficiency compared to traditional OTEC systems, lower sacrificial electrical loads; reduced pressure loss in warm and cold water passages; modular components; less frequent off-grid production time; minimal heave and reduced susceptibility to wave action; discharge of cooling water below surface levels, intake of warm water free from interference from cold water discharge.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements unless otherwise indicated.

DETAILED DESCRIPTION

This disclosure relates to electrical power generation using Ocean Thermal Energy Conversion (OTEC) technology. Aspects of the disclosure relate to a floating OTEC power plant having improved overall efficiencies with reduced parasitic loads, greater stability, lower construction and operating costs, and improved environmental footprint over previous OTEC power plants. Other aspects include large volume water conduits that are integral with the floating structure. Modularity and compartmentation of the multi-stage OTEC heat engine reduces construction and maintenance costs, limits off-grid operation and improves operating performance. Still further aspects provide for a floating platform having integrated heat exchange compartments and provides for minimal movement of the platform due to wave action. The integrated floating platform may also provide for efficient flow of the warm water or cool water through the multi-stage heat exchanger, increasing efficiency and reducing the parasitic power demand. Aspects of the disclosure promote a neutral thermal footprint by discharging warm and cold water at appropriate depth/temperature ranges. Energy extracted in the form of electricity reduces the bulk temperature to the ocean.

OTEC is a process that uses heat energy from the sun that is stored in the Earth's oceans to generate electricity. OTEC utilizes the temperature difference between the warmer, top layer of the ocean and the colder, deep ocean water. Typically this difference is at least 36° F. (20° C.). These conditions exist in tropical areas, roughly between the Tropic of Capricorn and the Tropic of Cancer, or even 20° north and south latitude. The OTEC process uses the temperature difference to power a Rankine cycle, with the warm surface water serving as the heat source and the cold deep water serving as the heat sink. Rankine cycle turbines drive generators which produce electrical power.

Figure 1:
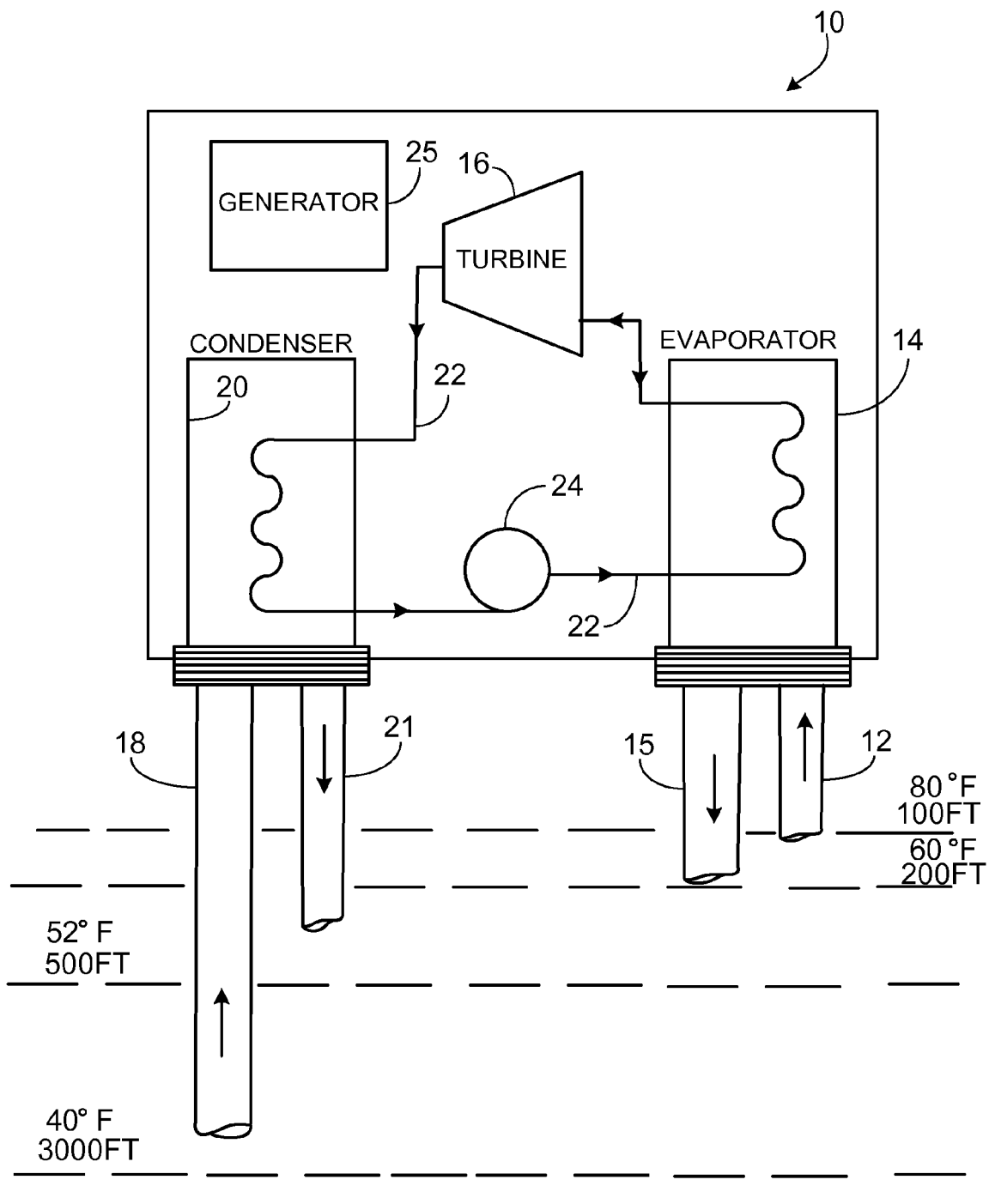
FIG. 1 illustrates an exemplary prior-art OTEC heat engine.

FIG. 1 illustrates a typical OTEC Rankine cycle heat engine 10 which includes warm sea water inlet 12, evaporator 14, warm sea water outlet 15, turbine 16, cold sea water inlet 18, condenser 20, cold sea water outlet 21, working fluid conduit 22 and working fluid pump 24.

In operation, heat engine 10 can use any one of a number of working fluids, for example commercial refrigerants such as ammonia. Other working fluids can include propylene, butane, R-22 and R-134a. Other commercial refrigerants can be used. Warm sea water between approximately 75° and 85° F., or more, is drawn from the ocean surface or just below the ocean surface through warm sea water inlet 12 and in turn warms the ammonia working fluid passing through evaporator 14. The ammonia boils to a vapor pressure of approximately 9.3 atm. The vapor is carried along working fluid conduit 22 to turbine 16. The ammonia vapor expands as it passes through the turbine 16, producing power to drive an electric generator 25. The ammonia vapor then enters condenser 20 where it is cooled to a liquid by cold sea water drawn from a deep ocean depth of approximately 3000 ft. The cold sea water enters the condenser at a temperature of approximately 40° F. The vapor pressure of the ammonia working fluid at the temperature in the condenser 20, approximately 51° F., is 6.1 atm. Thus, a significant pressure difference is available to drive the turbine 16 and generate electric power. As the ammonia working fluid condenses, the liquid working fluid is pumped back into the evaporator 14 by working fluid pump 24 via working fluid conduit 22.

The heat engine 10 of FIG. 1 is essentially the same as the Rankine cycle of most steam turbines, except that OTEC differs by using different working fluids and lower temperatures and pressures. The heat engine 10 of the FIG. 1 is also similar to commercial refrigeration plants, except that the OTEC cycle is run in the opposite direction so that a heat source (e.g., warm ocean water) and a cold heat sink (e.g., deep ocean water) are used to produce electric power.

Figure 2:
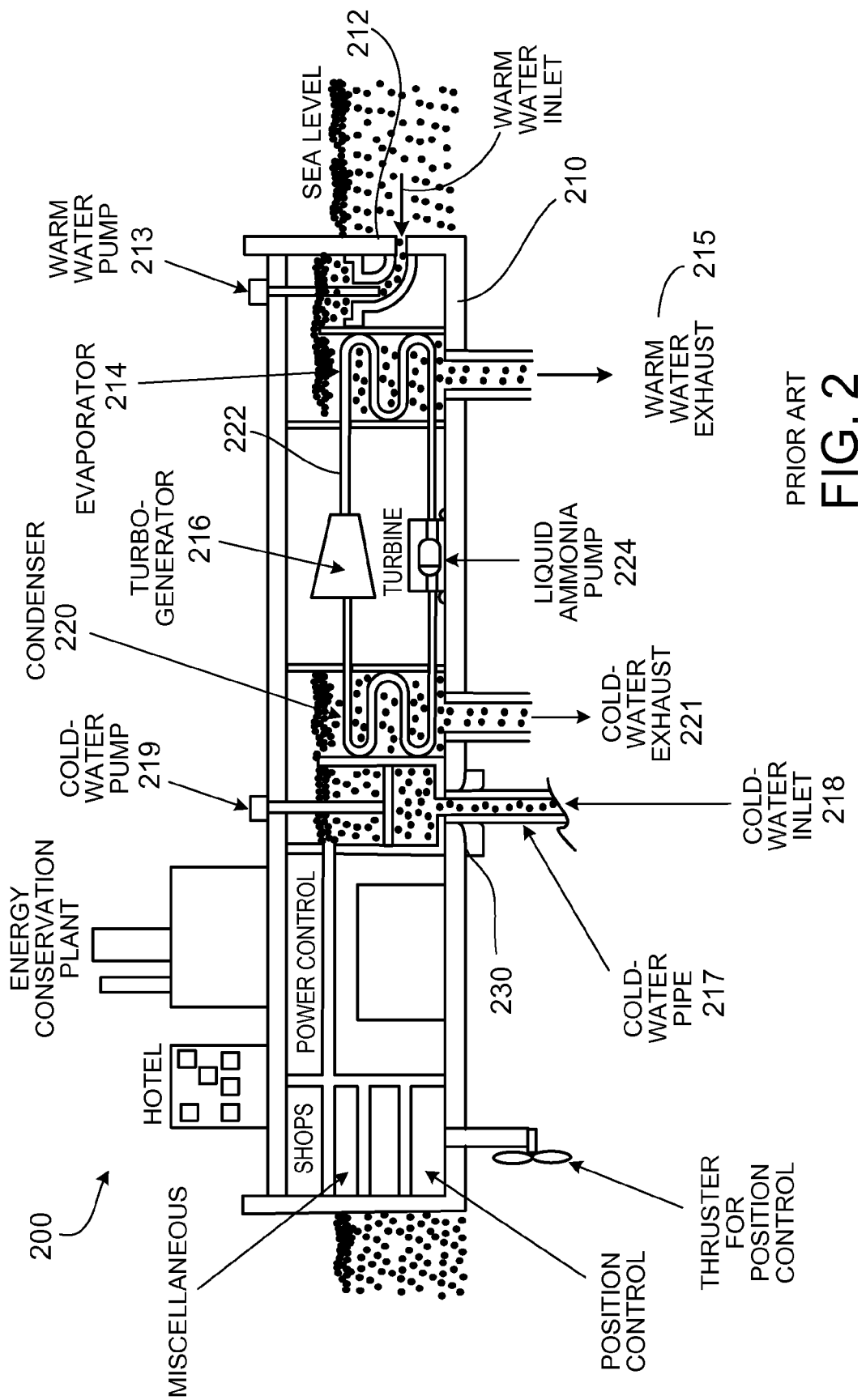
FIG. 2 illustrates an exemplary prior-art OTEC power plant.

FIG. 2 illustrates the typical components of a floating OTEC facility 200, which include: the vessel or platform 210, warm sea water inlet 212, warm water pump 213, evaporator 214, warm sea water outlet 215, turbine-generator 216, cold water pipe 217, cold sea water inlet 218, cold water pump 219, condenser 220, cold sea water outlet 221, working fluid conduit 22, working fluid pump 224, and pipe connections 230. OTEC facility 200 can also include electrical generation, transformation and transmission systems, position control systems such as propulsion, thrusters, or mooring systems, as well as various auxiliary and support systems (for example, personnel accommodations, emergency power, potable water, black and grey water, fire fighting, damage control, reserve buoyancy, and other common shipboard or marine systems).

Implementations of OTEC power plants utilizing the basic heat engine and system of FIGS. 1 and 2 have a relatively low overall efficiency of 3% or below. Because of this low thermal efficiency, OTEC operations require the flow of large amounts of water through the power system per kilowatt of power generated. This in turn requires large heat exchangers having large heat exchange surface areas in the evaporator and condensers.

Such large volumes of water and large surface areas require considerable pumping capacity in the warm water pump 213 and cold water pump 219, reducing the net electrical power available for distribution to a shore-based facility or on board industrial purposes. Moreover, the limited space of most surface vessels does not easily accommodate large volumes of water directed to and flowing through the evaporator or condenser. Indeed, large volumes of water require large diameter pipes and conduits. Putting such structures in limited space requires multiple bends to accommodate other machinery. And the limited space of typical surface vessels or structures does not easily facilitate the large heat exchange surface area required for maximum efficiency in an OTEC plant. Thus the OTEC systems and vessel or platform have traditional been large and costly. This has lead to an industry conclusion that OTEC operations are a high cost, low yield energy production option when compared to other energy production options using higher temperatures and pressures.

Aspects of the disclosure address technical challenges in order to improve the efficiency of OTEC operations and reduce the cost of construction and operation.

The vessel or platform 210 requires low motions to minimize dynamic forces between the cold water pipe 217 and the vessel or platform 210 and to provide a benign operating environment for the OTEC equipment in the platform or vessel. The vessel or platform 210 should also support cold and warm water inlet (218 and 212) volume flows, bringing in sufficient cold and warm water at appropriate levels to ensure OTEC process efficiency. The vessel or platform 210 should also enable cold and warm water discharge via cold and warm water outlets (221 and 215) well below the waterline of vessel or platform 210 to avoid thermal recirculation into the ocean surface layer. Additionally, the vessel or platform 210 should survive heavy weather without disrupting power generating operations.

The OTEC heat engine 10 should utilize a highly efficient thermal cycle for maximum efficiency and power production. Heat transfer in boiling and condensing processes, as well as the heat exchanger materials and design, limit the amount of energy that can be extracted from each pound of warm seawater. The heat exchangers used in the evaporator 214 and the condenser 220 require high volumes of warm and cold water flow with low head loss to minimize parasitic loads. The heat exchangers also require high coefficients of heat transfer to enhance efficiency. The heat exchangers can incorporate material and design that may be tailored to the warm and cold water inlet temperatures to enhance efficiency. The heat exchanger design should use a simple construction method with minimal amounts of material to reduce cost and volume.

Figure 3:
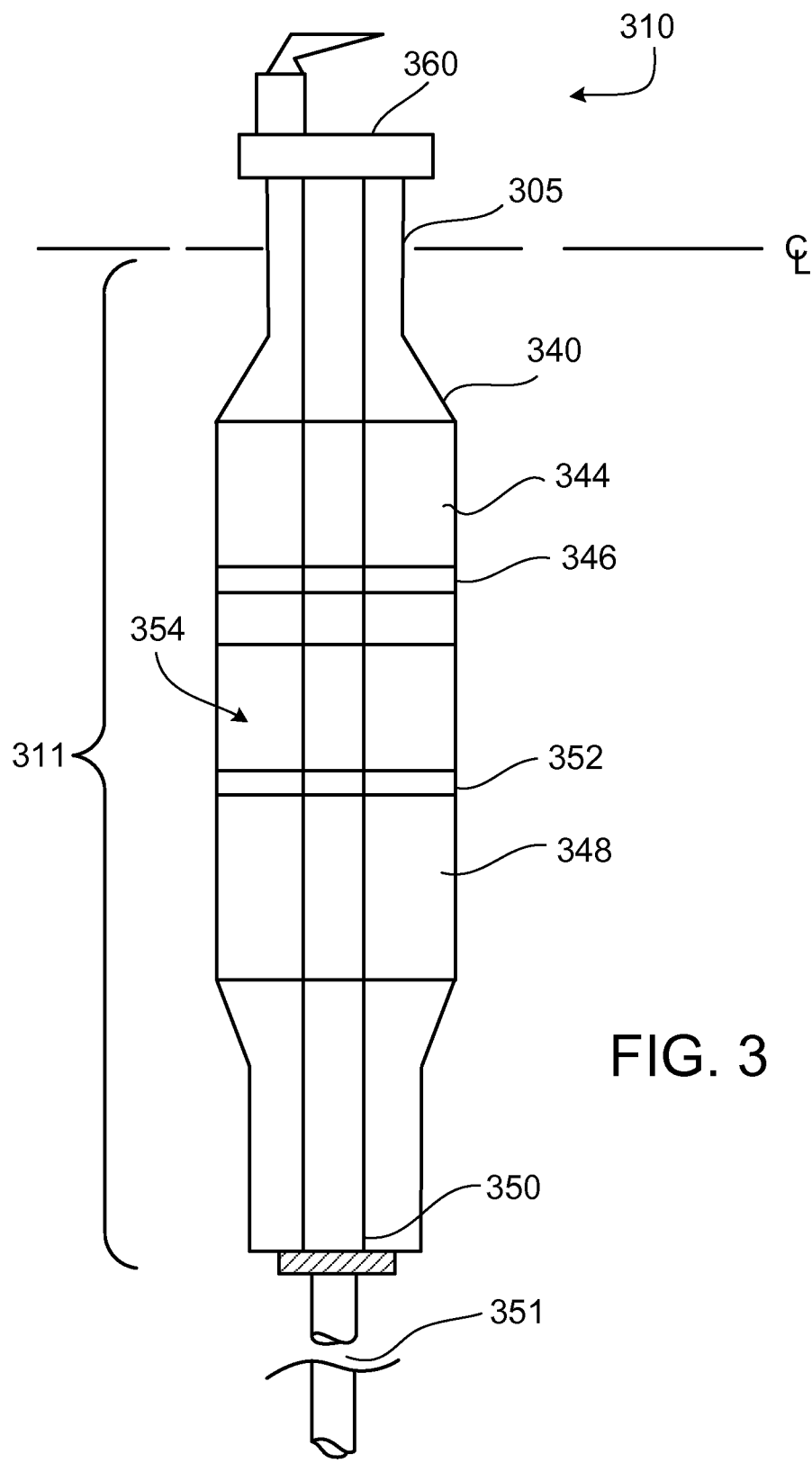
FIG. 3 illustrates an OTEC structure.

Turbo generators 216 should be highly efficient with minimal internal losses and may also be tailored to the working fluid to enhance efficiency FIG. 3 illustrates an implementation that enhances the efficiency of previous OTEC power plants and overcomes many of the technical challenges associated therewith. This implementation comprises a spar for the vessel or platform, with heat exchangers and associated warm and cold water piping integral to the spar.

OTEC spar 310 houses an integral multi-stage heat exchange system for use with an OTEC power generation plant. Spar 310 includes a submerged portion 311 below waterline 305. Submerged portion 311 comprises warm water intake portion 340, evaporator portion 344, warm water discharge portion 346, condenser portion 348, cold water intake portion 350, cold water pipe 351, cold water discharge portion 352, machinery deck portion 354, and deck house 360.

Figure 3A:
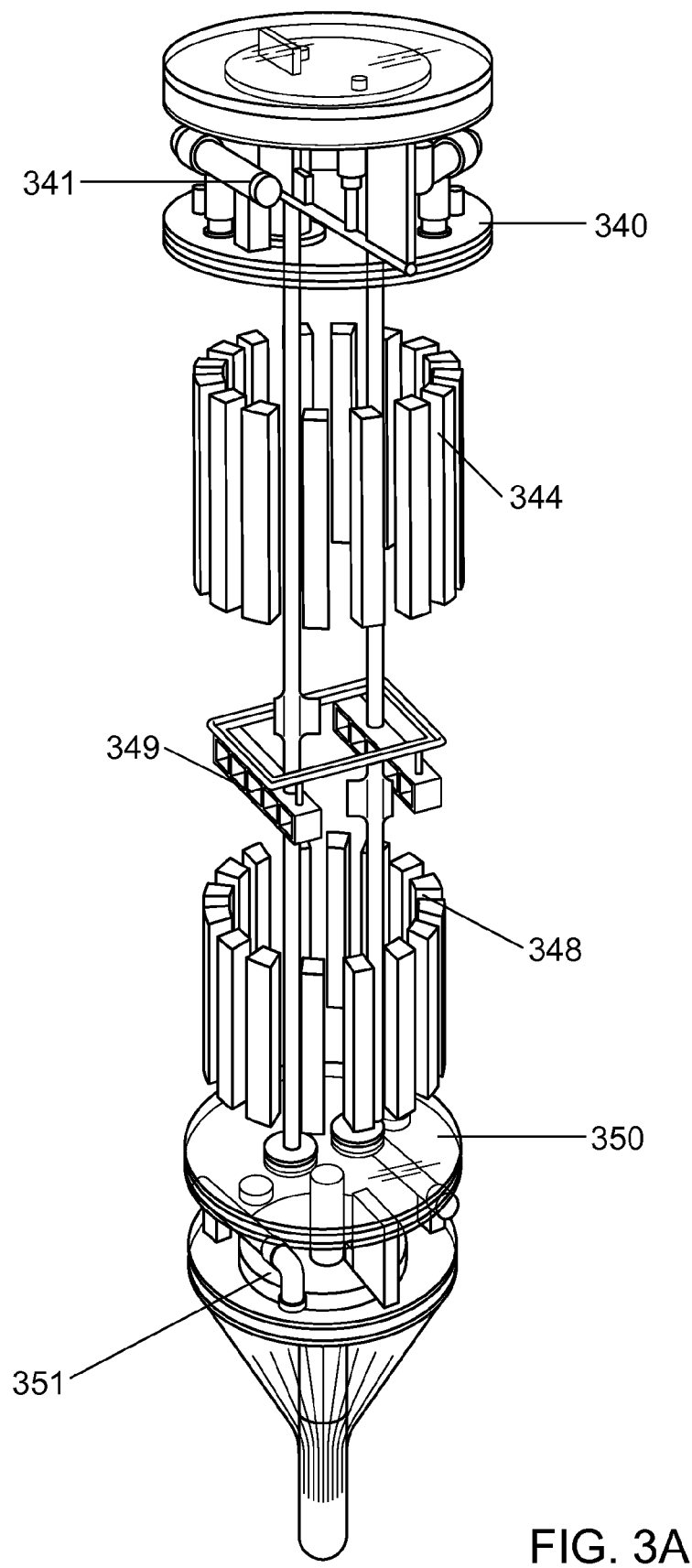
FIG. 3A illustrates an OTEC structure.

FIG. 3A illustrates an exemplary machinery layout, including warm water intake portion 340, warm water pump room 341, stacked evaporator portion 344, turbine generator 349, stacked condenser portion 348, cold water intake portion 350, and cold water pump room 351.

In operation, warm sea water of between 75° F. and 85° F. is drawn through warm water intake portion 340 and flows down the spar though structurally integral warm water conduits not shown. Due to the high volume water flow requirements of OTEC heat engines, the warm water conduits direct flow to the evaporator portion 344 of between 500,000 gpm and 6,000,000 gpm. Such warm water conduits have a diameter of between 6 ft and 35 ft, or more. Due to this size, the warm water conduits are vertical structural members of spar 310. Warm water conduits can be large diameter pipes of sufficient strength to vertically support spar 310. Alternatively, the warm water conduits can be passages integral to the construction of the spar 310.

Warm water then flows through the evaporator portion 344 which houses one or more stacked, multi-stage heat exchangers for warming a working fluid to a vapor. The warm sea water is then discharged from spar 310 via warm water discharge 346. Warm water discharge can be located or directed via a warm water discharge pipe to a depth at or close to an ocean thermal layer that is approximately the same temperature as the warm water discharge temperature to minimize environmental impacts. The warm water discharge can be directed to a sufficient depth to ensure no thermal recirculation with either the warm water intake or cold water intake.

Cold sea water is drawn from a depth of between 2500 and 4200 ft, or more, at a temperature of approximately 40° F., via cold water pipe 351. The cold sea water enters spar 310 via cold water intake portion 350. Due to the high volume water flow requirements of OTEC heat engines, the cold sea water conduits direct flow to the condenser portion 348 of between 500,000 gpm and 3,500,000 gpm. Such cold sea water conduits have a diameter of between 6 ft and 35 ft, or more. Due to this size, the cold sea water conduits are vertical structural members of spar 310. Cold water conduits can be large diameter pipes of sufficient strength to vertically support spar 310. Alternatively, the cold water conduits can be passages integral to the construction of the spar 310.

Cold sea water then flows upward to stacked multi-stage condenser portion 348, where the cold sea water cools a working fluid to a liquid. The cold sea water is then discharged from spar 310 via cold sea water discharge 352. Cold water discharge can be located or directed via a cold sea water discharge pipe to depth at or close to an ocean thermal layer that is approximately the same temperature as the cold sea water discharge temperature. The cold water discharge can be directed to a sufficient depth to ensure no thermal recirculation with either the warm water intake or cold water intake.

Machinery deck portion 354 can be positioned vertically between the evaporator portion 344 and the condenser portion 348. Positioning machinery deck portion 354 beneath evaporator portion 344 allows nearly straight line warm water flow from intake, through the multi-stage evaporators, and to discharge. Positioning machinery deck portion 354 above condenser portion 348 allows nearly straight line cold water flow from intake, through the multi-stage condensers, and to discharge. Machinery deck portion 354 includes turbo-generators 356. In operation warm working fluid heated to a vapor from evaporator portion 344 flows to one or more turbo generators 356. The working fluid expands in turbo generator 356 thereby driving a turbine for the production of electrical power. The working fluid then flows to condenser portion 348 where it is cooled to a liquid and pumped to evaporator portion 344.

The performance of heat exchangers is affected by the available temperature difference between the fluids as well as the heat transfer coefficient at the surfaces of the heat exchanger. The heat transfer coefficient generally varies with the velocity of the fluid across the heat transfer surfaces. Higher fluid velocities require higher pumping power, thereby reducing the net efficiency of the plant. A hybrid cascading multi-stage heat exchange system facilitates lower fluid velocities and greater plant efficiencies. The stacked hybrid cascade heat exchange design also facilitates lower pressure drops through the heat exchanger. And the vertical plant design facilitates lower pressure drop across the whole system. A hybrid cascading multi-stage heat exchange system is described in U.S. patent application Ser. No. 12/691,663, entitled "Ocean Thermal Energy Conversion Plant," filed on Jan. 21, 2010, the entire contents of which are incorporated herein by reference.

Cold Water Pipe

As described above, OTEC operations require a source of cold water. Variations in the temperature differential between warm and cool water can greatly influence the overall efficiency of the OTEC power plant. As such, water at approximately 40° F. is drawn from depths of between 2700 ft and 4200 ft or more, where the temperature is at or nearly at its maximum cold limit for the location of the OTEC power plant. A long intake pipe is needed to draw this cold water to the surface for use by the OTEC power plant. Such cold water pipes have been an obstacle to commercially viable OTEC operations because of the cost in constructing a pipe of suitable performance and durability.

Such cold water pipes have been an obstacle to commercially viable OTEC operations because of the cost in constructing a pipe of suitable performance and durability. OTEC requires large volumes of water at desired temperatures in order to ensure maximum efficiency in generating electrical power. Previous cold water pipe designs specific to OTEC operations have included a sectional construction. Cylindrical pipe sections were bolted or mechanically joined together in series until a sufficient length was achieved. Pipe sections were assembled near the plant facility and the fully constructed pipe was then upended and installed. This approach had significant drawbacks including stress and fatigue at the connection points between pipe sections. Moreover, the connection hardware added to the overall pipe weight, further complicating the stress and fatigue considerations at the pipe section connections and the connection between the fully assembled CWP and the OTEC platform or vessel.

The cold water pipe ("CWP") is used to draw water from the cold water reservoir at an ocean depth of between 2700 ft and 4200 ft or more. The cold water is used to cool and condense to a liquid the vaporous working fluid emerging from the power plant turbine. The CWP and its connection to the vessel or platform are configured to withstand the static and dynamic loads imposed by the pipe weight, the relative motions of the pipe and platform when subjected to wave and current loads of up to 100-year-storm severity, and the collapsing load induced by the water pump suction. The CWP is sized to handle the required water flow with low drag loss, and is made of a material that is durable and corrosion resistant in sea water.

The cold water pipe length is defined by the need to draw water from a depth where the temperature is approximately 40° F. The CWP length can be between 2000 feet and 4000 ft or more. In aspects, the cold water pipe can be approximately 3000 feet in length.

The CWP diameter is determined by the power plant size and water flow requirements. The water flow rate through the pipe is determined by the desired power output and OTEC power plant efficiency. The CWP can carry cold water to the cold water conduit of the vessel or platform at a rate of between 500,000 gpm and 3,500,000 gpm, or more. Cold water pipe diameters can be between 6 feet and 35 feet or more. In aspects, the CWP diameter is approximately 31 feet in diameter.

Previous cold water pipe designs specific to OTEC operations have included a sectional construction. Cylindrical pipe sections of between 10 and 80 feet in length were bolted or joined together in series until a sufficient length was achieved. Using multiple cylindrical pipe sections, the CWP could be assembled near the plant facility and the fully constructed pipe could be upended and installed. This approach had significant drawbacks including stress and fatigue at the connection points between pipe sections. Moreover, the connection hardware added to the overall pipe weight, further complicating the stress and fatigue considerations at the pipe section connections and the connection between the fully assembled CWP and the OTEC platform or vessel.

Figure 4:
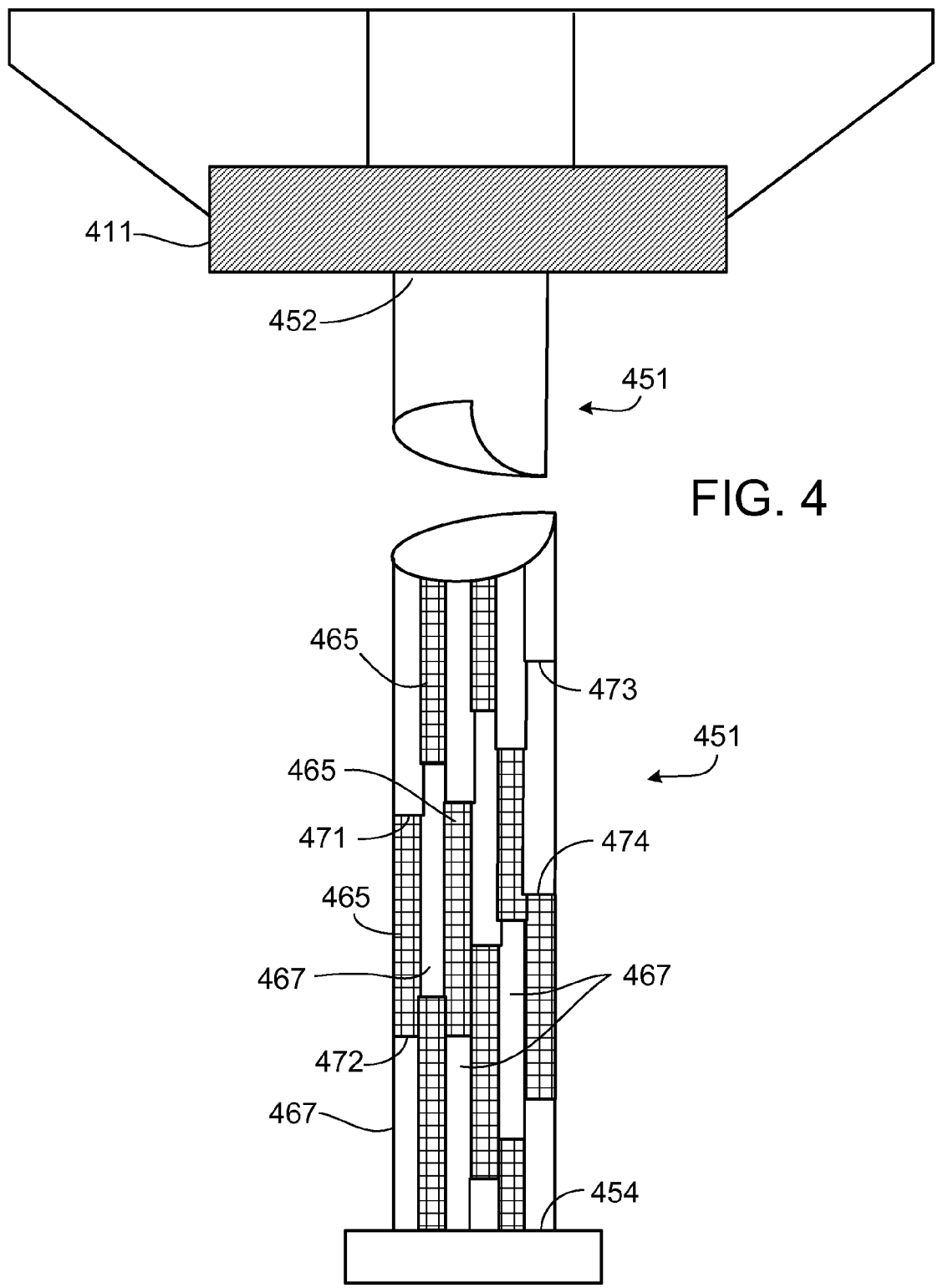
FIG. 4 illustrates an offset staved pipe of an OTEC structure.

Referring to FIG. 4 a continuous offset staved cold water pipe is shown. The cold water pipe 451 is free of sectional joints as in previous CWP designs, instead utilizing an offset stave construction. CWP 451 includes a top end portion 452 for connection to the submerged portion of the floating OTEC platform 411. Opposite top end portion 452 is bottom portion 454, which can include a ballast system, an anchoring system, and/or an intake screen.

CWP 451 comprises a plurality of offset staves constructed to form a cylinder. In an aspect the plurality of offset staves can include alternating multiple first staves 465 and multiple second staves 467. Each first stave includes a top edge 471 and a bottom edge 472. Each second stave includes a top edge 473 and a bottom edge 474. In an aspect, second stave 467 is vertically offset from an adjacent first stave portion 465 such that top edge 473 (of second stave portion 467) is between 3% and 97% vertically displaced from the top edge 471 (of first stave portion 465). In further aspects, the offset between adjacent staves can be approximately, 5%, 10%, 15%, 20%, 25%, 30%, 35%, 40%, 45%, 50% or more.

Figure 5:
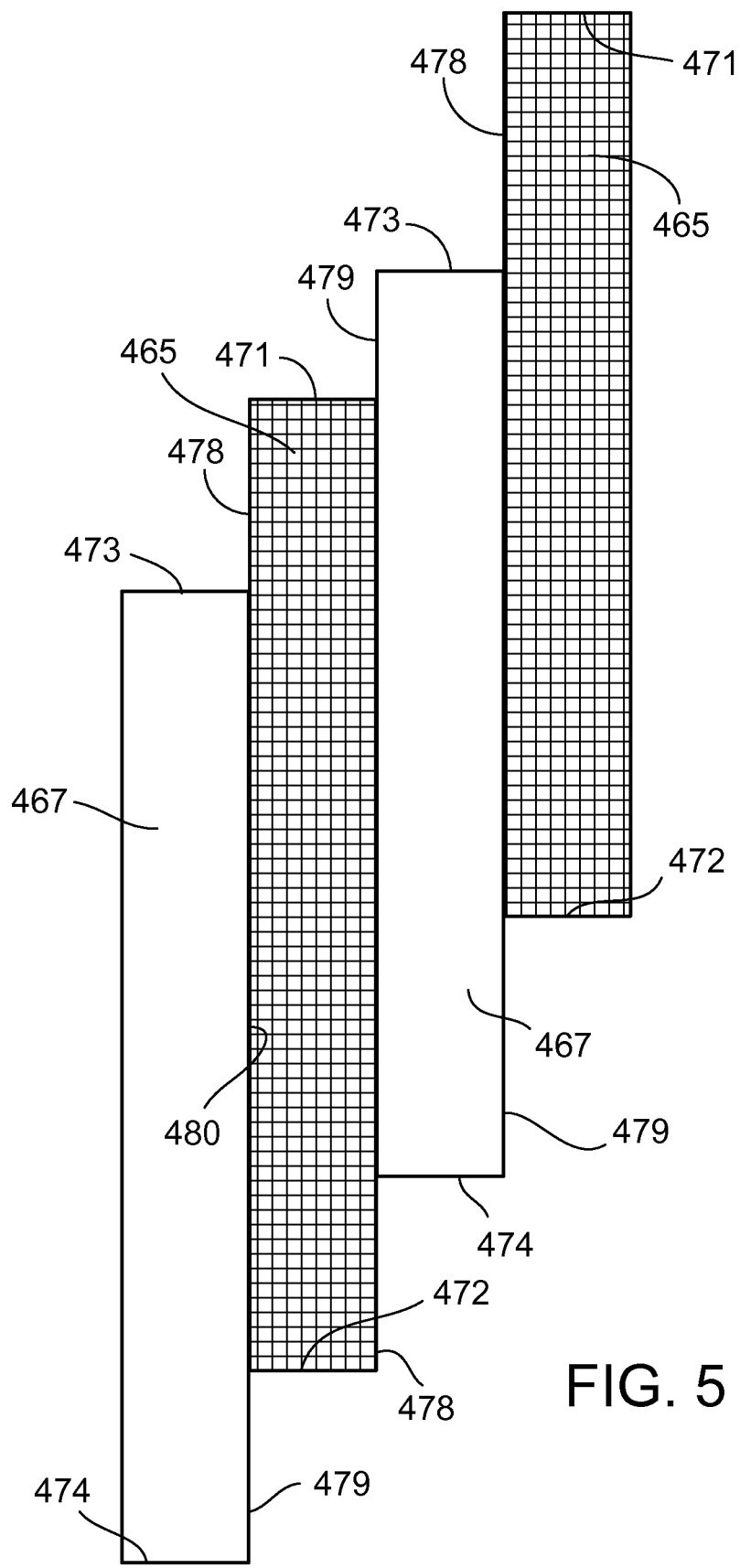
FIG. 5 illustrates a detailed image of an offset stave pattern.

FIG. 5 illustrates a detail view of an offsetting stave pattern of an aspect. The pattern includes multiple first staves 465, each having a top edge portion 471, bottom edge portion 472, connected edge 480 and offset edge 478. The pattern also includes multiple second staves 467, each having a top edge portion 473, a bottom edge portion 474, connected edge 480, and offset edge 479. In forming the cold water pipe, first stave section 465 is joined to second stave section 467 such that connected edge 480 is approximately 3% to 97% of the length of first stave section 465 when measured from the top edge 471 to the bottom edge 472. In an aspect, connected edge 480 is approximately 50%, 55%, 60%, 65%, 70%, 75%, 80%, 85%, or 90% of the length of the stave.

It will be appreciated that in a fully constructed pipe, first stave 465 can be joined to second stave 467 along connected edge 480. First stave 465 can also be connected to additional staves along offset edge 478, including an additional first stave portion, an additional second stave portion, or any other stave portion. Similarly, second stave 467 can be joined to first stave portion along connected edge 480. And second stave 467 can be joined to another stave along offset edge 479, including an additional first stave portion, an additional second stave portion, or any other stave portion.

In aspects, the connected edge 480 between the multiple first staves 465 and the multiple second staves 467 can be a consistent length or percentage of the stave length for each stave about the circumference of the pipe. The connected edge 480 between the multiple first staves 465 and the multiple second staves 465 can be a consistent length or percentage of the stave length for each stave along the longitudinal axis of the cold water pipe 451. In further aspects the connected edge 480 can vary in length between alternating first staves 465 and second staves 467.

As illustrated in FIG. 5, first stave 465 and second stave 467 have the same dimensions. In aspects, first stave 465 can be between 30 and 130 inches wide or more, 30 to 60 feet long, and between 1 and 24 inches thick. In an aspect the stave dimensions can be approximately 80 inches wide, 40 feet long, and 4 to 12 inches thick. Alternatively, first stave 465 can have a different length or width from second stave 467.

Figure 6:
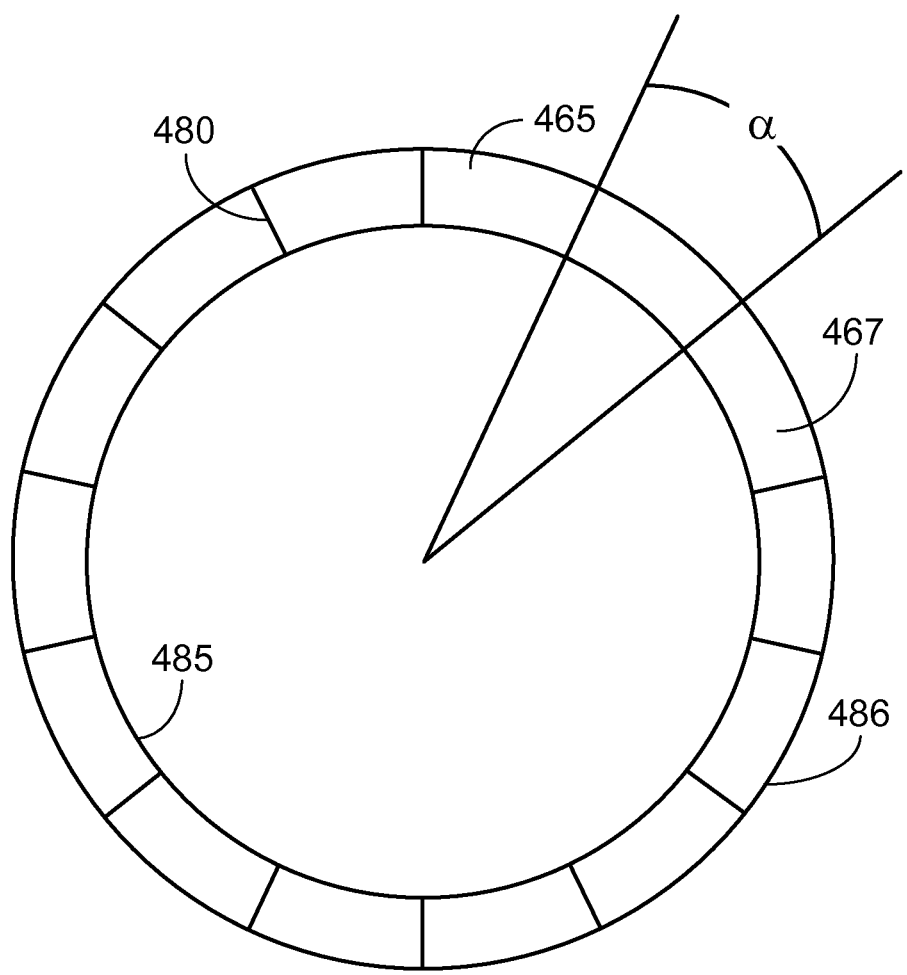
FIG. 6 illustrates a cross sectional view of an offset staved cold water pipe.

FIG. 6 illustrates a cross sectional view of cold water pipe 451 showing alternating first staves 465 and second staves 467. Each stave includes an inner surface 485 and an outer surface 486. Adjacent staves are joined along connected surface 480. Any two connected surfaces on opposite sides of a single stave define an angle α. The angle α is determined by dividing 360° by the total number of staves. In an aspect, a can be between 1° and 36°. In an aspect a can be 22.5° for a 16 stave pipe or 11.25° for a 32 stave pipe.

Individual staves of cold water pipe 451 can be made from polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyurethane, polyester, fiber reinforced polyester, nylon reinforce polyester, vinyl ester, fiber reinforced vinyl ester, nylon reinforced vinyl ester, concrete, ceramic, or a composite of one or more thereof. Individual staves can be molded, extruded, or pulltruded using standard manufacturing techniques. In one aspect, individual staves are pulltruded to the desired shape and form and comprise a fiber or nylon reinforced vinyl ester. Vinyl esters are available from Ashland Chemical of Covington, Ky.

In an aspect, staves are bonded to adjacent staves using a suitable adhesive. A flexible resin can be used to provide a flexible joint and uniform pipe performance. In aspects of the disclosure, staves comprising a reinforced vinyl ester are bonded to adjacent staves using a vinyl ester resin. Methacrylate adhesives can also be used, such as MA560-1 manufactured by Plexis Structural Adhesives of Danvers, Mass.

Figure 7A:
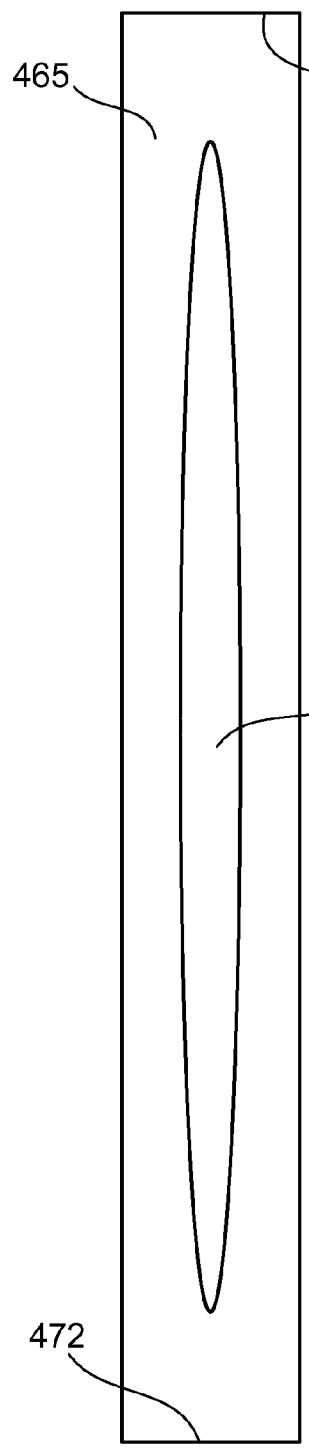
FIGS. 7A-C illustrate various views of individual staves.
Figure 7B:
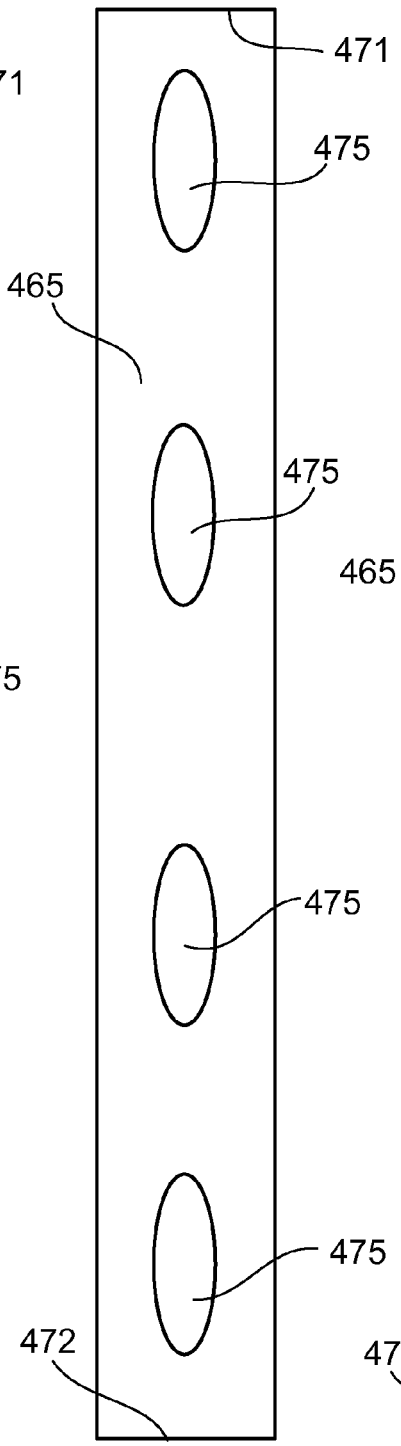
Figure 7C:
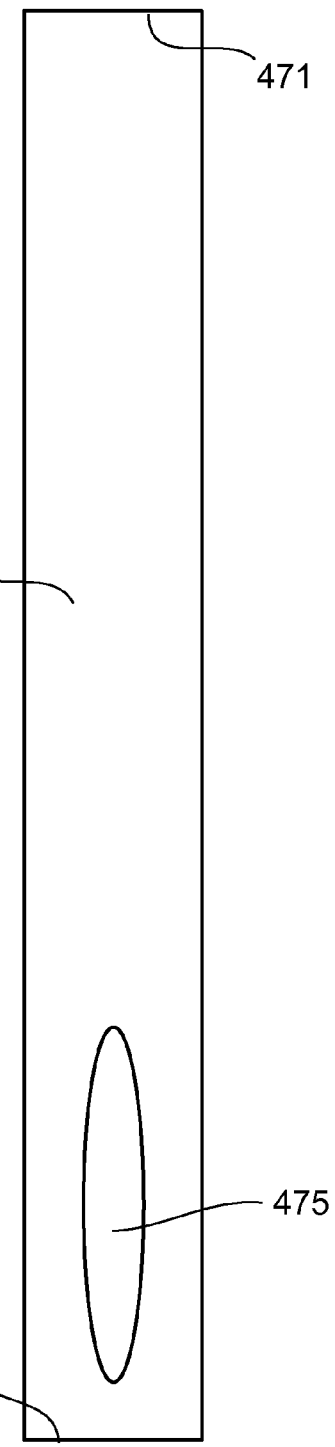

Referring to FIGS. 7A-7C, various stave constructions are shown wherein an individual stave 465 includes a top edge 471, a bottom edge 472 and one or more voids 475. Void 475 can be hollow, filled with water, filled with a resin, filled with an adhesive, or filled with a foam material, such as syntactic foam. Syntactic foam is a matrix of resin and small glass beads. The beads can either be hollow or solid. Void 475 can be filled to influence the buoyancy of the stave and/or the cold water pipe 451. FIG. 7A illustrates a single void 475. In an aspect multiple voids 475 can be equally spaced along the length of the stave, as illustrated in FIG. 7B. In an aspect, one or more voids 475 can be placed toward one end of the stave, for example toward the bottom edge 472, as illustrated in FIG. 7C.

Figure 8:
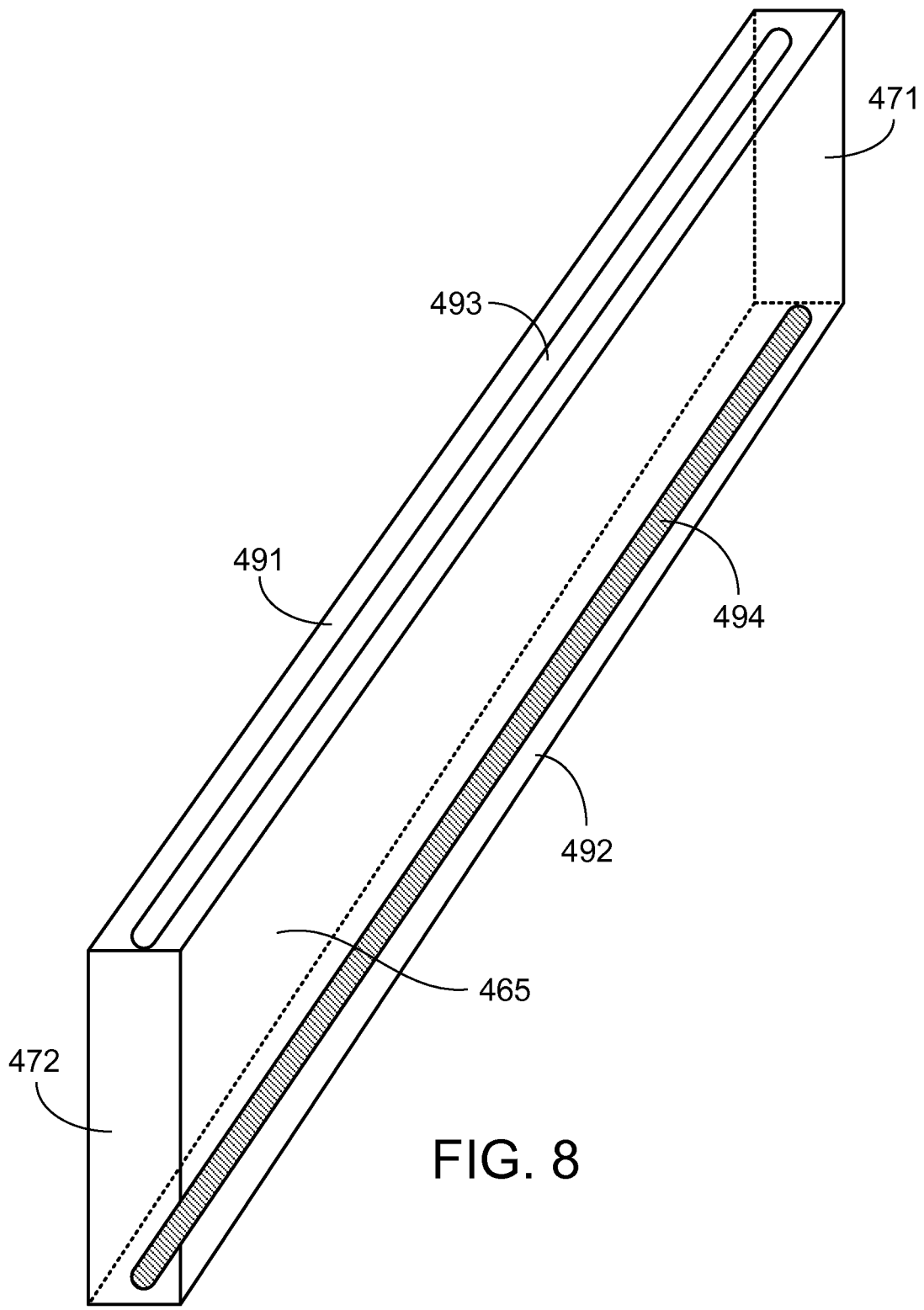
FIG. 8 illustrates a tongue and groove arrangement of an individual stave.

Referring to FIG. 8, each individual stave 465 can include a top edge 471, a bottom edge 472, a first longitudinal side 491 and a second longitudinal side 492. In an aspect, longitudinal side 491 includes a joinery member, such as tongue 493. The joinery member can alternatively include biscuits, half-lap joints, or other joinery structures. Second longitudinal side 492 includes a mating joinery surface, such as groove 494. In use, the first longitudinal side 491 of a first stave mates or joins with the second longitudinal side 492 of a second stave. Though not shown, joining structures, such as tongue and groove, or other structures can be used at the top edge 471 and the bottom edge 472 to join a stave to a longitudinally adjacent stave.

In aspects of the disclosure, first longitudinal side can include a positive snap lock connection 497 for mating engagement with second longitudinal side 492. Positive snap lock connections or snap lock connections are generally described in U.S. Pat. No. 7,131,242, incorporated herein by reference in its entirety. The entire length of tongue 493 can incorporate a positive snap lock or portions of tongue 493 can include a positive snap lock. Tongue 493 can include snap rivets. It will be appreciated that where tongue 493 includes a snap locking structure, an appropriate receiving structure is provided on the second longitudinal side having groove 494.

Figure 9:
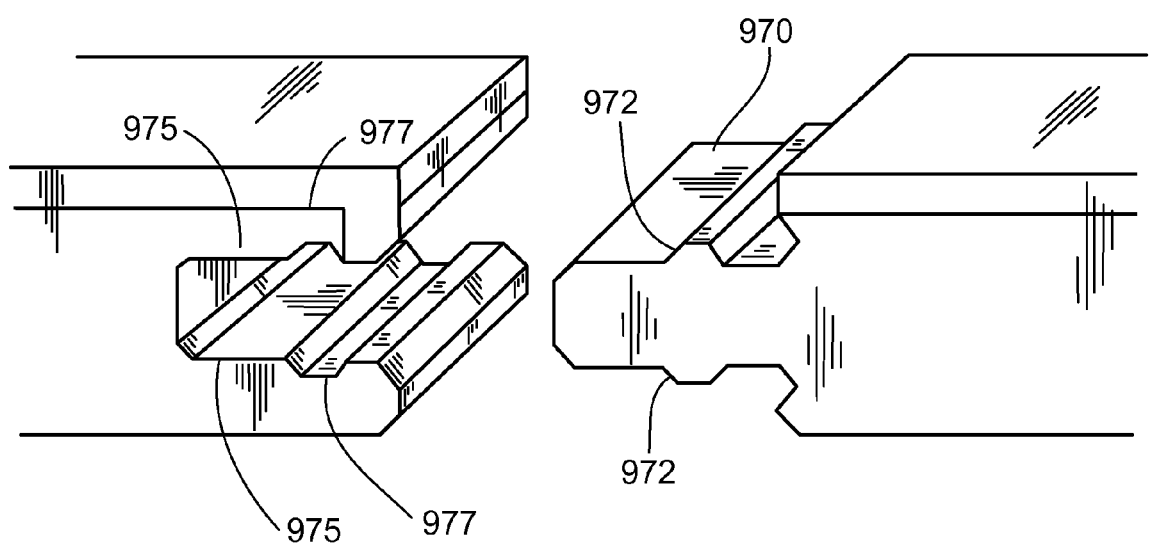
FIG. 9 illustrates a positive snap lock between two staves.

FIG. 9 illustrates an exemplary positive snap lock system, wherein male portion 970 includes collar 972. Male portion 970 mechanically engages with receiving portion 975 with include recessed collar mount 977. In use, male portion 970 is inserted into receiving portion 975 such that collar portion 972 engages recessed collar mount 977, thereby allowing insertion of the male portion 970 but preventing its release or withdrawal.

Positive snap locking joints between staved portions of the offset staved pipe can be used to mechanically lock two staved portion together. The positive snap lock joints can be used alone or in combination with a resin or adhesive. In an aspect, a flexible resin is used in combination with the positive snap lock joint.

Figure 10:
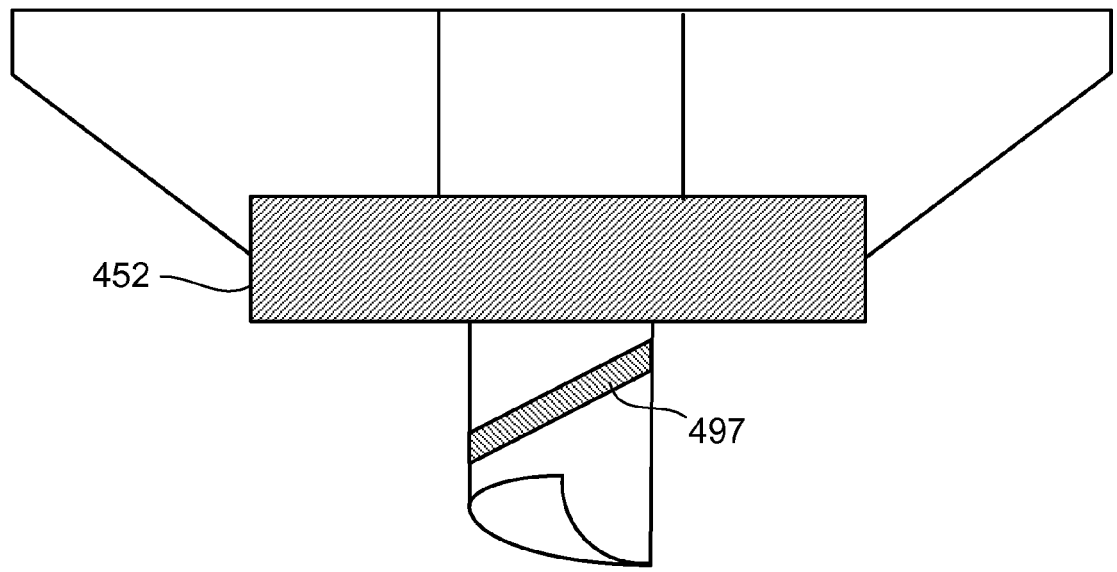
FIG. 10 illustrates an offset staved cold water pipe incorporating a reinforcing strake.
Figure 10:
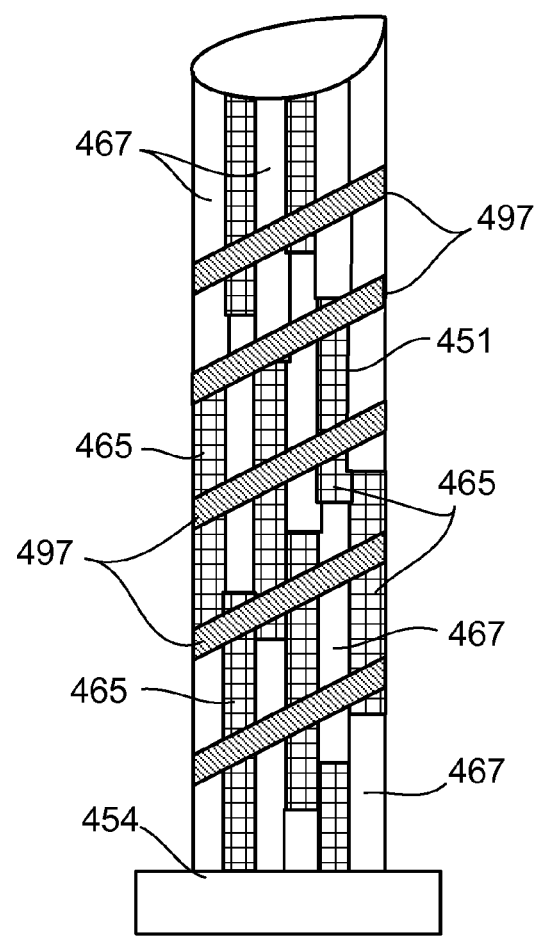

FIG. 10 illustrates a cold water pipe 451 having an offset stave construction comprising multiple alternating first staves 465 and second staves 467 and further comprising a spirally wound ribbon 497 covering at least a portion of the outer surface of cold water pipe 451. In aspects the ribbon is continuous from the bottom portion 454 of cold water pipe 451 to the top portion 452 of the cold water pipe 451. In other aspects the ribbon 497 is provided only in those portions of pipe 451 that experience vortex shedding due to movement of water past the cold water pipe 451. Ribbon 497 provides radial and longitudinal support to cold water pipe 451. Ribbon 497 also prevents vibration along the cold water pipe and reduces vortex shedding due to ocean current action.

Ribbon 491 can be the same thickness and width as an individual stave of cold water pipe 451 or can be two, three, four or more time the thickness and up to 10 times (e.g., 2, 3, 4, 5, 6, 7, 8, 9 or 10 times) the width of an individual stave.

Ribbon 491 can be mounted on the outside surface of the cold water pipe so as to lay substantially flat along the outside surface. In an embodiment, ribbon 491 can protrude outwardly from the outside surface of cold water pipe 451 so as to form a spirally wound strake. In aspects of the disclosure, a fin, blade or foil can be attached to various portions of ribbon or strake 491. Such fins can form a helix wounding around a portion of the cold water pipe or winding the entire length of the cold water pipe. Fins can be angled and provide about the strake in any number to prevent vortex conditions caused by the cold water pipe. In some aspects the fins can protrude from the pipe surface a distance of between $\frac{1}{32}$ and $\frac{1}{3}$ of the pipe diameter (e/g, about $\frac{1}{32}$ of the pipe diameter, about $\frac{1}{16}^{th}$ the pipe diameter, about $\frac{1}{8}^{th}$ the pipe diameter, about $\frac{1}{7}^{th}$ the pipe diameter, about $\frac{1}{6}^{th}$ the pipe diameter, about $\frac{1}{5}^{th}$ the pipe diameter, about $\frac{1}{4}$ the pipe diameter, and about $\frac{1}{3}^{rd}$ the pipe diameter).

Ribbon 491 can be of any suitable material compatible with the material of the multiple staves forming cold water pipe 451, including: polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyurethane, polyester, fiber reinforced polyester, vinyl ester, reinforced vinyl ester, concrete, ceramic, or a composite of one or more thereof. Ribbon 491 can be molded, extruded, or pulltruded using standard manufacturing techniques. In one aspect, ribbon 491 is pulltruded to the desired shape and form and comprises a fiber or nylon reinforced vinyl ester similar to that used with the staves of cold water pipe 451. Ribbon 491 can be joined to cold water pipe 451 using a suitable adhesive or resin including the resins of any of the materials above.

In some aspects, ribbon 491 is not continuous along the length of cold water pipe 451. In some aspects, ribbon 491 is not continuous about the circumference of cold water pipe 451. In some aspects, ribbon 491 comprises vertical strips adhered to the outside surface of the cold water pipe 451. In some aspects, where radial or other structural support is required, ribbon 491 can be a circumferential support member around the outside surface of the cold water pipe.

Ribbon 491 can be adhesively bonded or adhered to the outside surface of the cold water pipe, using a suitable flexible adhesive. In an aspect, ribbon 491 can be mechanically coupled to the outside surface of cold water pipe 451 using multiple positive snap locks.

Figure 11:
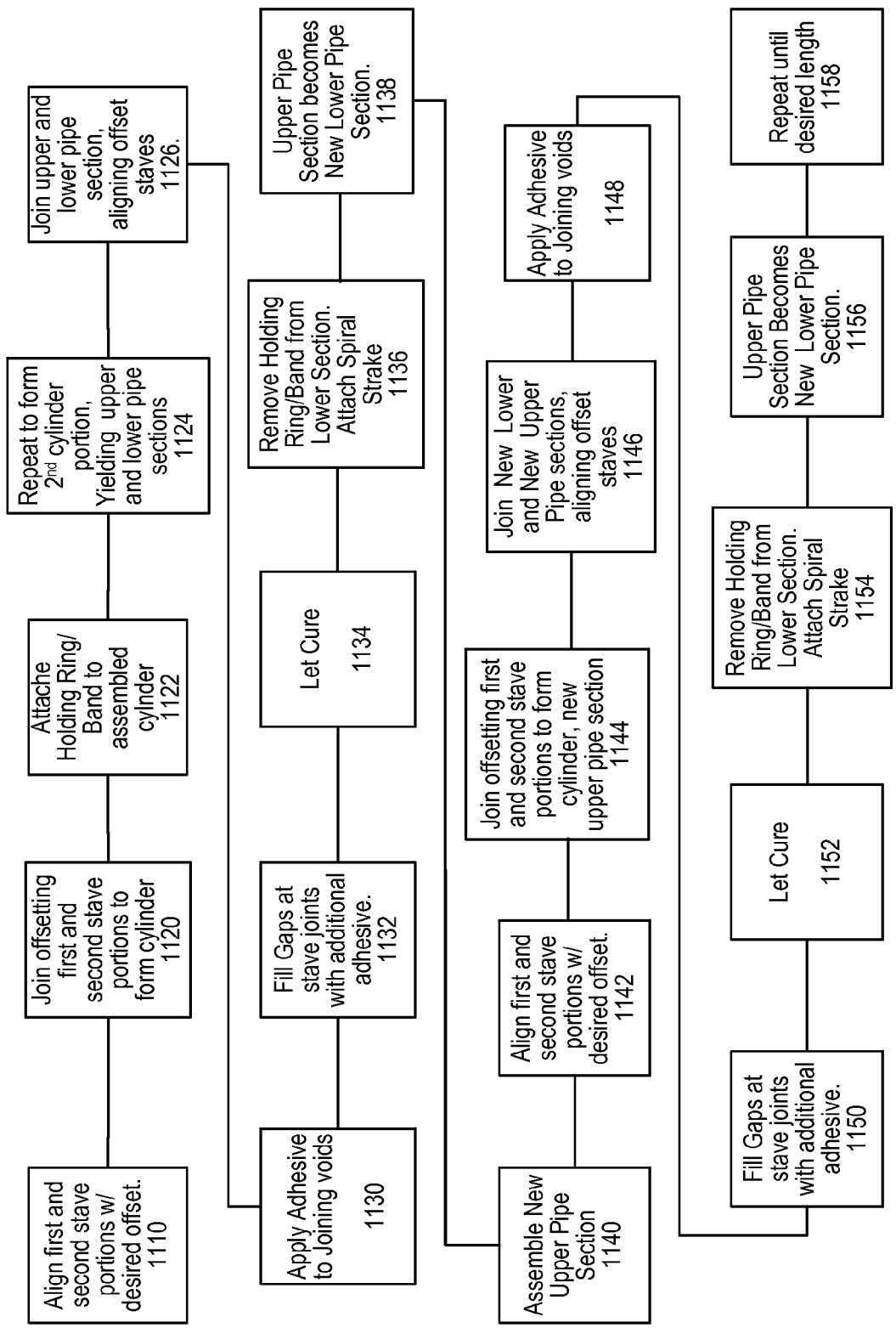
FIG. 11 illustrates a method of cold water pipe construction.

With regard to FIG. 11, an exemplary method of assembling a cold water pipe provides for the efficient transport and assembly of the cold water pipe 451. Vertical cylindrical pipe sections are assembled by aligning 1110 alternating first and second stave portions to have the desired offset as described above. The first and second stave portions are then joined 1120 to form a cylindrical pipe section. The offset first and second staves can be joined using any of a variety of joining methods. In an aspect the multiple offset first and second stave portions are joined using a tongue and groove arrangement and a flexible adhesive. In an aspect the multiple first and second staved portions are joined using a mechanical positive snap lock. A combination of tongue and groove, snap lock mechanisms, and flexible adhesives can be used.

After joining 1120 the multiple first and second stave portions to form a cylindrical pipe section having offset first and second stave portions, a retaining band, inflatable sleeve or other jig can be attached 1122 to the cylindrical pipe section to provide support and stability to the pipe section. The steps of aligning 1110 and joining 1120 multiple offset first and second stave portions can be repeated 1124 to form any number of prefabricated cylindrical pipe sections. It will be appreciated that the cylindrical pipe section can be prefabricated at the OTEC plant facility or remotely and then transported to the OTEC plant facility for additional construction to form the fully assembled cold water pipe 451.

Having assembled at least two cylindrical pipe sections having offset staves, an upper and lower cylindrical pipe sections are joined 1126 and the offset staves of each pipe section are aligned. A flexible adhesive can be applied 1130 to the butt joint of the offset staves of the upper and lower cylindrical pipe sections. The staves of the two pipe sections can be joined using a variety of end butt joints including biscuit joinery. In an aspect, the offset staves of the upper and lower cylindrical pipe portions can be provided with aligning joining voids which in turn can be filled with a flexible adhesive.

Gaps in and joints between pipe sections or between and individual staves can be filled 1132 with additional flexible resin. Once the two pipe sections have been joined and the resin applied where needed, the two pipe sections are allowed to cure 1134.

The retaining band is then removed 1136 from the lower pipe section and a spirally wound strake is attached thereto. The spirally wound strake can be attached using adhesive bonding, mechanical bonding, for example positive snap locks, or a combination of the adhesive and mechanical bonding.

In an aspect of the method of assembly, after the spiral strake is attached to the lower pipe section, the entire pipe assembly can be shifted, for example lowered, so that the previous upper pipe portion becomes the new lower pipe portion, 1138. Then a new upper cylindrical pipe section is assembled 1140 in a similar manner as described above. That is, first and second stave portions are aligned 1142 to achieve the desired offset. The first and second stave portions are then joined 1144 to form a new cylindrical pipe section, e.g., new upper pipe section. As previously mentioned, a retaining band, inflatable sleeve or other jig can be used to provide support and stability to the cylindrical pipe section during construction of the cold water pipe 451.

Having assembled new upper pipe section 1144, the offset staves of the new lower pipe section and the new upper pipe section are aligned and drawn together 1146. Adhesive or flexible resin is applied 1148 to the end butt joints as described above, for example in conjunction with biscuit joinery or with aligning joining voids. Any gaps between the new lower pipe section and the new upper pipe section or between any two stave portions can be filled 1150 with additional flexible resin. The entire assembly can then be left to cure 1152. The retaining jig can be removed 1154 as before and the spiral strake can be attached to the new lower portion. As before, the entire pipe assembly can be shifted to provide for the next cylindrical pipe section. In this manner, the method can be repeated until the desired pipe length is achieved.

It will be appreciated that joining cylindrical pipe sections having offset staves can be accomplished in a number of manners consistent with the present disclosure. The method of joining offset staves provides for a continuous pipe without the need for bulky, heavy or interfering joining hardware between the pipe segments. As such a continuous pipe having nearly uniform material properties, including flexibility and rigidity, is provided.

Example:

A cold water pipe assembly is provided that facilitates on site construction of a continuous, offset staved pipe of approximately 3000 feet. Additionally the staved design accounts for adverse shipping and handling loads traditionally experienced by segmented pipe construction. For example towing and upending of traditionally constructed segmented cold water pipes imposes hazardous loads on the pipe.

Staved construction allows offsite manufacturing of multiple staves of 40 to 50 ft lengths. Each stave is approximately 52 inches wide and 4 to 12 inches thick. The staves can be shipped in stacks or containers to the offshore platform and the cold water pipe can then be constructed on the platform from the multiple staves. This eliminates the need for a separate facility to assemble pipe sections.

The stave portions can be constructed from a nylon reinforced vinyl ester having a modulus of elasticity of between about 66,000 psi and 165,000 psi. The stave portions can have an ultimate strength of between about 15,000 psi and 45,000 psi, with a tensile strength between about 15,000 psi to 45,000 psi. In an aspect, the stave portions can have a modulus of elasticity of 150,000 psi, an ultimate strength of 30,000 psi and a yield strength of 30,000 psi, such that the installed CWP behaves similar to a hose rather than a purely rigid pipe. This is advantageous in storm conditions as the pipe is more flexible and avoids cracking or breaking. In an aspect, the pipe can deflect approximately two diameters from center at the unconnected lower end. Deflection at the unconnected lower end should not be so great as to interfere with the mooring system of the OTEC power plant or any other underwater systems involved in plant operations.

The cold water pipe connects to the bottom portion of the OTEC power plant. More specifically, the cold water pipe connects using a dynamic bearing with the bottom portion of the OTEC spar of FIG. 3. Cold water pipe connections in OTEC applications are described in Section 4.5 of Avery & Wu, "Renewable Energy from the Ocean, a Guide to OTEC," Oxford University Press, 1994, incorporated herein by reference in its entirety.

One of the significant advantages of using the spar as the platform is that doing so results in relatively small rotations between the spar and the CWP even in the most severe 100-year storm conditions. In addition, the vertical and lateral forces between the spar and the CWP are such that the downward force of the weight of the CWP between the spherical ball and its seat keeps the bearing surfaces in contact at all times. Because continual contact, the bearing surfaces also act as the water seal and there is no need to install a mechanism to hold the CWP in place vertically. This helps to simplify the spherical bearing design and also minimizes the pressure losses that would otherwise be caused by any additional CWP pipe restraining structures or hardware. The lateral forces transferred through the spherical bearing are also low enough that they can be adequately accommodated without the need for vertical restraint of the CWP.

Cold water is drawn through the cold water pipe via one or more cold water pumps such and flows via one or more cold water passages or conduits to the condenser portion of a multi-stage OTEC power plant.

Further details of cold water pipe construction and performance are described in U.S. patent application Ser. No. 12/691,655, entitled "Ocean Thermal Energy Conversion Power Plant Cold Water Pipe," filed on Jan. 21, 2010, the entire contents of which are incorporated herein by reference.

Cold Water Pipe Connection

The connection between the cold water pipe 351 and the spar platform 311 presents construction, maintenance and operational challenges. For example, the cold water pipe is a 2000 ft to 4000 ft vertical column suspended in the dynamic ocean environment. The platform or vessel to which the cold water pipe connects is also floating in the dynamic ocean environment. Moreover, the pipe is ideally connected below the waterline, and in some aspects, well below the waterline and close to the bottom of the vessel. Maneuvering the fully assembled pipe into the proper position and a securing the pipe to the vessel or platform is a difficult task.

The cold water pipe connection supports the cold water pipe suspended from the platform and bears the static and dynamic forces between the platform and the suspended pipe due to wave action, wind, vibration, and undersea currents.

Figure 12:
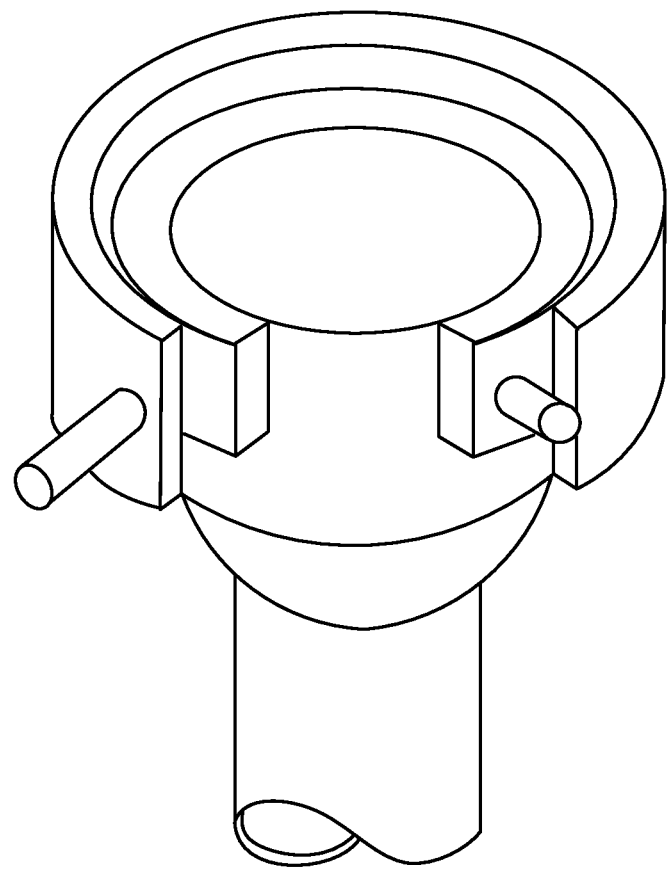
FIG. 12 illustrates a prior-art example of a gimbaled pipe connection.

Various OTEC cold water pipe connections, including gimbal, ball and socket, and universal connections, are disclosed in Section 4.5 of "Renewable Energy from the Ocean, a Guide to OTEC" William Avery and Chih Wu, Oxford University Press, 1994, incorporated herein by reference. Only the gimbal connection was operationally tested and included a two-axis gimbal allowing for 30° of rotation. As described in Avery and Wu, in the plane of the gimbal, a spherical shell formed the top of the pipe. A cylindrical cap with a flat ring of nylon and Teflon provided a sliding seal between the cold water in the pipe and the surrounding platform structure. The gimbaled pipe connection is illustrated in FIG. 12.

Previous cold water pipe connections were designed for traditional hull forms and platforms that exhibit greater vertical displacement due to heave and wave action than spar platforms. One of the significant advantages of using a spar as the platform is that doing so results in relatively small rotations between the spar itself and the CWP even in the most severe 100-year storm conditions. In addition, the vertical and lateral forces between the spar and the CWP are such that the downward force between the spherical ball and its seat keeps the bearing surfaces in contact at all times. In aspects, the downward force between the CWP and the connection bearing surface is between 0.4 g and 1.0 g.

In embodiments, this bearing can also act as the water seal, and as such does not come out of contact with its mating spherical seat, eliminating the need to install a mechanism to hold the CWP in place vertically. This helps to simplify the spherical bearing design and also minimizes the pressure losses that would otherwise be caused by any additional CWP pipe restraining structures or hardware. The lateral forces transferred through the spherical bearing are also low enough that they can be adequately accommodated without the need for vertical restraint of the CWP.

Aspects allow for vertical insertion of the cold water pipe upwardly through the bottom of the platform. This is accomplished by lifting the fully assembled cold water pipe into position from below the platform. This facilitates simultaneous construction of the platform and pipe as well as providing for easy installation and removal of the cold water pipe for maintenance.

Referring to FIG. 3, cold water pipe 351 connects to the submerged portion 311 of spar platform 310 at cold water pipe connection 375. In an aspect the cold water pipe connects using a bearing with the bottom portion of the OTEC spar of FIG. 3.

In an aspect, a cold water pipe connection is provided comprising a pipe collar seated via a spherical surface to a movable detent. The movable detent is coupled to the base of the spar platform. Incorporating the movable detent allows for vertical insertion and removal of the cold water pipe into and from the cold water pipe receiving bay.

Figure 13:
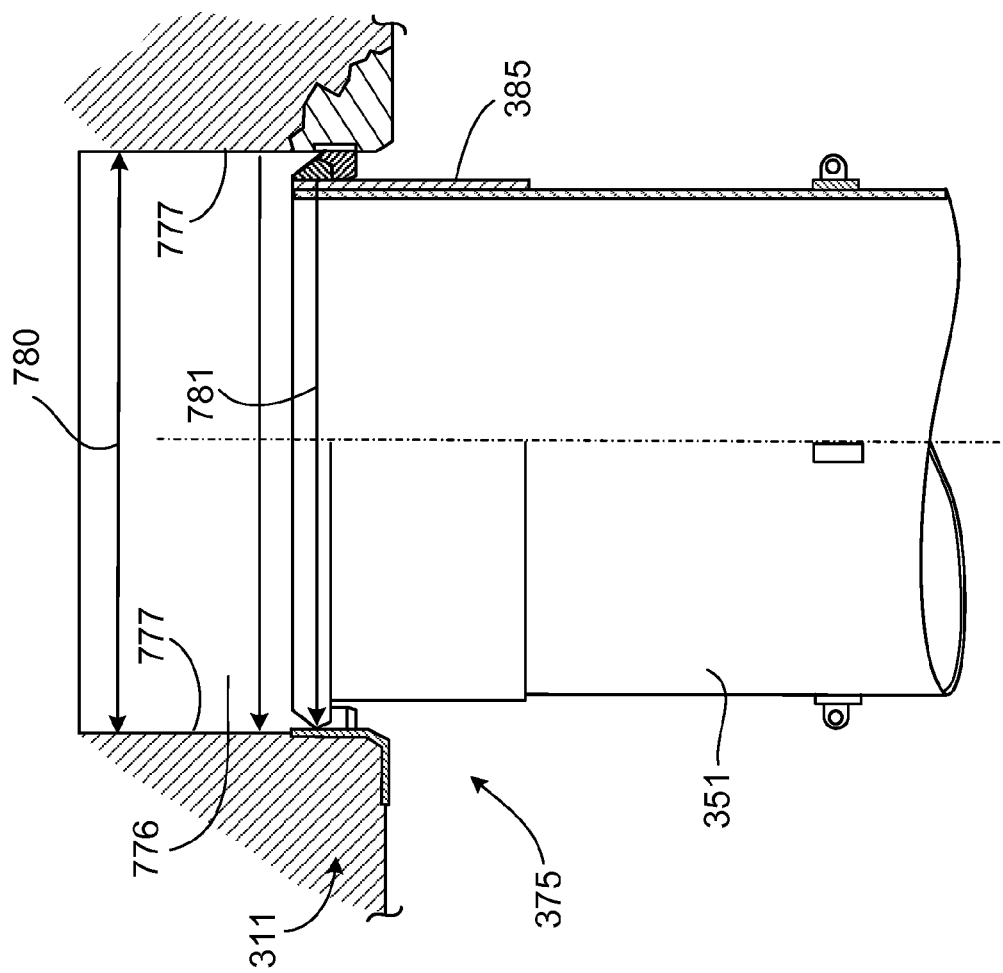
FIG. 13 illustrates a cold water pipe connection.

FIG. 13 illustrates an exemplary aspect wherein cold water pipe connection 375 includes pipe receiving bay 776 comprising bay walls 777 and detent housings 778. Receiving bay 776 further comprises receiving diameter 780, which is defined by the length of the diameter between bay walls 777.

In aspects, the receiving diameter is larger than the outer collar diameter 781 of cold water pipe 351.

Cold water pipe connection 375 and the lower portion of spar 311 can include structural reinforcement and supports to bear the cold water pipe weight and absorb the dynamic forces between the spar 311 and the cold water pipe 351 once suspended.

Figure 14:
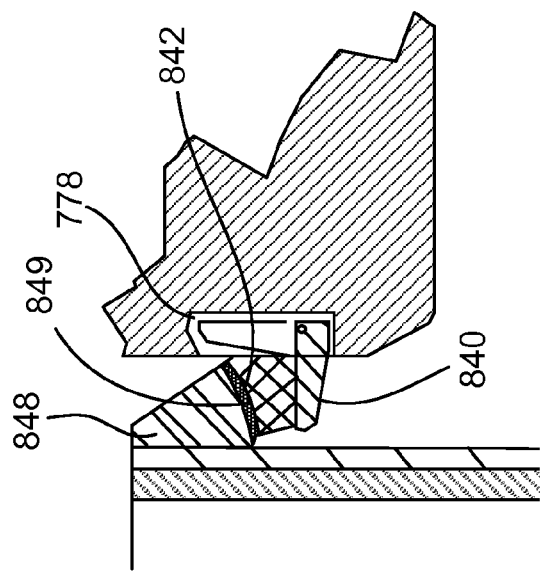
FIG. 14 illustrates a cold water pipe connection.

Referring to FIG. 14, cold water pipe connection 375 includes detent housing 778 and movable detent 840, which is mechanically coupled to the detent housing 778 to allow for movement of detent 840 from a first position to a second position. In a first position, movable detent 840 is housed within detent housing 778 such that the detent 840 does not protrude inwardly toward the center of the receiving bay 776 and remains outside of receiving diameter 780. In the first position, the top end portion 385 of cold water pipe 351 can be inserted into the pipe receiving bay 776 without interference from the moveable detent 840. In an alternate aspect, movable detent 840 can be housed in a first position such that no aspect of the movable detent 840 protrudes inwardly toward the center of receiving bay 776 past the outer collar diameter 781. In a further aspect, movable detent 840 in a first position does not interfere with the vertical movement of cold water pipe 351 through receiving bay 776.

In a second position, movable detent 840 extends beyond detent housing 778 and protrudes inwardly toward the center of receiving bay 776. In the second position, movable detent 840 extends inwardly past the outer collar diameter 781. Movable detent 840 can be adjusted or moved from a first position to a second position using hydraulic actuators, pneumatic actuators, mechanical actuators, electrical actuators, electro-mechanical actuators, or a combination of the above.

Movable detent 840 includes a partial spherical or arcuate bearing surface 842. Arcuate bearing surface 842 is configured to provide a dynamic bearing to cold water pipe bearing collar 848 when movable detent 840 is in a second position.

Cold water pipe bearing collar 842 includes collar bearing surface 849. Arcuate bearing surface 842 and collar bearing surface 849 can be cooperatively seated to provide a dynamic bearing to support the suspended weight of cold water pipe 351. Additionally, arcuate bearing surface 842 and collar bearing surface 849 are cooperatively seated to account for relative motion between the cold water pipe 351 and the platform 310 without unseating the cold water pipe 351. Arcuate bearing surface 842 and collar bearing surface 849 are cooperatively seated to provide a dynamic seal so that relatively warm water cannot enter and cold water cannot leave from the pipe receiving bay 776 and ultimately cold water intake 350 once the cold water pipe 351 is connected to the platform 310 via cold water pipe connection 375. Once cold water pipe 351 is suspended, cold water is drawn through the cold water pipe via one or more cold water pumps and flows via one or more cold water passages or conduits to the condenser portion of a multi-stage OTEC power plant.

Arcuate bearing surface 842 and collar bearing surface 849 can be treated with a coating such as a Teflon coating to prevent galvanic interaction between the two surfaces. Alternatively, the materials can be selected so that no galvanic interaction will occur. For example, one material may be fiber-reinforced plastic and the other may be steel.

It will be appreciated that any combination of a dynamic bearing surface and a movable detent or pinion to connect the cold water pipe to the floating platform are contemplated in the claims and the disclosure herein. For example, in aspects, the arcuate bearing surface can be positioned above the movable detent, the arcuate bearing surface can be positioned to the side of the movable detent, or even below the movable detent. In aspects, the movable detent can be integral to the bottom portion of the floating platform as described above. In other aspects the movable detent can be integral to the cold water pipe.

Figure 15:
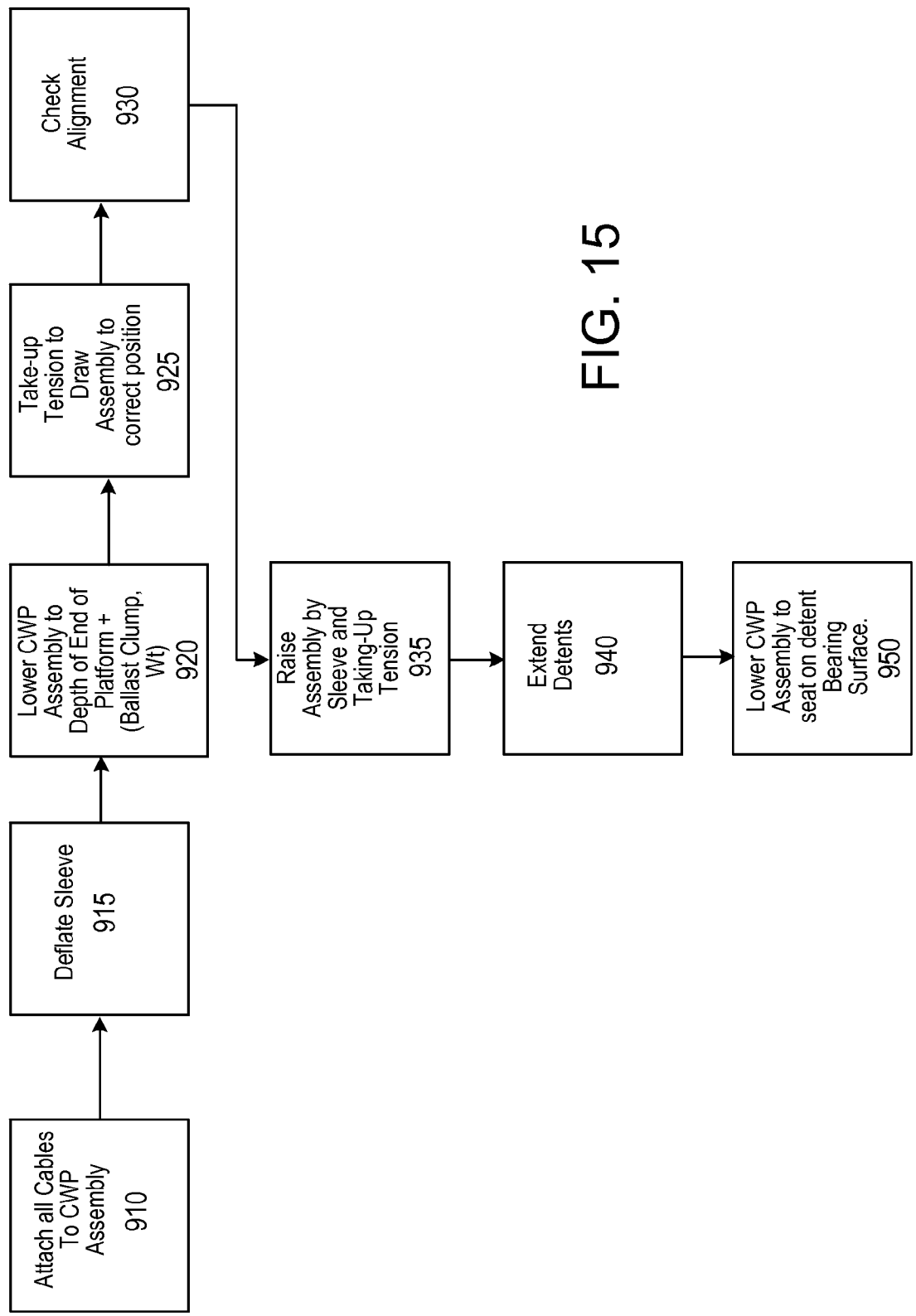
FIG. 15 illustrates a cold water pipe connection method.

FIG. 15 illustrates an exemplary method of attaching a cold water pipe to a floating platform, and more specifically an OTEC floating platform. The method includes rigging guide lines and downhauls from the platform to the fully assembled cold water pipe. The cold water pipe is then lowered below the platform and aligned to the proper position. The cold water pipe is then raised into the pipe receiving bay, the movable detents or pinions are extended and the pipe is seated on the arcuate bearing surface.

More specifically, guiding cables are attached 910 to the fully assembled cold water pipe 351. In an exemplary embodiment, the cold water pipe 351 can include one or more inflatable sleeves to provide buoyancy during construction, movement, and upending of the cold water pipe. After the guide wires are attached 910 to the cold water pipe, the one or more inflatable sleeves can be deflated 915 so that the cold water pipe is negatively buoyant. In an embodiment, the cold water pipe can also include a clump weight or other ballast system that can be partially or completely filled with water or other ballast material to provide negative buoyancy to the cold water pipe.

The cold water pipe is then lowered 920 to a position below the cold water pipe connection 375 of the floating OTEC platform 310. Ballast can again be adjusted. The guide wires are adjusted 925 to properly position the cold water pipe below the cold water pipe connection 375 and alignment can be checked and confirmed 930 via video, remote sensors and other means. The cold water pipe assembly is then raised 935 to a position such that the cold water pipe bearing collar 848 is above the movable detents 840 of the cold water pipe connection assembly. Raising the cold water pipe into the cold water pipe connection can be done using the guide wires, inflatable sleeves, detachable balloons or a combination of the same.

After the cold water pipe is raised 935 into the cold water pipe connection, the movable detents are extended 940 to provide a dynamic bearing surface for the cold water pipe. The cold water pipe is then lowered by adjusting the guide wires, deflating the inflatable sleeves or detachable balloons, or by adjusting the clump weight or other ballast system. A combination of the same may also be used.

It will be appreciated that guide wires, inflation lines, ballast lines and the like should remain unobstructed from each other during movement of the cold water pipe. Moreover, the movement of the cold water pipe should not interfere with the mooring system of the OTEC platform.

Figure 16:
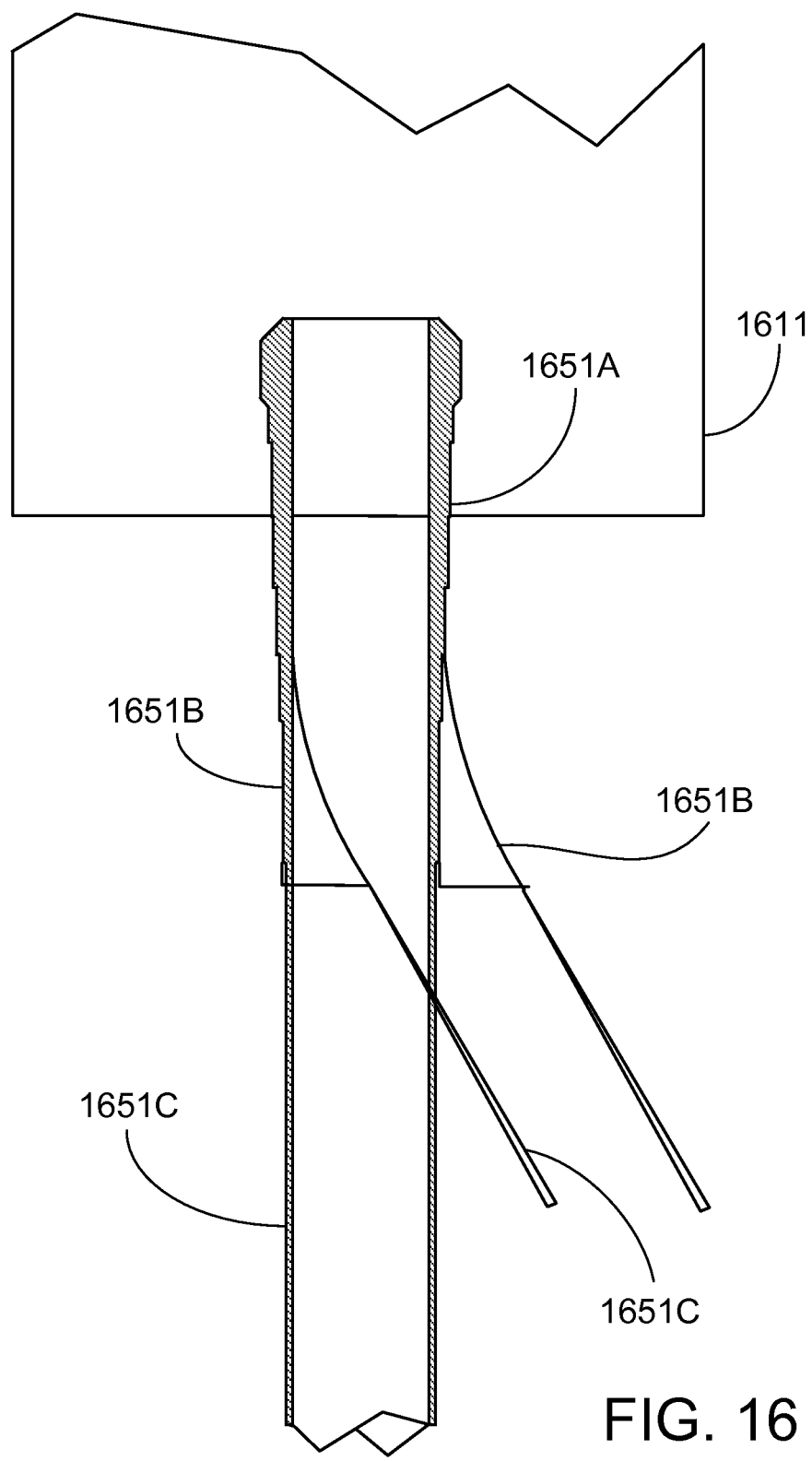
FIG. 16 illustrates a cold water pipe connection with a flexible cold water pipe.

In a further aspect of the disclosure, a static connection can be made between the cold water pipe and the spar structure. In such aspects, the forces between the pipe and spar can be accounted for by varying flexibility of the pipe near the top portion of the pipe. By allowing for movement of the lower and middle portions of the cold water pipe, the need for a dynamic pipe connection is reduced or avoided entirely. Avoiding the need for a gimbaled connection removes costly moving parts and simplifies fabrication of both the lower spar portion and the cold water pipe Referring to FIG. 16, cold water pipe 1651 is connected to the lower portion of spar 1611 without the use of the above described dynamic bearings. The upper portions of the cold water pipe 1651—that is those portions at and adjacently below the point of connection and the lower portion of spar 1611—are stiffened to provide a relatively inflexible top portion 1651A of the cold water pipe. Below the inflexible top portion, relatively flexible middle portion 1651B is provided. Below the flexible middle portion 1651B is a moderately flexible lower portion 1651C, which can comprise the largest portion of the cold water pipe assembly. A clump weight or ballast system can be secured to the bottom or any other part of the lower portion 1651C.

As illustrated, the flexible middle portion 1651B allows for deflection of the cold water pipe away from the line of suspension of the cold water pipe. The amount of deflection can be between 0.25 degrees and 30 degrees, depending on the length and diameter of the cold water pipe suspended from the spar 1011.

Figure 17:
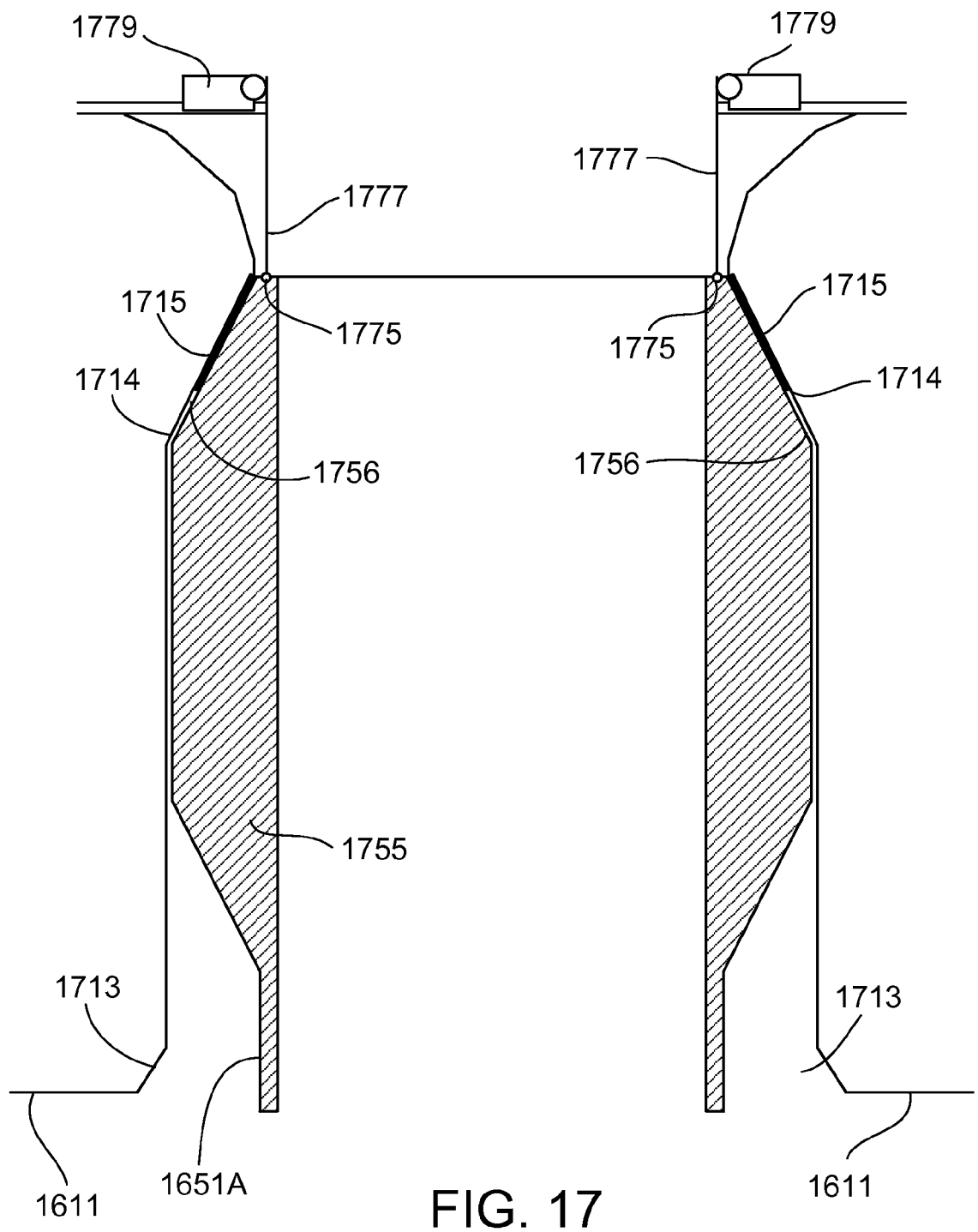
FIG. 17 illustrates a cold water pipe connection.

Referring to FIG. 17, an exemplary embodiment of the static cold water pipe—spar connection is detailed. The lower portion of spar 1611 includes receiving bay 1713 for receiving top portion 1651A of cold water pipe 1651. Receiving bay 1713 include tapered portion 1714 and contact pads 1715. Upper portion 1651A of cold water pipe 1651 includes collar 1755 with tapered collar surface 1756 and lifting lugs 1775. Cold water pipe 1651 is connected to spar 1611 by lifting and retention cables 1777, which are secured to the cold water pipe at lifting eyes 1775. Cables 1777 are attached to mechanical winches (not shown) housed in the lower portion of Spar 1711.

In an exemplary method of connecting the cold water pipe to the spar platform, the fully fabricated cold water pipe is lowered to a point just below the spar platform. Lifting and retention cables 1777 are connected to lifting lugs 1775 by remotely operated vehicles. Tension is taken up in the cables using the mechanical winches housed in the lower portion of spar 1611. As the upper portion 1651A of cold water pipe 1651 enters receiving bay 1713, it is guided into proper position by tapered portion 1714 until a watertight connection is made between tapered collar surface 1756 and contact pads 1715. Upon proper placement and sealing of the cold water pipe in the receiving bay, the cables 1777 are mechanically locked to prevent downward movement of the cold water pipe 1651. The seal between the tapered collar surface 1756 and the contact pads 1715 must be sufficient to overcome any hydrostatic forces existing at the depth of the cold water pipe connection. For example, at a depth of 432 feet, the hydrostatic pressure at the cold water pipe connection is 192 pounds per square inch. The upward force exerted on the connecting pad can be imparted by the lifting cables, the buoyancy of the cold water pipe, or a combination of both.

It will be appreciated that the number of lifting cables 1777 and corresponding lifting lugs 1775 is dependent on the size, weight and buoyancy of the cold water pipe 1651. In some aspects, cold water pipe 1651 can be positively, neutrally, or negatively buoyant. The number of lifting cables 1777 and corresponding lifting lugs 1775 is also dependent on any ballasting associated with the cold water pipe as well as the weight and buoyancy of the clump weight attached to the cold water pipe. In aspects of the disclosure, 2, 3, 4, 5, 6, or more lifting and retention cables can be used.

In additional aspects of the disclosure, the lifting lugs 1775 can comprise pad eyes bolted directly to the top of the cold water pipe using known fastening and connecting techniques. For example, barrel sockets, hex socket, cotter pins and the like can be incorporated into the staved top portion of the cold water pipe.

Figure 18:
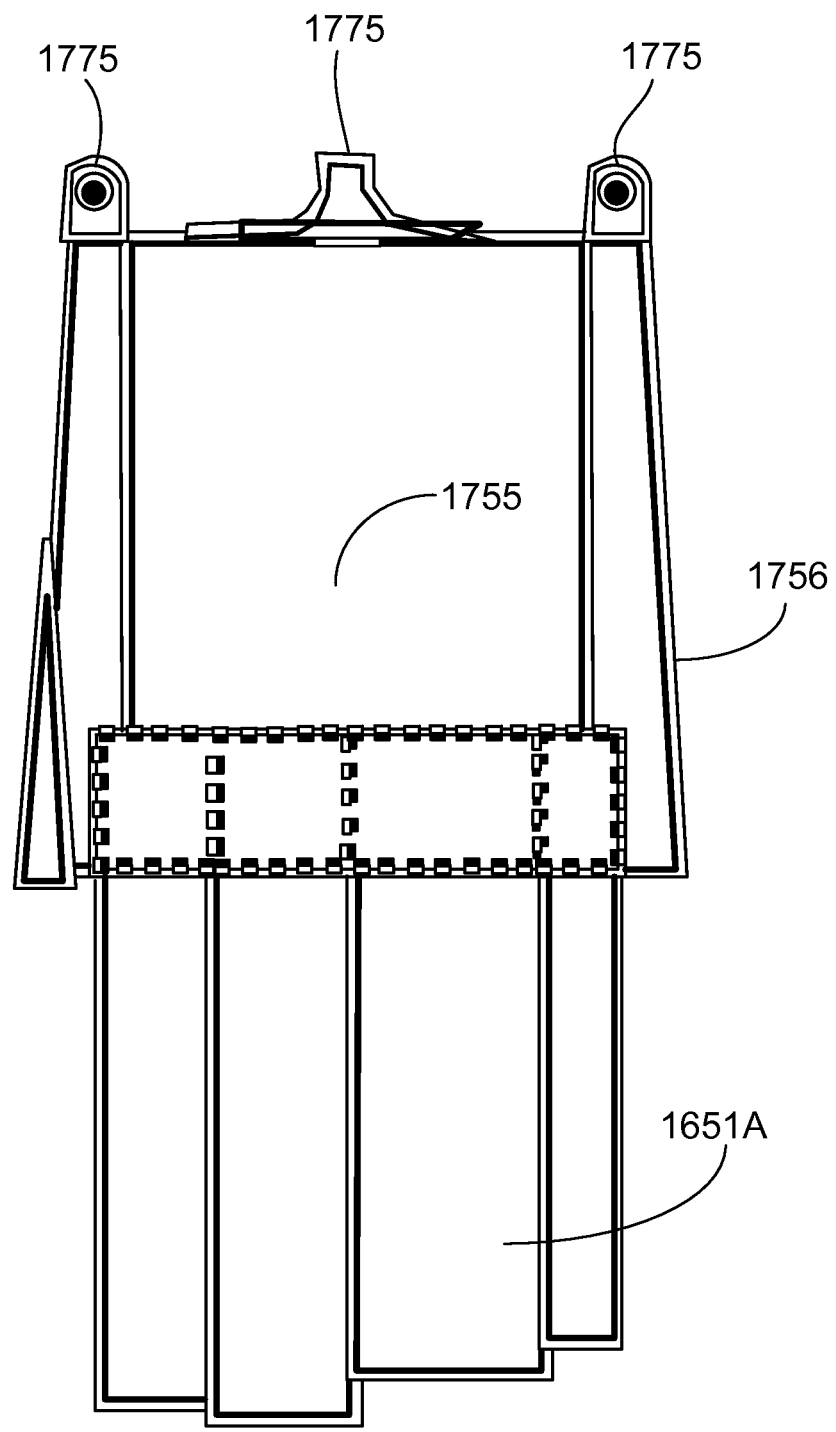
FIG. 18 illustrates a cold water pipe with a lifting collar.

In other aspects, a lifting collar can be installed to the top portion of the cold water pipe, the lifting collar comprising collar surface 1756 and lifting eye 1775. The lifting collar can be the same or different material as the cold water pipe. The lifting collar, when attached to the cold water pipe can increase the rigidity of the cold water pipe more than the rigidity associated with the upper portion 1651A. FIG. 18 is an illustration of a lifting collar 1775 mounted to a staved cold water pipe 1651. The lifting collar can be mechanically, chemically, or thermally bonded to the upper portion 1651A of the cold water pipe. For example, the same bonding resin to connect individual stave members of the cold water pipe can be used to connect the lifting collar to the cold water pipe.

Platform Connection and Intake Plenum:

It will be appreciated that the platform/Cold Water Pipe (CWP) connection represents a critical aspect of any OTEC system. Minor failures at this interface can result in thermal contamination of the cold water supply to the OTEC heat engine having an adverse impact on the overall efficiency of the power plant. Major failures can result in damage to the bottom of the vessel, damage to the top of the Cold Water Pipe, and ultimately separation and loss of the Cold Water Pipe. As discussed above, typically, the platform/CWP connection supports the CWP and allows for relative angular motion (pitch, roll and yaw) between the platform and the CWP. This relieves any stress concentration when the platform or CWP move at a particular angle with relation to each other. Gimble or ball-in-socket designs can accommodate the relative angular motion. Linear motion between the CWP and the platform, such as heave, sway and surge, can also be accounted for with motion compensating mechanisms, such as dampeners, motion stops and the like.

In embodiments using a spar platform, linear motion is largely compensated for by the hull form, resulting in only small such motions when encountering wind, current, waves and swells. Angular motion is accommodated for by incorporating a flexible CWP designed to flex when subjected to displacing forces.

Figure 19:
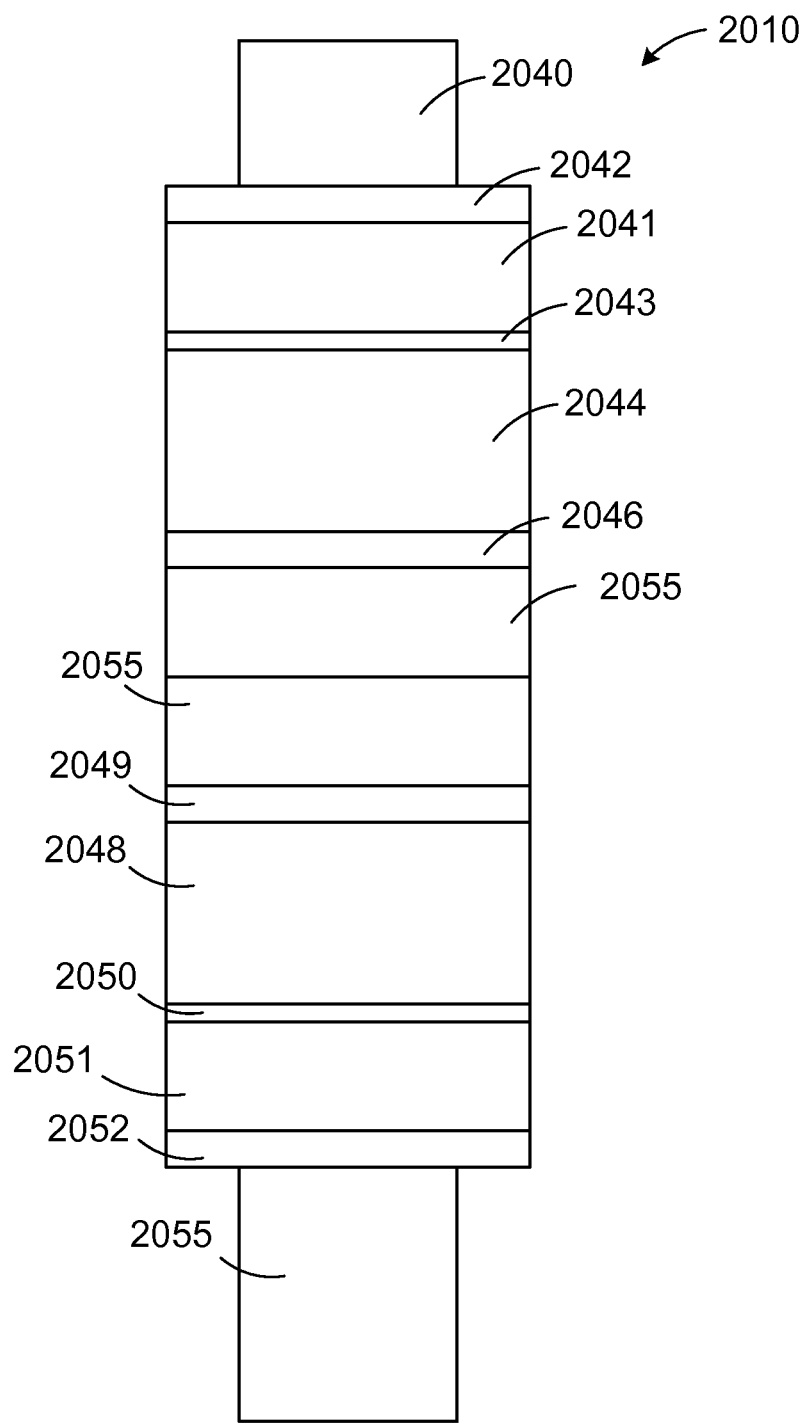
FIG. 19 illustrates an exemplary deck plan of an OTEC structure.

Referring to FIG. 19, a representative deck plan of an exemplary spar platform is presented wherein the overall depth of the underwater portion 2011 of spar 2010 from the waterline to the bottom of the spar is 432 feet. The maximum spar diameter 2012 is 140 feet and the smaller column diameter 2013 is approximately 105 feet.

Underwater portion 2011 of spar 2010 comprises: the lower portion of a utility module support column 2040, a multi-deck warm water portion comprising a warm water intake deck 2042, a warm water pump room 2041, a warm water distribution deck 2043, evaporator decks 2044, and warm water discharge plenum 2046; a power generation portion comprising one or more turbo generator decks 2055; a multi-deck cold water portion comprising a cold water discharge plenum 2049, condenser decks 2048, cold water distribution deck 2050, cold water pump room 2051, and cold water intake deck 2052; and a fixed ballast portion 2055.

The deck plan of exemplary spar 2010 includes utility support column 2040 having a height of approximately 90 feet.

Below utility support column 2040 is the warm water intake deck 2042 having a height of approximately 10 feet. Below the warm water intake deck 2042 is the warm water pump room 2041, having a height of approximately 30 feet, and below the warm water pump room 2041 is warm water distribution deck 2043, having a height of approximately 6 feet. The evaporator decks 2044, having a height of approximately 60 feet, are below the warm water distribution deck 2043. The warm water discharge deck 2046, having a height of approximately 10 feet, is below the evaporator portion 2044.

Multiple turbo generator decks 2055 are below the warm water discharge deck 2046. Each turbo generator deck can have a height of approximately 30 feet.

The cold water discharge deck 2049 is below the multiple turbo generator decks and has a height of approximately 10 feet. The condenser decks 2048, having a height of approximately 60 feet, are below the cold water discharge deck 2049. And the cold water distribution plenum 2050, having a height of approximately 6 feet, is below the condenser decks 2048. Cold water pump room 2051, having a height of approximately 30 feet is below the cold water distribution deck 2050. Cold water intake deck 2052, having a height of approximately 10 feet, is below the cold water pump room 2051.

Figure 20:
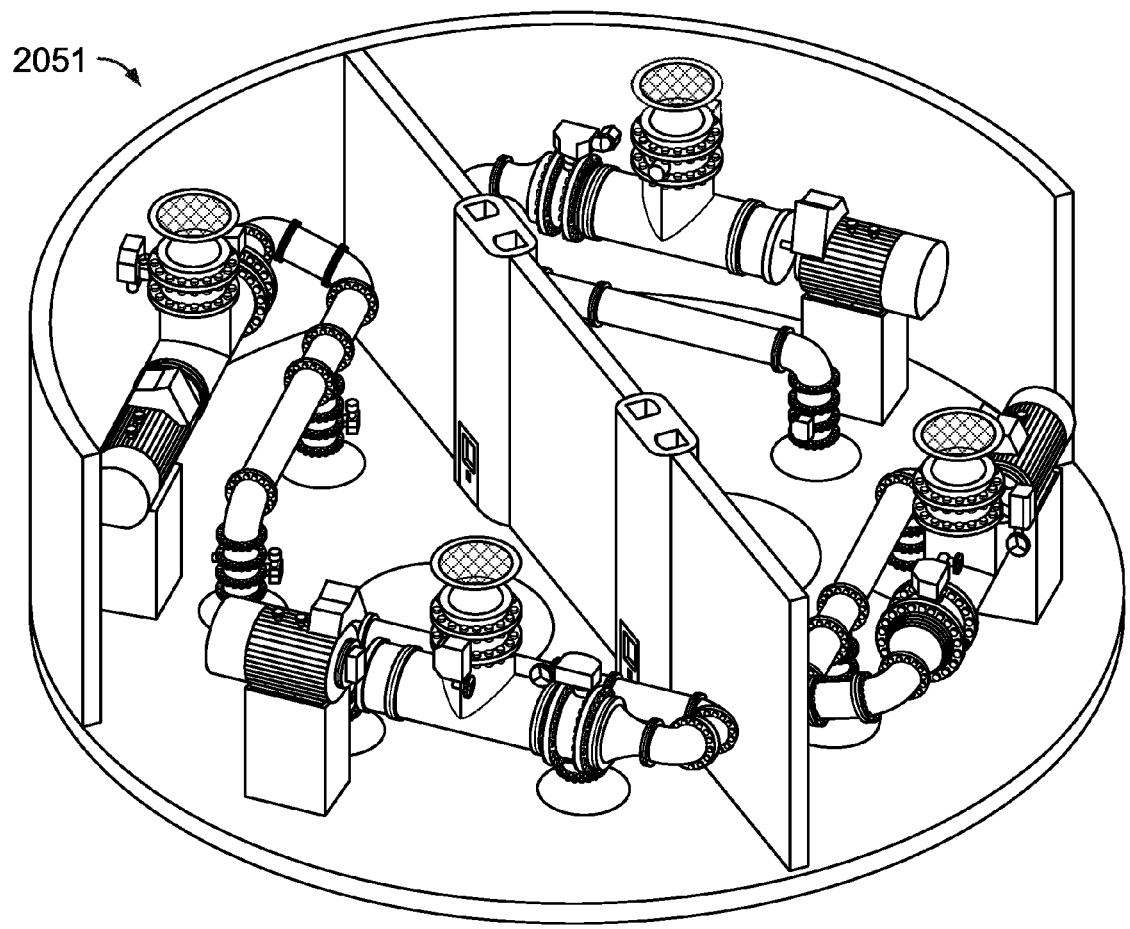
FIG. 20 illustrates an exemplary cold water pump room of the OTEC structure of FIG. 20A.

Referring to FIG. 20, the cold water pump room 2051 includes one or more cold water pumps 2076 and cold water conduits. During operation, cold water is drawn via the one or more cold water pumps 2076 from the cold water intake deck 2052 and flows to one or more cold water passages or conduits in the cold water distribution deck 2050 and on to the condensers of a multi-stage OTEC power plant.

The bottom portion of the spar includes a fixed ballast portion 2055 and can have a height of between 20 and 70 feet, and in the example of FIG. 20A, can have a height of approximately 50 feet.

It will be appreciated that each of the above described decks can have varying heights depending on the structural and functional requirements of the machinery, water supply, and engineering required of the deck. For example, a power plant having a smaller total energy output needs less water flow, fewer heat exchangers, and fewer turbo generators than larger capacity power plants. As such, deck sizes, diameters and heights can vary with the size of the spar and power plant.

Figure 21A:
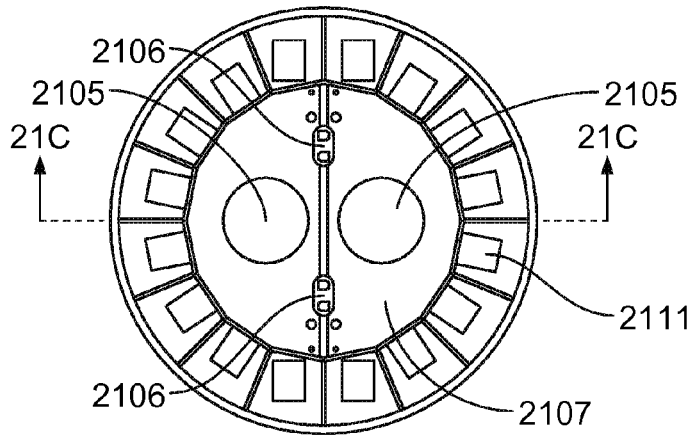
FIG. 21A illustrates a plan view of an exemplary heat exchanger deck of an offshore structure.
Figure 21B:
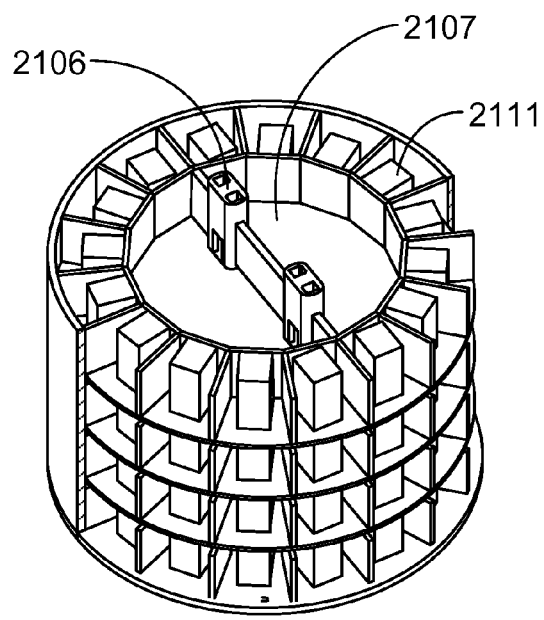
FIG. 21B illustrates a perspective view of an exemplary heat exchanger deck of an offshore structure.
Figure 21C:
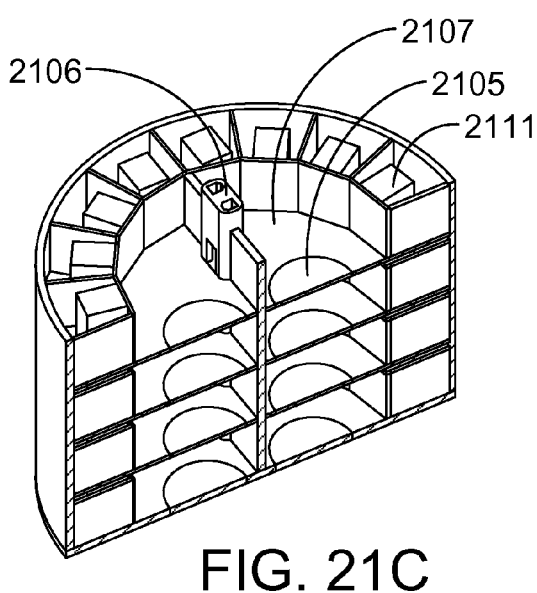
FIG. 21C illustrates a perspective section view of an exemplary heat exchanger deck of an offshore structure.

FIGS. 21A, 21B, and 21C show a plan view, perspective view, and perspective sectional, respectively, of a typical heat exchanger arrangement found in either evaporator decks 2044 or condenser decks 2048. As shown access trunks 2105 are provided in the central core portion 2107. Escape trunks 2106 are also provided in the central core portion 2107. Multiple heat exchangers 2111 can be arranged around the periphery of central core 2107. Heat exchangers 2111 can be accessed from either of the access trunks 2105. Details of the heat exchangers contemplated in embodiments herein are described in co-pending U.S. patent application Ser. No. 13/209,865 entitled Ocean Thermal Energy Conversion Power Plant and U.S. patent application Ser. No. 13/209,944 entitled Transferring Heat Between Fluids, filed simultaneously with the present application and incorporated herein by reference in their entirety.

Figure 22A:
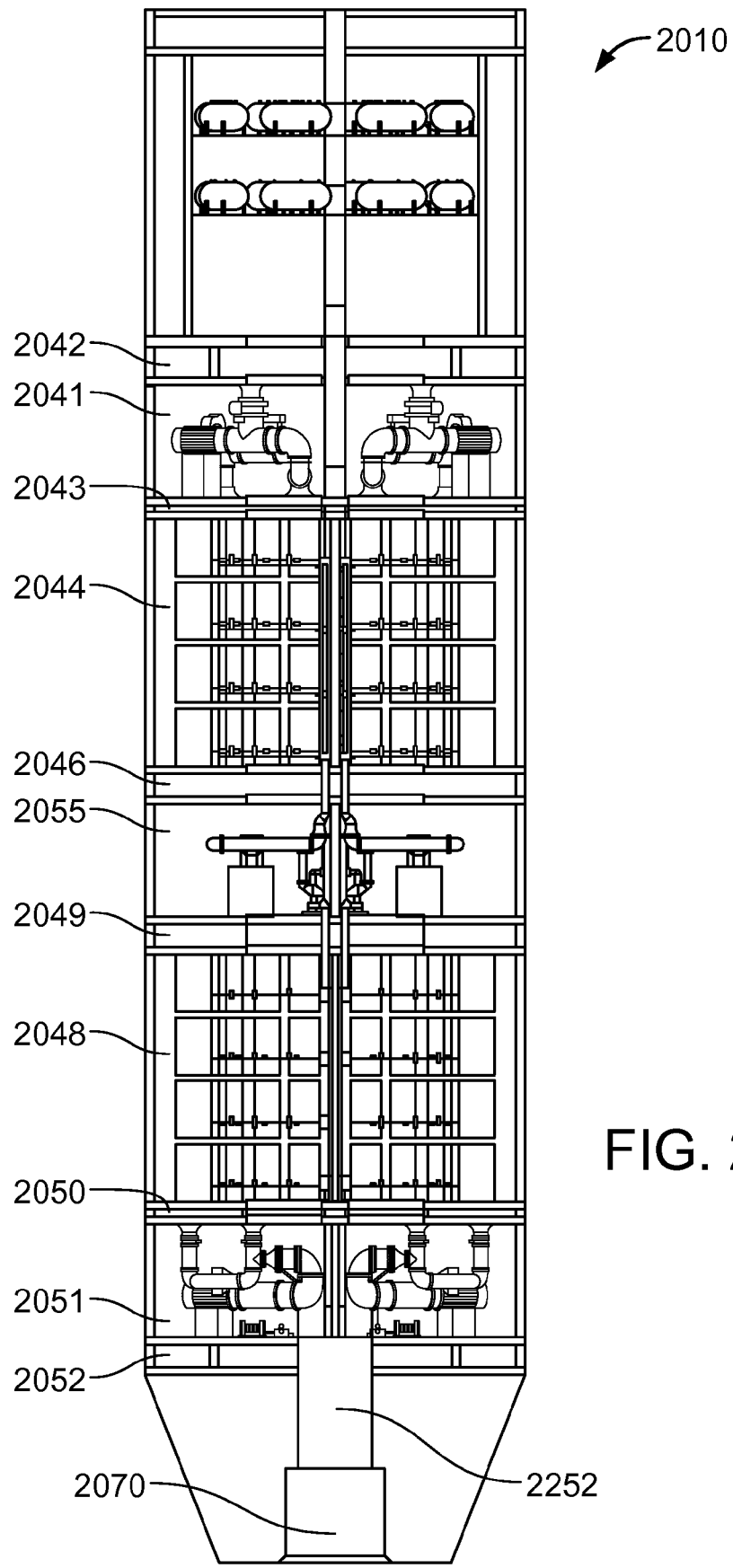
FIG. 22A illustrates a deck view of an exemplary underwater portion of an OTEC structure having a domed intake plenum assembly.
Figure 22B:
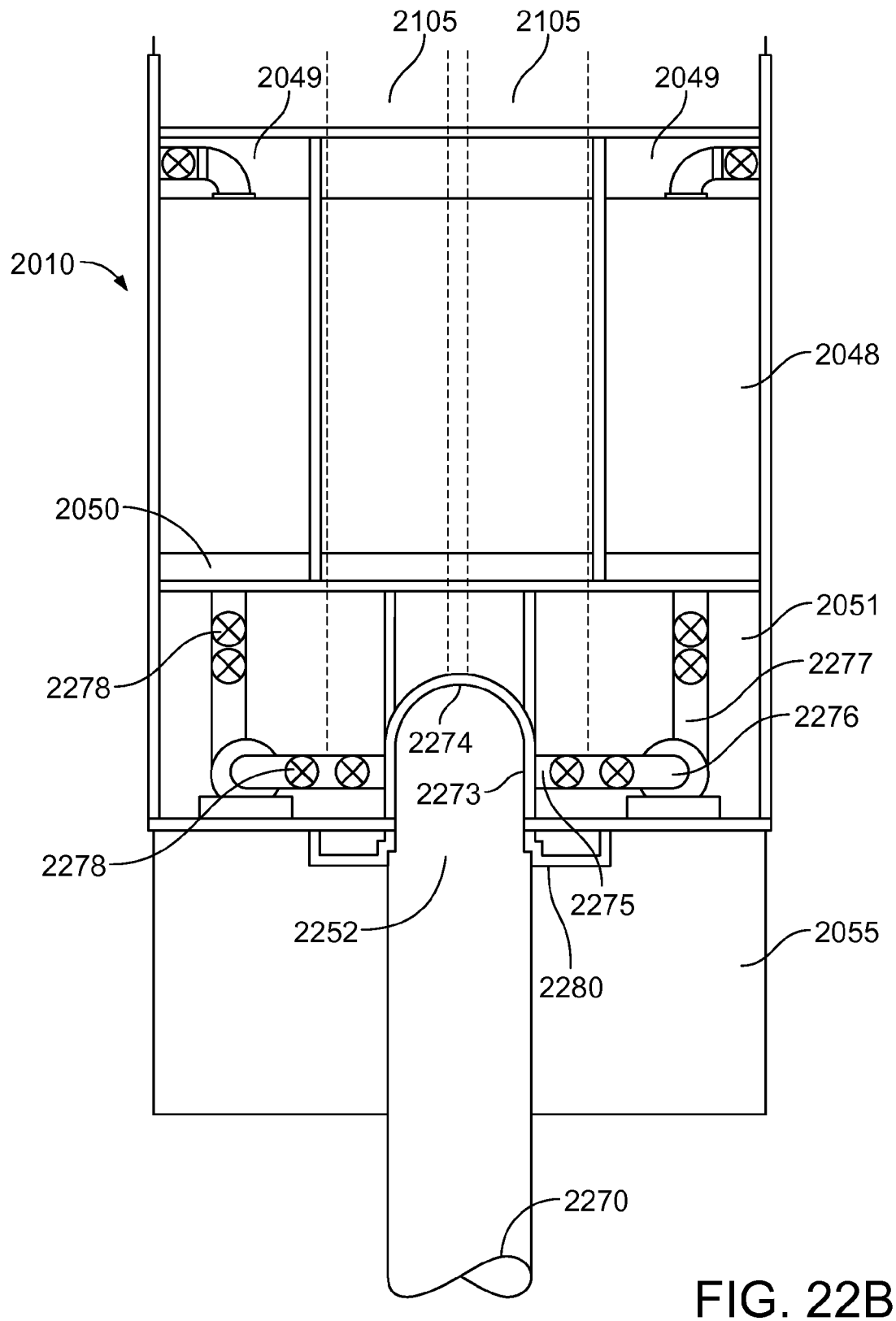
FIG. 22B illustrates an enlarged deck view of a cold water portion and cold water pipe connection of the OTEC structure of 22A.
Figure 22C:
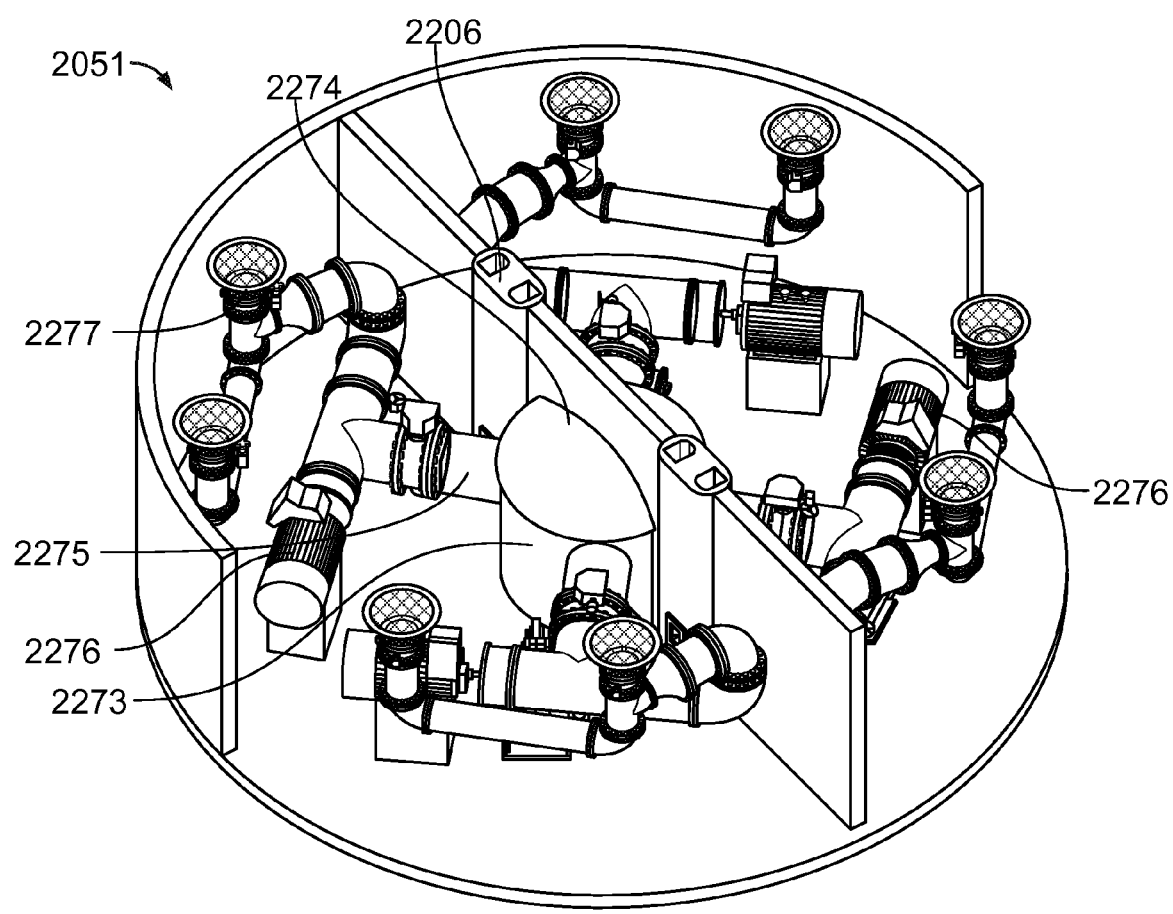
FIG. 22C illustrates a perspective view of an exemplary cold water pump room of the OTEC structure of FIG. 22A.

FIG. 22A shows an exemplary spar 2010 having an alternate lower portion including a domed cold water inlet 2252. FIG. 22B is a detail deck plan of the lower portion of spar 2010 of FIG. 22A, including cold water discharge deck 2049, condenser decks 2048, cold water distribution deck 2050, cold water pump room 2051, cold water inlet 2252 and fixed ballast 2055. Access trunks 2105, shown in dashed lines to indicate a hidden view, extend through central core 2107 and into cold water pump room 2051.

In the embodiment of FIGS. 22A-22D, the cold water intake deck 2252 is arranged on the same level or deck as the cold water pump room 2051. Cold water intake 2252 is centrally located within the diameter of the lower portion of the spar 2010 and is surrounded by cold water pump room 2051. Cold water intake 2252 forms the terminus and connection point for the cold water pipe 2070. Cold water intake 2252 extends upwardly into the cold water pump room 2252 in the shape of a domed intake space or chamber.

The domed intake chamber can provide the following advantages: reduction in structural spans; reduction in the overall length of the spar, providing an efficient water flow path from CWP, through piping and valving, through pumps and onward to condensers; providing sufficient access for maintenance personnel; providing a means to remove equipment for repair or replacement through access trunks; providing protection against the hydrostatic pressure of the sea; providing a means to effectively lock the CWP to the base of the spar for normal OTEC operation and unlock the CWP for removal; and providing a double water tight valve boundary in compartments connected to the sea.

Given the large diameter of the spar structure and the significant depth compared to prior-art OTEC structures, the internally integrated dome shaped intake chamber of the embodiment depicted in FIGS. 22A-22D overcomes the multifaceted problems at the base of the spar including hydrostatic pressure of sea water against this deepest part of the spar, acting inwardly on the curved shell plating and upwardly on the bottom surfaces, as well as the large structural spans, particularly across the diameter of the spar. The problems create structural, layout and engineering challenges in that supporting structure, with the accompanying weight and space consumption needed at the deepest parts of the spar to overcome the hydrostatic forces.

Without wishing to be bound by theory, the domed shape of the cold water intake 2252 located at the termination of the cold water pipe relieves the hydrostatic forces acting at the bottom of the spar 2010. A structural finite element analysis (FEA) was conducted on the present embodiment of the entire spar structure to ensure that the design was satisfactory. An additional FEA was conducted to ascertain if the lowest deck structure, subject to the majority of the upward ambient hydrostatic pressure from the sea, could best be made as a domed structure in which the plating would be placed in tension, thus avoiding the possibility of buckling failure. Results showed that there was no design advantage to the parabolic structure. It will be appreciated, however, that the span across the diameter of the spar is large, and would normally require an inordinately heavy and complex plate-girder structure. To overcome this, the cold water inlet plenum 2252 includes a short cylinder portion 2273 capped with a hemispherical or dome-shaped terminus or cap 2274.

This domed structure proves to be structurally efficient. The cylinder is of relatively small diameter and modest span, and thus forms an efficient structural design. In addition, the cylinder provides reinforced support for the structure of the decks at its top and base. The problem of span has been vastly reduced while maintaining excellent water flow and water tight integrity.

There are significant structural advantages of a domed intake plenum structure (see FIG. 22a-22D) over a large flat intake plenum deck (see FIGS. 20A and 20B). Due to large hydrostatic pressures acting on the flat intake plenum deck, this design requires a very heavy and complex structure to withstand these pressures. However, the domed intake plenum combines spherical and cylindrical shapes which are highly resistant to the forces applied by pressure loads. Thus, the domed intake plenum better withstands the hydrostatic pressures and offers a lower weight and less complex structural solution for the same objective.

Furthermore, the domed intake plenum is sized to match the diameter of the cold water pipe rather than the spar. Thus, the hydrostatic pressure is applied to a much smaller area. In a complementary effect, the stiffness of a structural member follows an inverse function of cube power of the structural member's unsupported length. The strength of the structural member follows an inverse function of square of the structural member's unsupported length. For both structural attributes, it is beneficial to design structural members with a short unsupported length. The flat intake plenum deck has a total diameter of around 100-feet. In contrast, the modified design of domed intake plenum has a diameter of around 24-feet. The four-fold reduction in unsupported length will lead to a 16-fold increase in strength and 64-fold increase in stiffness for a comparable structure. Therefore, the structural design for the domed intake plenum is substantially simpler and lighter, and has much less structural plating and significantly fewer structural strengthening members.

In addition to overcoming the challenge of the hydrostatic pressures and required structure, the domed intake solution of the present embodiment also reduces structurally isolated points where there are relatively high forces or stresses, or uneven distribution of loads in the structure due to angles and/or structural joints. The domed intake solution of the present embodiment also allows dry access to the pump room and cold water intake connections thereby facilitating maintenance and inspection of machinery including but not limited to pumps, valves, valve actuators, sensors and the cold water lifting and retention system.

The domed intake solution of the present embodiment also facilitates the even distribution of cold water from the cold water pipe (CWP), upward to the cold water distribution deck 2051 and condensers in the condenser deck 2050.

Indeed the domed intake solution addresses technical issues associated with the base of the OTEC spar including structure, cold water management, cold water pipe (CWP) installation and retention; water tight isolation; and equipment access.

The centrally located domed intake structure withstands hydrostatic and other environmental forces, provides support for equipment, and maintains the water tight integrity of occupied spaces within the spar. Structural continuity and load distribution are maintained by means of aligned and approximately aligned decks, bulkheads, cylindrical structure, and connecting structure, from the condenser chambers in condenser deck 2048, downward through the cold water distribution deck 2050, to the cold water pump room 2051.

Figure 22D:
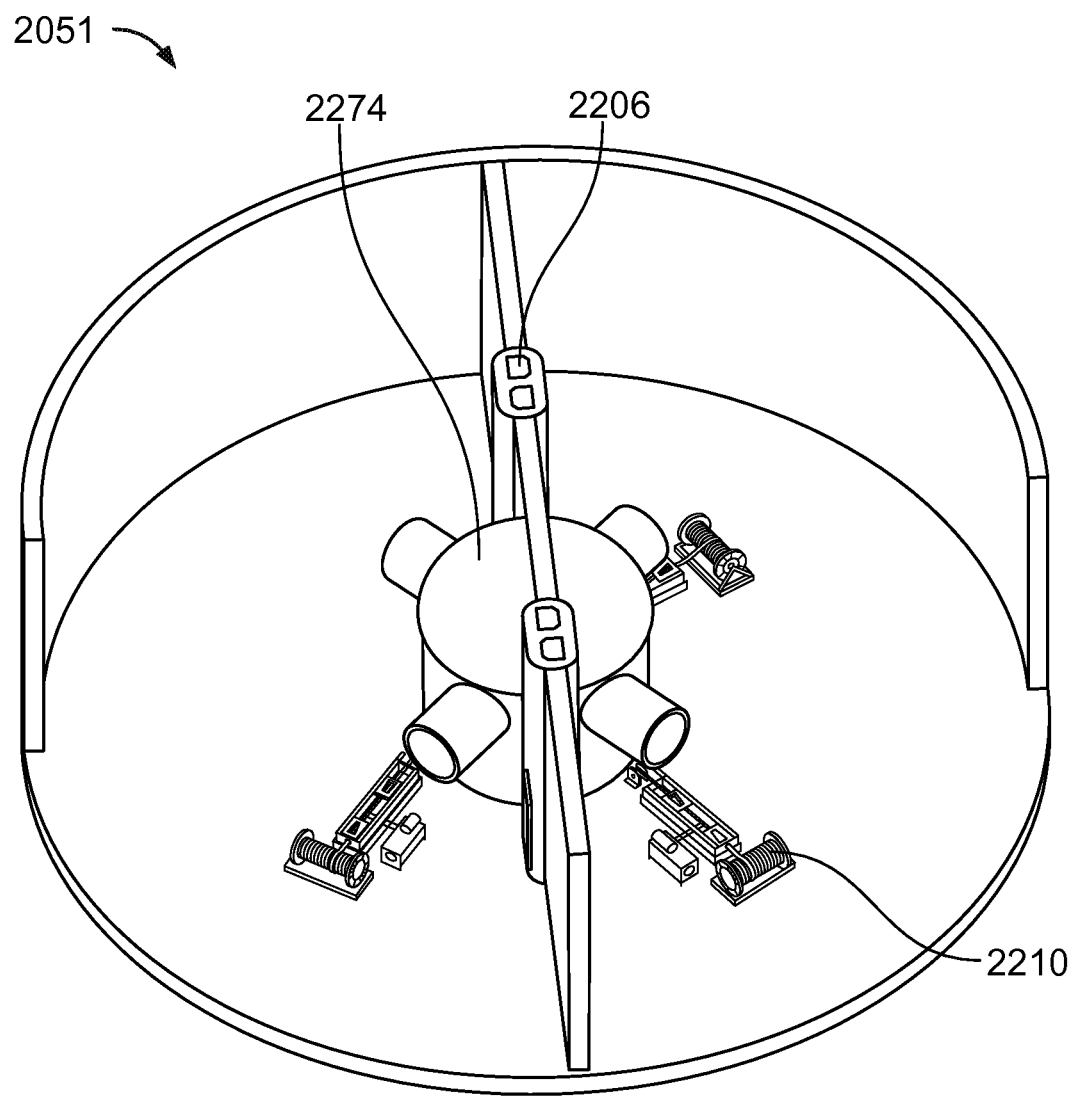
FIG. 22D illustrates a perspective view of the exemplary cold water pump room of FIG. 22C with the cold water pumps omitted.

As shown in FIGS. 22A and 22D, the domed intake solution also facilitates improved cold water flow management. Cold water is fed from the top of the CWP 2270 into the domed cold water inlet plenum 2252, piped to cold water pumps 2276 via cold water pump supply pipes 2275, discharged via cold water pump discharge pipes 2277 into distribution plenums within cold water distribution deck 2050 and upward into the condenser heat exchangers in condenser decks 2048. Double valve isolation is provided at the inlet and outlet of the pumps using isolation valves 2278, enabling isolation of the pumps, inboard valves, and condenser compartment. The valves are located in accessible dry spaces to enable their monitoring and maintenance. Structure, piping and valves (primary and backup) isolate the accessible spaces of the spar from the hydrostatic pressure of the ocean.

Centrally locating the domed intake 2052 enables access to equipment in the pump room (pumps, motors, isolation valves, back-up isolation valves, actuators, and sensors) by means of two vertical equipment access trunks 2105. Below the pump room 2051, further access is provided via CWP lock compartments 2280 for inspection and maintenance of the ring of spherical locks that attach the CWP to the base of the spar, as further described below.

In exemplary embodiments incorporating a domed intake chamber, the base of the spar is shaped and reinforced to help guide the CWP into a cone-shaped recess for a firm fit. The CWP is pulled into place by cables attached to winches in the cold water pump room. After the CWP is firmly in place, a set of spherical locks or mechanical rams engage or pin the CWP to hold the CWP permanently until the locks or rams are withdrawn. If it is desired to remove the CWP, the rams or pins may be disengaged and the CWP can be winched downward. The ability to remove the CWP is an improvement over prior-art OTEC facilities, particularly those incorporating gimbaled or ball and socket CWP connections.

FIG. 22D illustrates the cold water distribution deck 2051 with the cold water pumps removed, showing the installation winches 2210 that are used in the manner discussed in detail below.

Figure 22E:
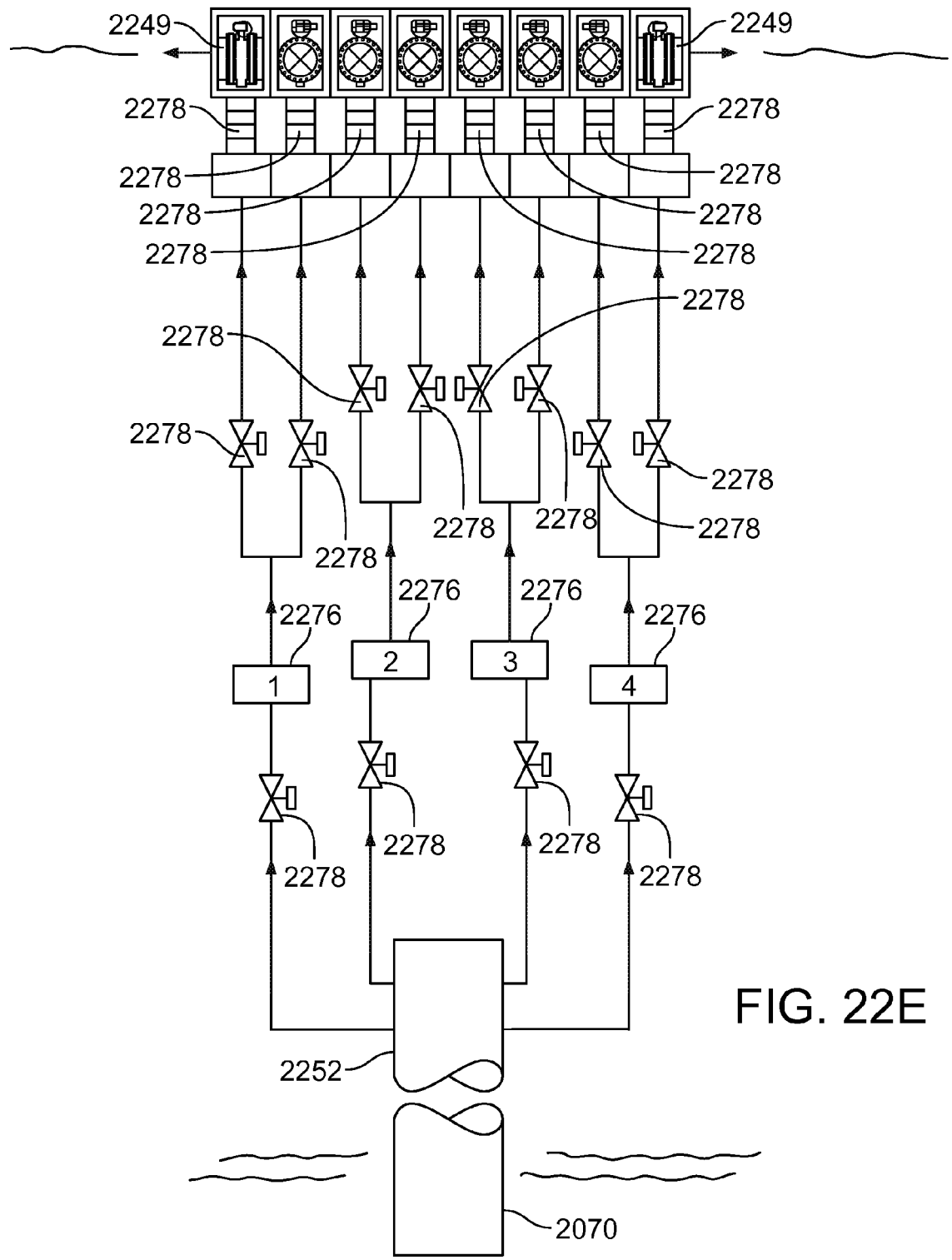
FIG. 22E illustrates an exemplary schematic diagram of the cold water system of an OTEC structure.

FIG. 22E illustrates a schematic diagram and piping layout of the cold water system of an exemplary OTEC power plant. As discussed above, the OTEC power plant includes multiple cold water pumps 2276 that pump water from a domed intake plenum 2252 through multiple heat exchangers 2211, and finally out through one or more cold water discharge 2249. As shown, multiple isolation vales 2278 are included in order to properly open and close the flow of cold water throughout the cold water system. In the exemplary embodiment, the system has four channels that can be operated independent of each other so that in the event that equipment (e.g., piping, valves, or heat exchangers) of a particular channel fails, the isolation valves for that particular channel can be closed to prevent damage to the entire system.

Figure 23:
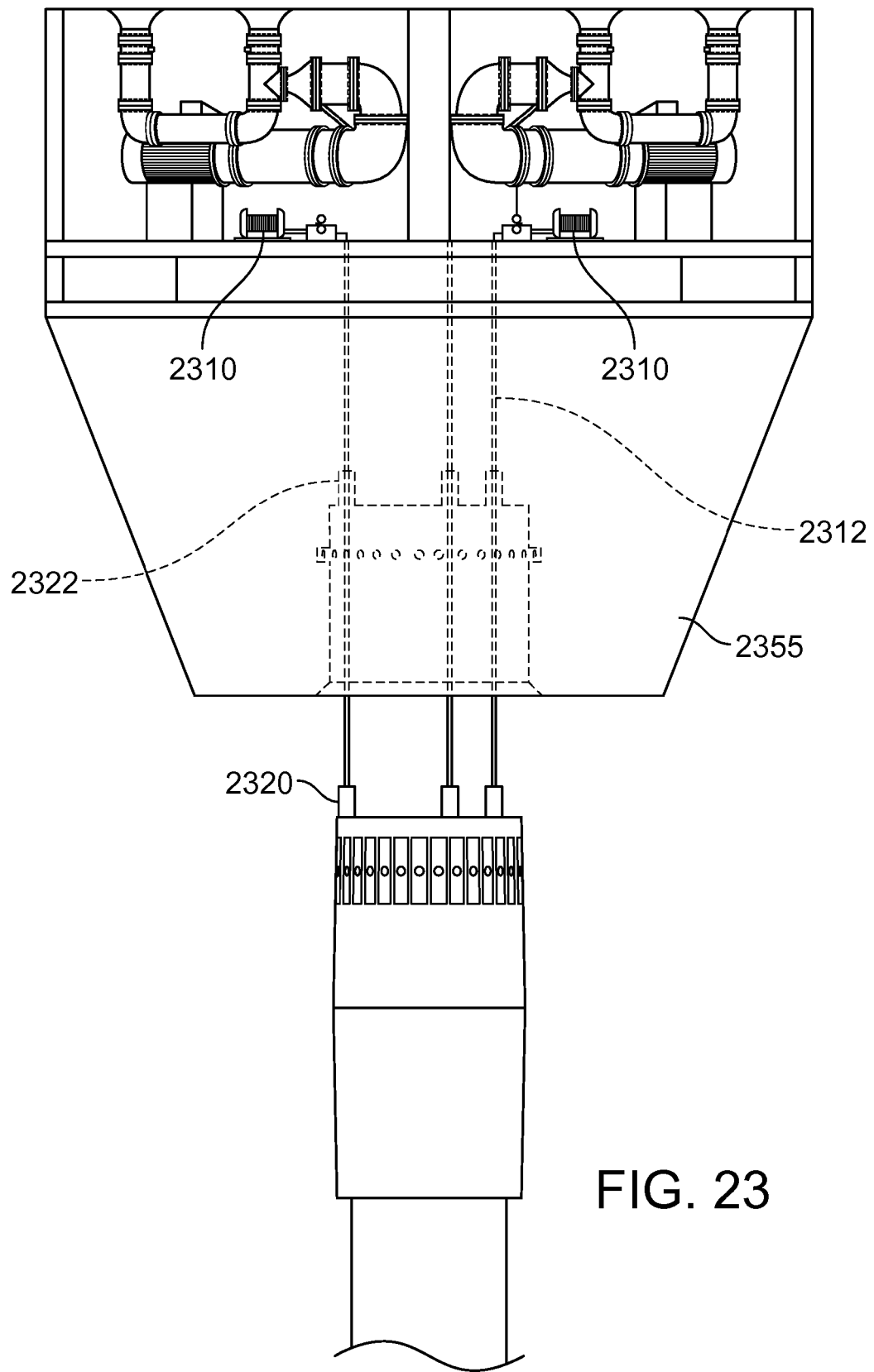
FIG. 23 illustrates an exemplary cold water pump room and cold water pipe lifting system.

FIG. 23 illustrates an exemplary embodiment wherein installation winches 2310 are provided in the cold water pipe pump room 2351. Installation cables 2312 through the deck of the pump room and or the lower portions of the fixed ballast portion 2355 using through hull fittings. The water tight seal for the lifting cable hull penetration can be achieved in different manners for initial installation and subsequent operation. For installation, the coated lifting cables can be sealed in a dedicated hawse pipe 2530 by packing-type seal located at the bottom of the dry pump room 2051.

Figure 25:
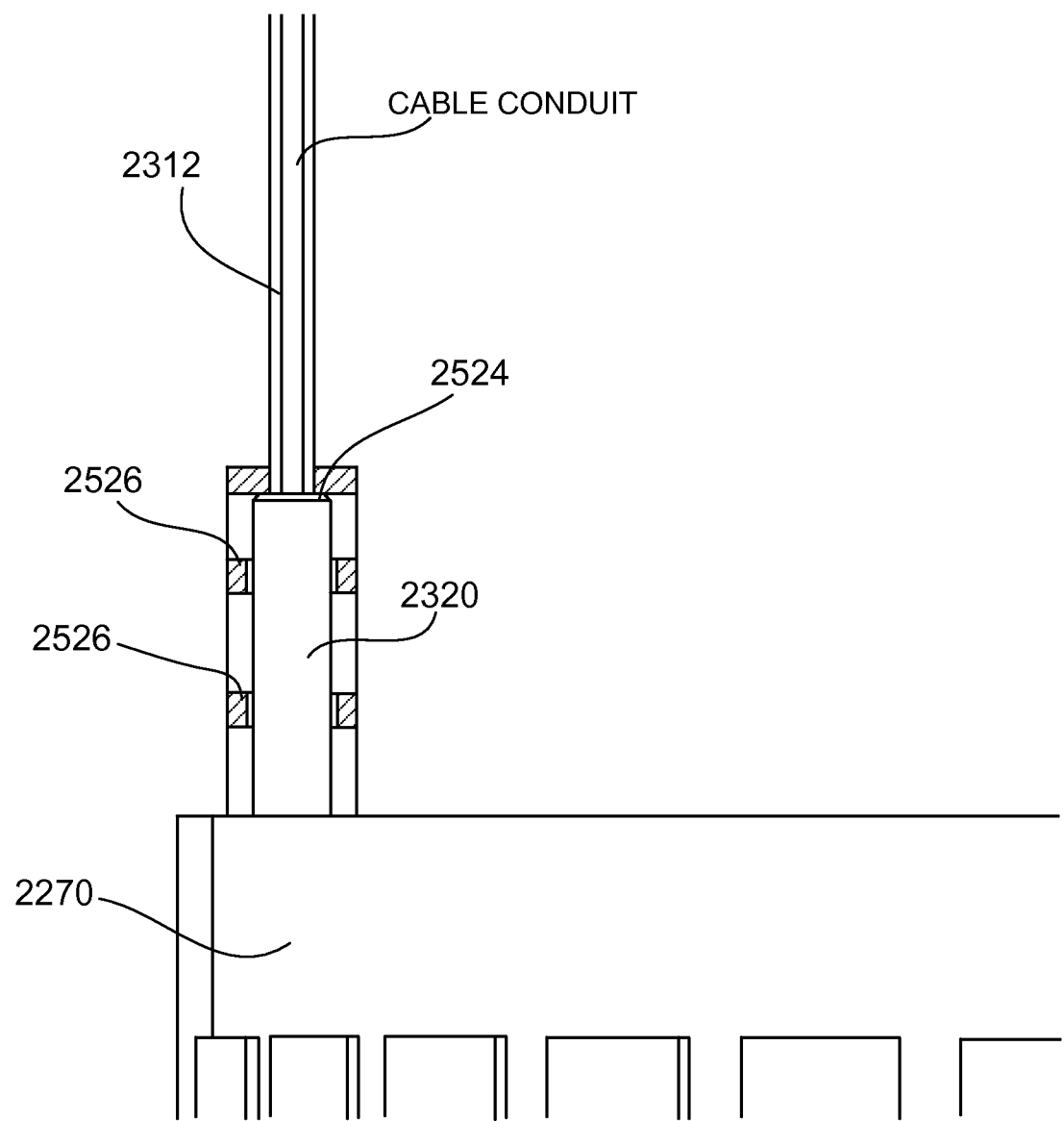
FIG. 25 illustrates an exemplary lifting lug and housing.

In operation and with reference to FIG. 25, the lifting and installation cables attach to lifting lugs 2320 at the top of the Cold Water Pipe 2270. As the top of the CWP is seated into the receiving bay of the spar, the cylindrical lifting lugs 2320 are seated into housings 2322 at the top of the receiving bay. The tops of the lifting lugs 2320 mate with a face seal 2524 or other gasket at the top of the housings 2322. The sides of the cylindrical lugs 2320 mate with two radial seals 2526 on the circumference of the housing. Thus, the permanent water tight seal has triple redundancy. Seal materials can include PTFE or other soft plastic that does not degrade in the marine environment. After the installation of the CWP and the lifting lugs 2320 are properly sealed in their housings 2322, the dedicated lifting cable hawse pipe 2312 can be dried or filled with oil to prevent corrosion and binding of the cable or cable system.

In embodiments, a positive locking system is also provided to mechanically engage the top portion of the CWP and prevent vertical movement of the CWP in relation to the spar. Referring to FIG. 22B, the locking system can be provided in CWP locking compartments 2280. These compartments can be dry or wet spaces.

Figure 24:
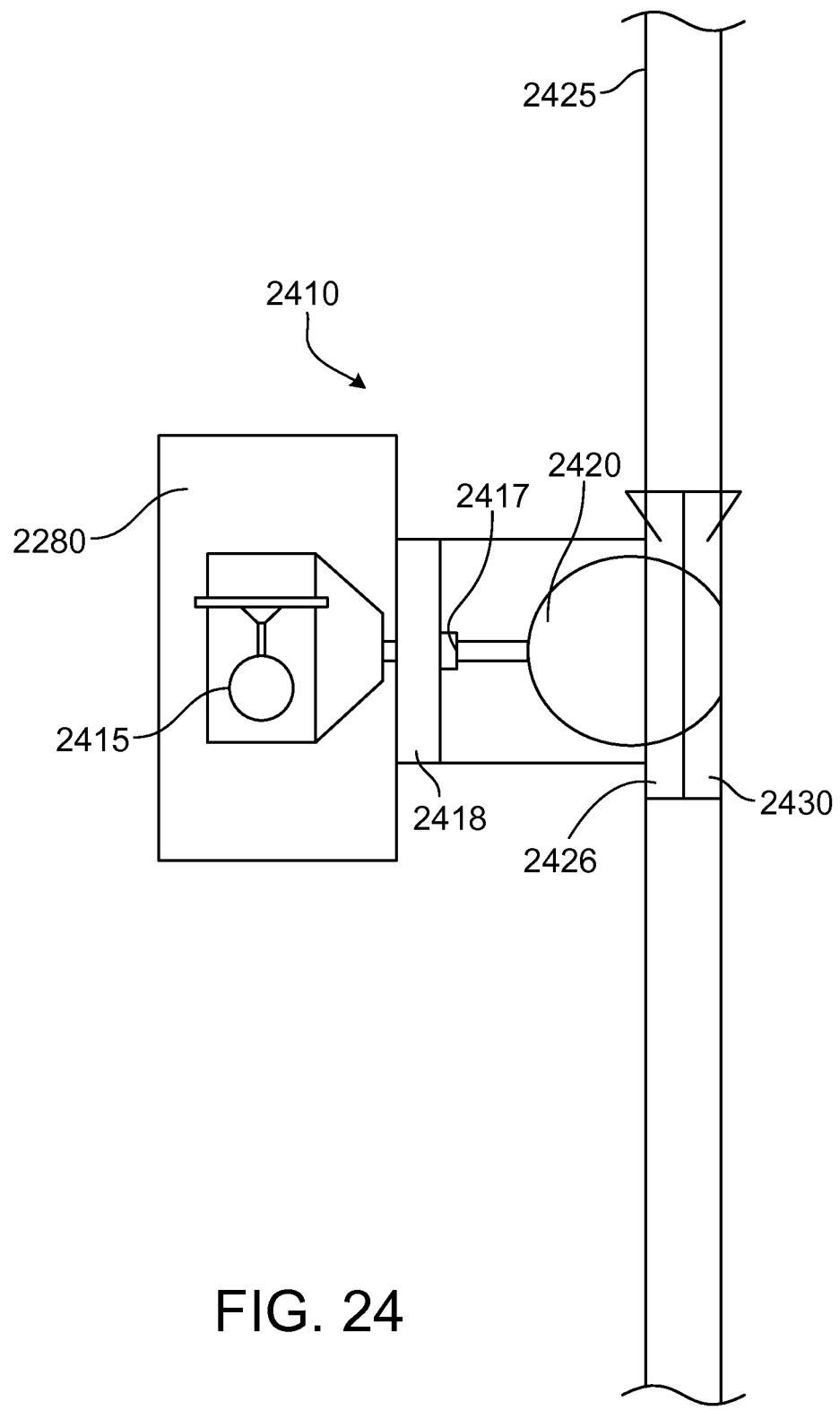
FIG. 24 illustrates an exemplary ball locking system.

FIG. 24 illustrates an exemplary embodiment of the CWP locking system 2410 including CWP locking compartment 2280, motor actuator 2415, extension ram/piston 2417, watertight boundary and through hull connection 2418, CWP engagement ball 2420, CWP receiving bay wall 2425, spar socket plate 2426, and CWP ball housing plates 2430.

The locking system secures the CWP to the base of the platform. After the CWP is drawn into place using the cable lifting and retention system, the locking system activates and the CWP connectors are engaged to provide the structural interface and securing mechanism between the CWP and the platform.

The connection of the CWP to the platform structure is a linear plug and socket connection. The size of the cold water pipe makes tight tolerances for raising the CWP into the spar receiving bay and connecting locking pins around the pipe difficult. As such, embodiments use an engagement ball and receiving plate to allow for greater tolerances for engagement of the CWP. This also provides both the required axial strength of the connection and a securement in the radial orientation that can be achieved with the desired generous tolerances.

The connection comprises radial Bal-Lok connectors comprising for example a large cast steel hollow connecting ball 2420 that seats in a pair of plates, one fastened to the top portion of the CWP, 2430 and the other fastened to the spar. This type of connector is a modification of a ball connection used in the Joint Modular Lighter System (JMLS) developed by the U.S. Army and the U.S. Navy. The connector can be scaled to various strengths depending on the loading requirements. In the JMLS configuration, using a 10 inch ball, the connectors were proof tested to sustain a shear load of 400,000 lb.

Exemplary embodiments of the OTEC CWP connection system described herein use 24 connectors arranged circumferentially around the spar in the CWP locking compartment 2280, and would sustain an ultimate axial load of over 4,250 lt.

Embodiments of the ball connection system have advantages over traditional pin connections. The ball does not tend to seize in place due to corrosion or deformation, as a shear pin can. This facilitates remote actuation during CWP installation and remote un-latching should the CWP ever need to be lowered and removed.

Figure 26:
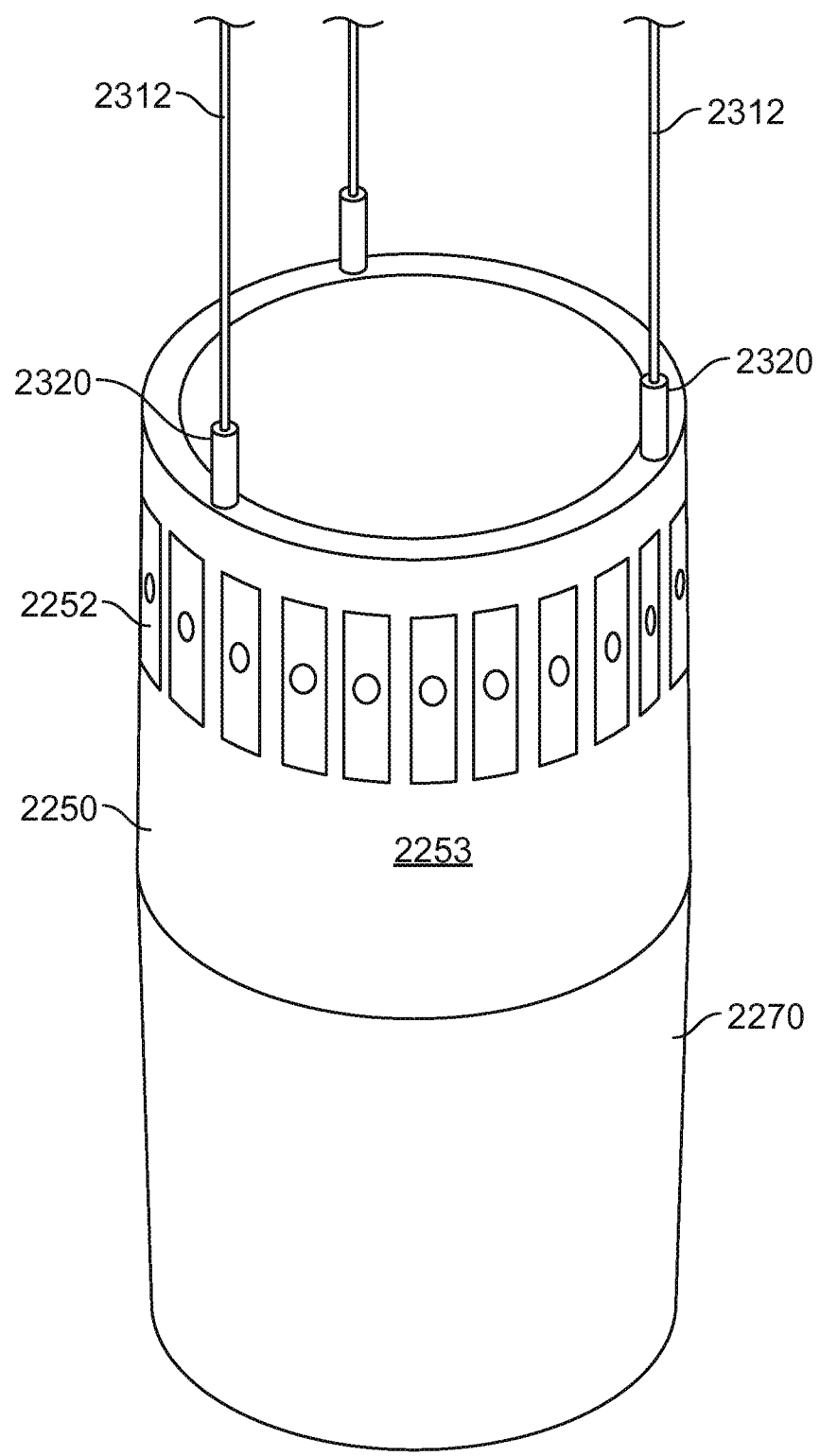
FIG. 26 illustrates an exemplary staved cold water pipe.

FIG. 26 illustrates an exemplary embodiment wherein the staved cold water pipe 2270 is constructed as described herein and further includes a top portion 2250 having a circumferential steel structure 2252 embedded into the synthetic CWP material. The circumferential steel structure 2252 can be a continuous piece of metal or a series of interlocking pieces of metal. Alternatively, the circumferential steel structure 2252 can include a plurality of equally spaced steel plates 2253.

The circumferential steel structure 2252 provides radial stiffness to the top portion 2250 of the CWP 2270. Additionally, lifting lugs 2320 can be anchored or otherwise secured to the embedded steel structure 2252 to ensure proper tensile strength between the lifting lug and the CWP. Moreover, the circumferential steel structure 2252 provides an attachment point for the CWP ball housing plates 2430 used in the locking system.

The offshore structure, cold water pipe and cold water pipe lifting and connection system described herein can be used in an OTEC system. OTEC systems including OTEC heat engines are described in U.S. patent application Ser. No. 13/011,619, incorporated herein in its entirety.

It will be appreciated that the cold water pipe and connection system of the present invention can be used in other industrial processes other than OTEC.

All references mentioned herein are incorporated by reference in their entirety.

Other embodiments are within the scope of the following claims.

What is claimed is:

1. A spar for use with an Ocean Thermal Energy Conversion system, the spar having a submerged portion comprising:
    a warm water pump room;
    an evaporator deck located below the warm water pump room;
    a turbo generator deck located below the evaporator deck;
    a condenser deck located below the turbo generator deck; and
    a dry cold water pump room located below the condenser deck, the dry cold water pump room having top, bottom, and side walls, the dry cold water pump room containing: at least one cold water pipe lifting and retention winch, each cold water pipe lifting and retention winch having a lifting cable, and at least one cold water supply pump; and
    a cold water intake comprising:
        a cylindrical portion configured to receive a cold water pipe; and
        a domed terminus extending upwards from the cylindrical portion;
    wherein the dry cold water pump room circumscribes the cold water intake within the submerged portion of the spar.

2. The spar of claim 1 wherein the cold water intake has a deck area of at least 10 percent the total deck area of the dry cold water pump room.

3. The spar of claim 1 wherein at least one cold water supply pump contained in the dry cold water pump room is in fluid communication with the cold water intake and in fluid communication with a cold water distribution plenum that supplies cold water to one or more OTEC condensers.

4. The spar of claim 1 wherein the lifting cable penetrates a hull of the spar through a dedicated hawse pipe.

5. The spar of claim 1 further comprising a lifting lug housing located beneath the cold water intake, the lifting lug housing adapted to receive and seal to a lifting lug on the top portion of a cold water pipe.

6. The spar of claim 5 wherein the lifting lug housing further comprises a watertight top face seal and one or more watertight circumferential seals.

7. The spar of claim 1 further comprising a ball lock system comprising:
    two or more lock compartments arranged below the cold water intake and adapted to allow a top portion of a cold water pipe to sit between the two or more lock compartments;
    an actuation motor and piston, the piston passing through a watertight seal; and
    a ball lock at the inward end of the piston.

8. The spar of claim 7 wherein the ball lock is adapted to engage with a mating surface on the cold water pipe upon activation of the piston.

9. The spar of claim 7 wherein the ball lock is reversibly engageable with the mating surface of the cold water pipe.

10. The spar of claim 7 wherein the two or more ball locks engage with a mating surface on the cold water pipe and prevent vertical or lateral movement of the cold water pipe in relation to the offshore structure.

11. The spar of claim 1, comprising at least one vertical access trunk extending upwards through multiple decks from the dry cold water pump room.

12. The spar of claim 11, comprising at least one lock compartment through the bottom of the dry cold water pump room.

13. An Ocean Thermal Energy Conversion system comprising:
    a cold water pipe comprising:
        a circumferential structure embedded within the cold water pipe material;
        one or more lifting lugs anchored to the embedded circumferential structure; and two or more ball lock contacts secured to the embedded structure for engagement with a ball lock system located in the lower portion of the offshore structure;

a spar having a submerged portion, the submerged portion comprising:
  a warm water pump room;
  an evaporator deck located below the warm water pump room;
  a turbo generator deck located below the evaporator deck;
  a condenser deck located below the turbo generator deck; and
  a dry cold water pump room located below the condenser deck, the dry cold water pump room having top, bottom, and side walls, the dry cold water pump room containing: at least one cold water supply pump; and at least one cold water pipe lifting and retention winches, each cold water pipe lifting and retention winch having a lifting cable attached to the cold water pipe; and
  a cold water intake comprising:
    a cylindrical portion configured to receive a top portion of the cold water pipe; and
    a domed terminus extending upwards from the cylindrical portion;
    wherein the dry cold water pump room circumscribes the cold water intake.

14. The system of claim 13 wherein the embedded structure comprises steel.

15. The system of claim 13 wherein the embedded structure is a plurality of steel plates embedded about the top portion of the cold water pipe.

16. The system of claim 13 further comprising a lower portion having a staved construction.

17. The system of claim 16 wherein the upper portion of the cold water pipe comprises the same material as the staved lower portion of the cold water pipe.

18. The system of claim 13, comprising at least one vertical access trunk extending upwards through multiple decks from the dry cold water pump room.

19. The spar of claim 18, comprising at least one lock compartment through the bottom of the dry cold water pump room.

* * * * *

UNITED STATES PATENT AND TRADEMARK OFFICE
CERTIFICATE OF CORRECTION

| | | |
|---|---|---|
| PATENT NO. | : 9,151,279 B2 | Page 1 of 1 |
| APPLICATION NO. | : 13/209893 | |
| DATED | : October 6, 2015 | |
| INVENTOR(S) | : Ross et al. | |

It is certified that error appears in the above-identified patent and that said Letters Patent is hereby corrected as shown below:

In the claims

Column 34, line 19, claim 19, delete "spar" and insert -- system --.

Signed and Sealed this
Eighth Day of March, 2016

Michelle K. Lee
*Director of the United States Patent and Trademark Office*